(12) United States Patent
Anderson et al.

(10) Patent No.: US 8,463,080 B1
(45) Date of Patent: Jun. 11, 2013

(54) LIQUID CRYSTAL WAVEGUIDE HAVING TWO OR MORE CONTROL VOLTAGES FOR CONTROLLING POLARIZED LIGHT

(75) Inventors: Michael H. Anderson, Lyons, CO (US); Scott D. Rommel, Lakewood, CO (US); Scott R. Davis, Denver, CO (US)

(73) Assignee: Vescent Photonics, Inc., Denver, CO (US)

( * ) Notice: Subject to any disclaimer, the term of this patent is extended or adjusted under 35 U.S.C. 154(b) by 948 days.

(21) Appl. No.: 11/480,347

(22) Filed: Jun. 30, 2006

Related U.S. Application Data

(63) Continuation-in-part of application No. 11/396,313, filed on Mar. 30, 2006, which is a continuation-in-part of application No. 11/313,540, filed on Dec. 20, 2005, now abandoned, which is a continuation-in-part of application No. 10/963,946, filed on Oct. 12, 2004.

(60) Provisional application No. 60/539,030, filed on Jan. 22, 2004.

(51) Int. Cl.
*G02F 1/35* (2006.01)

(52) U.S. Cl.
USPC .......................................................... 385/3

(58) Field of Classification Search
USPC .......................................................... 385/3
See application file for complete search history.

(56) References Cited

U.S. PATENT DOCUMENTS

| | | | |
|---|---|---|---|
| 3,963,310 A | 6/1976 | Giallorenzi et al. | |
| 4,737,014 A | 4/1988 | Green | |
| 4,896,325 A | 1/1990 | Coldren | |
| 5,044,712 A | 9/1991 | Soref | |
| 5,132,079 A | 7/1992 | Stewart et al. | |
| 5,291,567 A | 3/1994 | Revelli, Jr. et al. | |
| 5,301,201 A | 4/1994 | Dutta | |
| 5,317,446 A | 5/1994 | Mir et al. | |
| 5,319,668 A | 6/1994 | Luecke | |
| 5,347,377 A | 9/1994 | Revelli, Jr. et al. | |
| 5,388,169 A * | 2/1995 | Kobayashi et al. | 385/2 |
| 5,499,256 A | 3/1996 | Bischel et al. | |

(Continued)

FOREIGN PATENT DOCUMENTS

| | | |
|---|---|---|
| EP | 1186940 | 3/2002 |
| JP | 59052219 | 3/1984 |
| JP | 63244004 | 10/1988 |

OTHER PUBLICATIONS

International Search Report for Int. Application No. PCT/US2005/001758 dated Aug. 31, 2006, 2 pp.

(Continued)

*Primary Examiner* — Timothy L Rude
(74) *Attorney, Agent, or Firm* — Mark D. Trenner; Trenner Law Firm, LLC

(57) ABSTRACT

A waveguide and method for controllably altering an optical phase delay (OPD) of light traveling along a propagation direction through the waveguide. Many embodiments are disclosed, and in one example, a waveguide may include a core for guiding the light through the waveguide; at least one cladding adjacent the core, wherein the at least one cladding has liquid crystal molecules disposed therein; at least one electrode for receiving a first voltage for controllably altering the optical phase delay of the TE polarized light traveling through the waveguide; and at least one electrode for receiving a second voltage for controllably altering the optical phase delay of the TM polarized light traveling through the waveguide.

6 Claims, 25 Drawing Sheets

U.S. PATENT DOCUMENTS

| | | | |
|---|---|---|---|
| 5,504,772 | A | 4/1996 | Deacon et al. |
| 5,513,196 | A | 4/1996 | Bischel et al. |
| 5,596,671 | A | 1/1997 | Rockwell, III |
| 5,766,974 | A | 6/1998 | Sardella et al. |
| 5,789,776 | A | 8/1998 | Lancaster et al. |
| 5,837,613 | A | 11/1998 | Kalnitsky et al. |
| 5,965,691 | A | 10/1999 | Gibbons |
| 6,041,071 | A | 3/2000 | Tayebati |
| 6,205,159 | B1 | 3/2001 | Sesko |
| 6,215,928 | B1 | 4/2001 | Friesem et al. |
| 6,324,204 | B1 | 11/2001 | Deacon |
| 6,330,388 | B1 | 12/2001 | Bendett et al. |
| 6,373,872 | B2 * | 4/2002 | Deacon ............ 372/34 |
| 6,449,084 | B1 * | 9/2002 | Guo ............ 359/315 |
| 6,470,036 | B1 | 10/2002 | Bailey et al. |
| 6,480,513 | B1 | 11/2002 | Kapany et al. |
| 6,546,163 | B2 | 4/2003 | Thackara |
| 6,559,921 | B1 | 5/2003 | Leslie et al. |
| 6,594,408 | B1 * | 7/2003 | Noe ............ 385/11 |
| 6,603,902 | B1 | 8/2003 | So |
| 6,608,952 | B2 | 8/2003 | Eggleton et al. |
| 6,650,822 | B1 | 11/2003 | Zhou |
| 6,661,936 | B2 * | 12/2003 | Noe ............ 385/11 |
| 6,763,047 | B2 | 7/2004 | Daiber et al. |
| 6,768,856 | B2 | 7/2004 | Akwani et al. |
| 6,816,140 | B2 | 11/2004 | Fujieda |
| 6,816,516 | B2 | 11/2004 | Daiber |
| 6,853,654 | B2 | 2/2005 | McDonald et al. |
| 6,859,567 | B2 | 2/2005 | Galstian et al. |
| 6,859,572 | B2 | 2/2005 | Ishibashi |
| 6,920,159 | B2 | 7/2005 | Sidorin et al. |
| 7,079,724 | B2 | 7/2006 | Thackara |
| 7,315,665 | B1 * | 1/2008 | Anderson ............ 385/11 |
| 7,403,678 | B2 | 7/2008 | Thapliya et al. |
| 7,570,320 | B1 * | 8/2009 | Anderson et al. ............ 349/63 |
| 2001/0033400 | A1 | 10/2001 | Sutherland et al. |
| 2002/0031299 | A1 | 3/2002 | Hatakoshi |
| 2002/0041726 | A1 | 4/2002 | Thackara |
| 2002/0131694 | A1 | 9/2002 | So et al. |
| 2002/0140879 | A1 | 10/2002 | Fujieda |
| 2002/0154878 | A1 | 10/2002 | Akwani et al. |
| 2002/0181880 | A1 * | 12/2002 | Dautartas et al. ............ 385/51 |
| 2003/0048817 | A1 | 3/2003 | Steffens et al. |
| 2003/0059148 | A1 | 3/2003 | Nishizawa et al. |
| 2003/0086448 | A1 | 5/2003 | Deacon |
| 2003/0103708 | A1 | 6/2003 | Galstian et al. |
| 2003/0108273 | A1 * | 6/2003 | Kowalczyk et al. ............ 385/16 |
| 2003/0137999 | A1 | 7/2003 | Spiegelberg et al. |
| 2003/0142262 | A1 | 7/2003 | Leslie et al. |
| 2003/0169958 | A1 * | 9/2003 | Ridgway et al. ............ 385/14 |
| 2003/0214059 | A1 * | 11/2003 | Itoh ............ 264/1.1 |
| 2003/0214700 | A1 | 11/2003 | Sidorin et al. |
| 2003/0219197 | A1 | 11/2003 | Kawamoto |
| 2003/0231279 | A1 | 12/2003 | Wessel et al. |
| 2004/0208412 | A1 | 10/2004 | Miyazaki et al. |
| 2004/0264902 | A1 * | 12/2004 | Zoorob et al. ............ 385/129 |
| 2005/0135439 | A1 | 6/2005 | Chapman et al. |
| 2005/0180713 | A1 * | 8/2005 | Heideman et al. ............ 385/129 |
| 2005/0265403 | A1 | 12/2005 | Anderson et al. |
| 2008/0013587 | A1 | 1/2008 | Tempea et al. |
| 2008/0161648 | A1 | 7/2008 | Karasawa |
| 2009/0003841 | A1 * | 1/2009 | Ghidini et al. ............ 398/186 |
| 2012/0269478 | A1 * | 10/2012 | Anderson et al. ............ 385/3 |

OTHER PUBLICATIONS

Written Opinion for Int. Application No. PCT/US2005/001758 dated Aug. 31, 2006, 3 pp.

International Search Report for Int. Application No. PCT/US2005/001586 dated Sep. 21, 2006, 3 pp.

Written Opinion for Int. Application No. PCT/US2005/001586 dated Sep. 21, 2006, 3 pp.

Desmat, et al., "Silicon-on-Insulator Optical Waveguides with Liquid Crystal Cladding for Switching and Tuning", Proceedings of the European Conference on Optical Communication (ECOC) 2003, vol. 3, (2003), p. 430-431.

Mormile, et al., "A Basic Element for Integrated Electro-Optical Devices Based on Liquid Crystal Waveguides", Proc. SPIE 4078, (2000), p. 779-785.

Kobayashi, et al., "2x2 Optical Waveguide Matrix Switch Using Nematic Liquid Crystal", IEEE Journal of Quantum Electronics, vol. QE-18, No. 10, 1982.

Casson, et al., "Near-IR Turnable Laser with an Integrated LiTaO3 Electro-Optic Deflector", Applied Optics, vol. 41, No. 30, Oct. 20, 2002.

Hermann, "Integrated Optics with Liquid Crystals", University of Technology, 2000.

Clark, et al., "Surface-Stabilized Ferroelectric Liquid-Crystal Electro-Optic Waveguide Switch", Applied Physics Letter 57(18), Oct. 29, 1990.

Coppola, et al., "Optoelectronic Router in Glass Waveguide with a Liquid Crystal Cladding", SPIE, vol. 4829, 2003.

Gialorenzi, et al., "Lighting Scattering from Smectic Liquid-Crystal Waveguides", Journal of Applied Physics, vol. 47, No. 5, May 1976.

Karpierz, "Nonlinear Properties of Waveguides with Twisted Nematic Liquid Crystal", Acta Physica Polonica A, vol. 99, 161-176, 2001.

Maune, et al., "Electronically Tunable Ring Resonators Incorporating Nematic Liquid Crystals as Cladding Layers", Applied Physics, vol. 83, No. 23, 2003.

Okamura, et al., "Low Voltage Driving in Nematic Liquid Crystal Overlayered Waveguide" Journal of Lightwave Technology, vol. LT-4, No. 3, Mar. 1986.

Sirleto, et al., "Optical Multimode Interference Router Based on a Liquid Crystal Waveguide", Journal of Optics A: Pure Appl. Opt. 5, 2003.

Sirleto, et al., Electro-Optical Switch and Continuously Tunable Filter Based on a Bragg Grating in a Planar Waveguide with a Liquid Crystal Overlayer, Opt. Eng. 41(11), Nov. 2002.

Valera, et al., "Bistability and Switching in Thin-Film Waveguides with Liquid-Crystal Cladding", Applied Physics Letter 48(9), Mar. 3, 1986.

Hu, et al., "Optical Deflection in Thin-Film Nematic Liquid-Crystal Waveguides", IEEE Journal of Quantum Electronics, vol. QE-10, No. 2, Feb. 1974.

Whinnery, et al., "Liquid-Crystal Waveguides for Integrated Optics", IEEE Journal of Quantum Electronics, vol. QE-13, No. 4, Apr. 1977.

Hu, et al., "Losses of a Nematic Liquid-Crystal Optical Waveguide", Journal of the Optical Society of America, vol. 64, No. 11, Nov. 1974.

Repasky, et al., "Tunable External-Cavity Diode Laser Based on Integrated Waveguide Structures", Opt. Eng. 42(8), Aug. 2003.

Oh Kee Kwan, et al., "Proposal of Electrically Tunable External-Cavity Laser Diode", IEEE Photonics Technology Letters, vol. 16, No. 8, Aug. 2004.

Sheridan, et al., "Elector-Optically Induced Deflection in Liquid-Crystal Waveguides", Journal of Applied Physics, vol. 45, No. 12, Dec. 1974.

Sneh, et al., "High-Speed Continuously Tunable Liquid Crystal Filter for WDM Networks", Journal of Lightwave Technology, vol. 14, No. 6, Jun. 1996.

Gialorenzi, et al., "Light Scattering from Nematic Liquid-Crystal Waveguide", Journal of Applied Physics, vol. 46, No. 3, Mar. 1975.

Schnur, et al., "Prospectus for the Development of Liquid-Crystal Waveguides", Naval Research Laboratory, NRL Report 7507, Nov. 10, 1972.

European Search Report from corresponding European patent application (05722475.0) dated Nov. 22, 2007.

Liu, Zao, "Polarization Cross Coupling in Asymmetric Photonic Waveguides", Electrical and Computer Engineering Master's Theses, Northeastern University, Dept. of Electrical and Computer Engineering, Jan. 1, 2010.

* cited by examiner

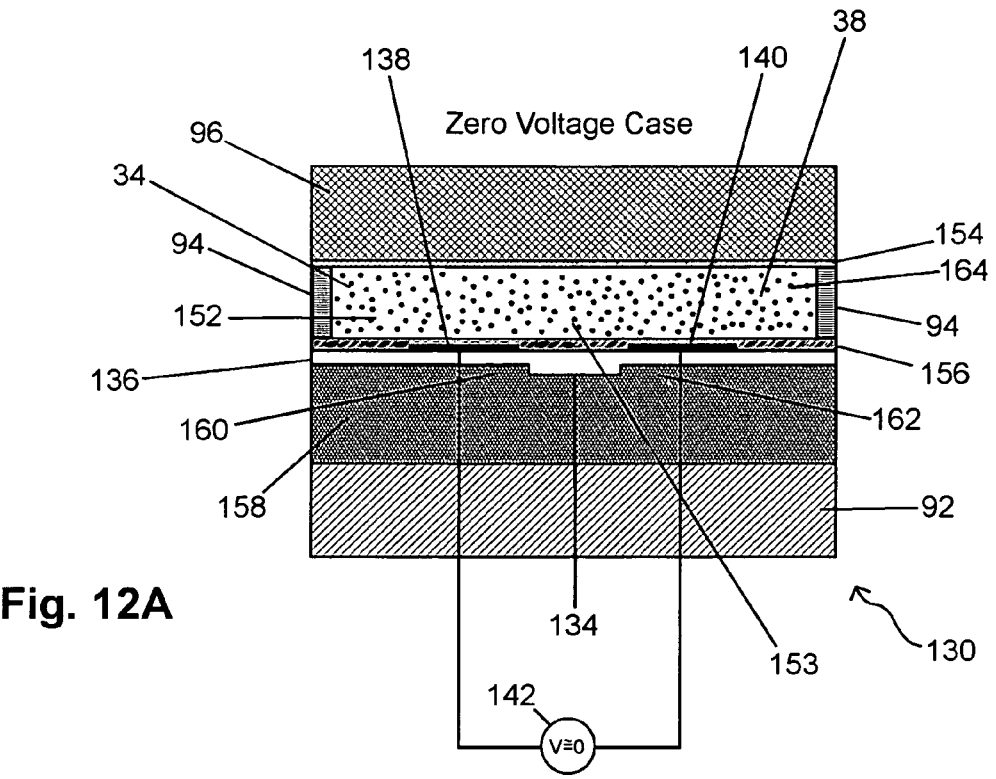
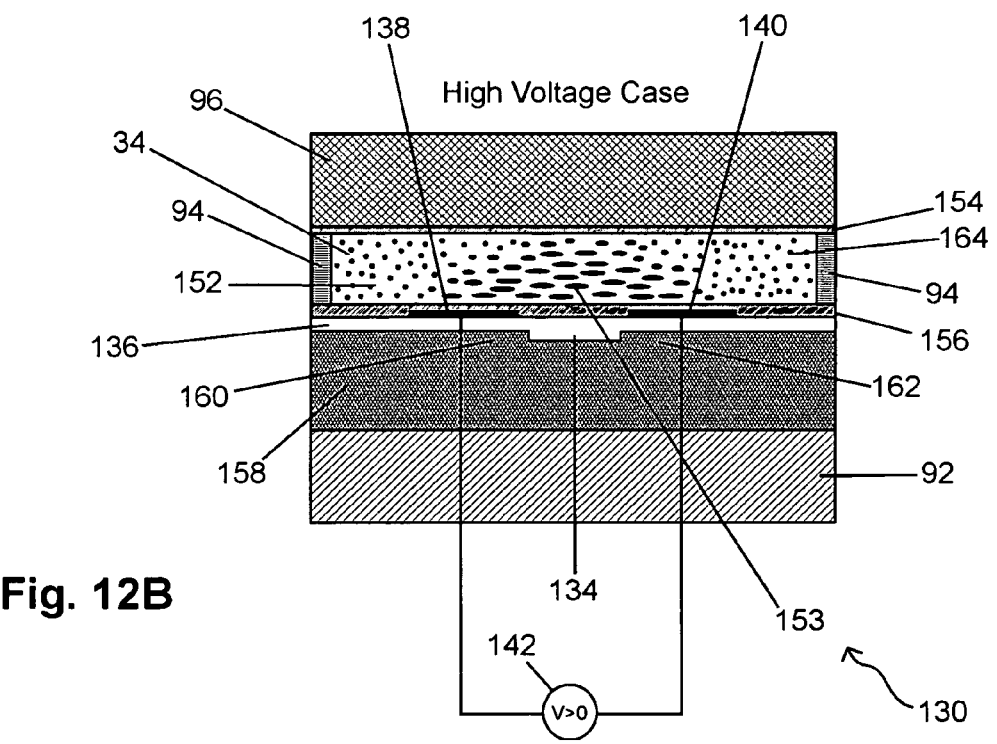

TOP VIEW

TOP VIEW

LIQUID CRYSTAL WAVEGUIDE HAVING TWO OR MORE CONTROL VOLTAGES FOR CONTROLLING POLARIZED LIGHT

CROSS-REFERENCE TO RELATED APPLICATION

This application is a continuation-in-part of U.S. patent application Ser. No. 11/396,313 entitled "LIQUID CRYSTAL WAVEGUIDE HAVING ELECTRIC FIELD ORIENTATED FOR CONTROLLING LIGHT" filed Mar. 30, 2006, which is a continuation-in-part of U.S. patent application Ser. No. 11/313,540 entitled "LIQUID CRYSTAL WAVEGUIDE FOR DYNAMICALLY CONTROLLING POLARIZED LIGHT" filed Dec. 20, 2005, which is a continuation-in-part of U.S. patent application Ser. No. 10/963,946 entitled "LIQUID CRYSTAL WAVEGUIDE HAVING REFRACTIVE SHAPES FOR DYNAMICALLY CONTROLLING LIGHT" filed Oct. 12, 2004, which claimed the benefit under 35 U.S.C. 119(e) to U.S. Provisional patent application No. 60/539,030 entitled "LIQUID CRYSTAL WAVEGUIDE HAVING REFRACTIVE SHAPES FOR DYNAMICALLY CONTROLLING LIGHT AND TUNABLE LASER INCLUDING SAME" filed Jan. 22, 2004, the disclosures of which are hereby incorporated by reference in its entirety.

FIELD OF THE INVENTION

This invention relates, in general, to waveguides, and more particularly, to waveguides having liquid crystal materials therein.

BACKGROUND OF THE INVENTION

Light can be controlled using standard lenses and mirrors. These passive methods can be made active via mechanical motion. For example, mirrors can be placed on motorized stages or piezo mounts to move a mirror to control either the direction of light propagation and/or the total optical path length of a system. By altering the physical path length, the optical phase delay (OPD) of the light may be controlled. This technique is used in Fourier transform spectrometers, external cavity tunable diode lasers, tunable filters, etc.

However, mechanical control over light is undesirable for several reasons. First, it is difficult to make such mechanical devices compact. Second, the mechanical nature of such moving devices have limited lifetimes due to mechanical wear and failure issues. Third, mechanical devices are inherently vibration sensitive, which limits the type of environment in which they can be used. Finally, mechanical devices necessitate a level of design complexity including gears, bearings, and other mechanical components, which add cost, expense, and maintenance issues to such designs.

Rather than move a lens or a mirror with a motor or actuator, light can be controlled through the use of waveguides. For instance, U.S. Pat. No. 5,347,377 entitled "Planar Waveguide Liquid Crystal Variable Retarder" relates generally to providing an improved waveguide liquid crystal optical device, and discloses in Table I the use of alternating current voltages between 2 and 50 volts rms. This patent teaches, among other things, controlling the optical phase delay for TM polarized light.

Light can be characterized as having various polarized components, such as TM (transverse magnetic) and TE (transverse electric) polarizations, which relate to the magnetic and electric field components of light. Generally, if one chooses a reference plane that is oriented perpendicular to the light propagation direction, TM polarized light means that the magnetic field of a light wave is traversing or parallel to that plane, while the electric field of the light is substantially perpendicular to the plane. TE polarized light is characterized by the electric field of the light traversing or parallel to the same plane, while the magnetic field of the light is substantially perpendicular to that same plane.

In another non-mechanical technique for controlling light, thermo-optics can be used to control light. The temperature of a waveguide, constructed with thermo-optic material such as silicon oxynitride, can be used to alter the index of refraction (n) for light traveling through the waveguide. Such thermo-optic approaches typically provide for only limited changes in index of refraction ($dn/dt \approx 1.5 \times 10^{-5}/^\circ$ C.), which in turn necessitates large temperature changes (up to 500° C. or higher) for significant light control. These devices can be power consumptive, which may be prohibitive for many applications.

An electro-optic approach may be generally less power consumptive than thermo-optics. With conventional waveguides, electro-optic materials, such as $LiNbO_3$, are employed whereby a voltage applied across such material changes the index of refraction, n. However, with these conventional techniques, the index of refraction can only be changed a very small amount, such as 0.0001 per kilo volt for bulk materials such as $LiNbO_3$. This limitation makes this type of light control extremely limited due to the high amount of voltage needed for significant light control.

While liquid crystal optics have become widespread in display applications, in such applications light is attenuated but the optical phase delay is not appreciably altered, or only to a very small degree, typically less than one wavelength of light (<1 micron). Use of conventional liquid crystal optical techniques to achieve active optical control would generally require prohibitively thick layers of liquid crystal (>100 microns), which would render the device highly opaque and slow. The thick layers of liquid crystal may be difficult or impossible to control. Furthermore, liquid crystal displays are typically polarization dependent.

Accordingly, as recognized by the present inventors, what is needed is a liquid crystal waveguide for controlling light that permits active control of the propagation of several different polarizations of light such as TM and TE polarized light through the waveguide in a manner that provides for low losses.

It is against this background that various embodiments of the present invention were developed.

SUMMARY

In light of the above and according to one embodiment of the present invention, disclosed herein is a waveguide for controllably altering an optical phase delay of TE polarized light and TM polarized light traveling along a propagation direction through the waveguide. In one embodiment, a waveguide may include a core for guiding the light through the waveguide; at least one cladding adjacent the core, wherein the at least one cladding has liquid crystal molecules disposed therein; at least one electrode for receiving a first voltage for controllably altering the optical phase delay of the TE polarized light traveling through the waveguide; and at least one electrode for receiving a second voltage for controllably altering the optical phase delay of the TM polarized light traveling through the waveguide.

In one example, the at least one electrode for receiving the first voltage may include a first electrode and second electrode positioned in a parallel relation to one another within the waveguide, the first voltage applied across the first and second electrode. The core may include a channel, and the first and second electrodes may be positioned adjacent to the channel.

In another example, the at least one electrode for receiving the first voltage may include a first electrode and second electrode positioned in a parallel relation to one another within the waveguide, the first voltage applied across the first and second electrode; and the at least one electrode for receiving the second voltage may include a third electrode and a ground plane positioned within the waveguide, the second voltage applied across the third electrode and the ground plane.

In another example, the at least one electrode for receiving the first voltage may include a first electrode and a ground plane positioned within the waveguide, the first voltage applied across the first electrode and the ground plane.

In another example, the first voltage and the second voltage can be synchronously altered so that the optical phase delay of the TE polarized light is substantially equal to the optical phase delay of the TM polarized light.

In another example, the at least one electrode for receiving the first voltage and the at least one electrode for receiving the second voltage can be positioned in a common region within the waveguide.

In another embodiment, the waveguide may also include a ground plane, and the first voltage may be applied between the ground plane and the at least one electrode for receiving the first voltage. The second voltage may be applied between the ground plane and the at least one electrode for receiving the second voltage.

In another embodiment, the waveguide may include a ground plane, and the at least one electrode for receiving the first voltage can include a first electrode positioned within the waveguide, the first voltage applied across the first electrode and the ground plane; and the at least one electrode for receiving the second voltage can include a second electrode positioned within the waveguide, the second voltage applied across the second electrode and the ground plane. In this example, the first voltage and the second voltage can be synchronously altered so that the optical phase delay of the TE polarized light is substantially equal to the optical phase delay of the TM polarized light.

In accordance with another broad aspect of another embodiment of the present invention, disclosed herein is a method for controllably altering an optical phase delay of TE polarized light and TM polarized light traveling along a propagation direction through a waveguide. In one example, the method may include providing the waveguide with a first electrode, a second electrode, a core for guiding the light through the waveguide, and at least one cladding having liquid crystal molecules disposed therein; applying a first voltage to the first electrode for controllably altering the optical phase delay of the TE polarized light traveling through the waveguide; and applying a second voltage to the second electrode for controllably altering the optical phase delay of the TM polarized light traveling through the waveguide.

In one example, the operation of applying the first voltage can be performed simultaneously with the operation of applying the second voltage.

In another example, the operation of applying the first voltage and the operation of applying the second voltage can be synchronously performed so that the optical phase delay of the TE polarized light is substantially equal to the optical phase delay of the TM polarized light.

In another example, the operation of applying the first voltage is performed independently with the operation of applying the second voltage.

In accordance with another broad aspect of another embodiment of the present invention, disclosed herein is a waveguide for controllably altering an optical phase delay of TE polarized light and TM polarized light traveling along a propagation direction through the waveguide. In one example, a waveguide may include a core for guiding the light through the waveguide; at least one cladding adjacent the core, wherein the at least one cladding has liquid crystal molecules disposed therein; at least a first electrode positioned adjacent a first region of the waveguide for receiving a first voltage, wherein as the first voltage is altered, the ratio of the optical phase delay of the TE polarized light traveling within the first region to the optical phase delay of TM polarized light traveling within the first region is controllably altered by a first amount; and at least a second electrode positioned adjacent a second region of the waveguide for receiving a second voltage, wherein as the second voltage is altered, the ratio of the optical phase delay of the TE polarized light traveling within the second region to the optical phase delay of the TM polarized light traveling within the second region is controllably altered by a second amount that is different than the first amount.

In one example, the optical phase delay for the TE polarized light changes while the optical phase delay remains substantially unaltered for the TM polarized light.

In one example, the liquid crystal molecules have longitudinal axes and within the first region, the liquid crystal molecules have an initial orientation that aligns at least a portion of the liquid crystal molecules in the first region with their longitudinal axes oriented substantially in the plane of the waveguide and substantially perpendicular to the propagation direction; and within the second region, the liquid crystal molecules have an initial orientation that aligns at least a portion of the liquid crystal molecules in the second region with their longitudinal axes oriented substantially in the plane of the waveguide and substantially parallel to the propagation direction.

In one example, as the first voltage is applied to the first electrode, the alignment of at least a portion of the liquid crystal molecules in the first region rotates from the initial orientation to a second orientation that aligns at least a portion of the liquid crystal molecules in the first region with their longitudinal axes oriented substantially perpendicular to the plane of the waveguide and substantially perpendicular to the propagation direction.

In another example, as the second voltage is applied to the second electrode, the alignment of at least a portion of the liquid crystal molecules in the second region rotates from the initial orientation to a second orientation that aligns at least a portion of the liquid crystal molecules in the second region with their longitudinal axes oriented substantially perpendicular to the plane of the waveguide and substantially perpendicular to the propagation direction.

Other features, utilities and advantages of the various embodiments of the invention will be apparent from the following more particular description of embodiments of the invention as illustrated in the accompanying drawings.

BRIEF DESCRIPTION OF THE DRAWINGS

FIG. 12A illustrates a sectional view taken along section lines 12-12 of FIG. 11, wherein no voltage is applied across the electrodes of the waveguide, in accordance with an embodiment of the present invention.

FIG. 12B illustrates a sectional view taken along section lines 12-12 of FIG. 11, wherein a voltage is applied across the electrodes, in accordance with an embodiment of the present invention.

DETAILED DESCRIPTION

Figure 1:
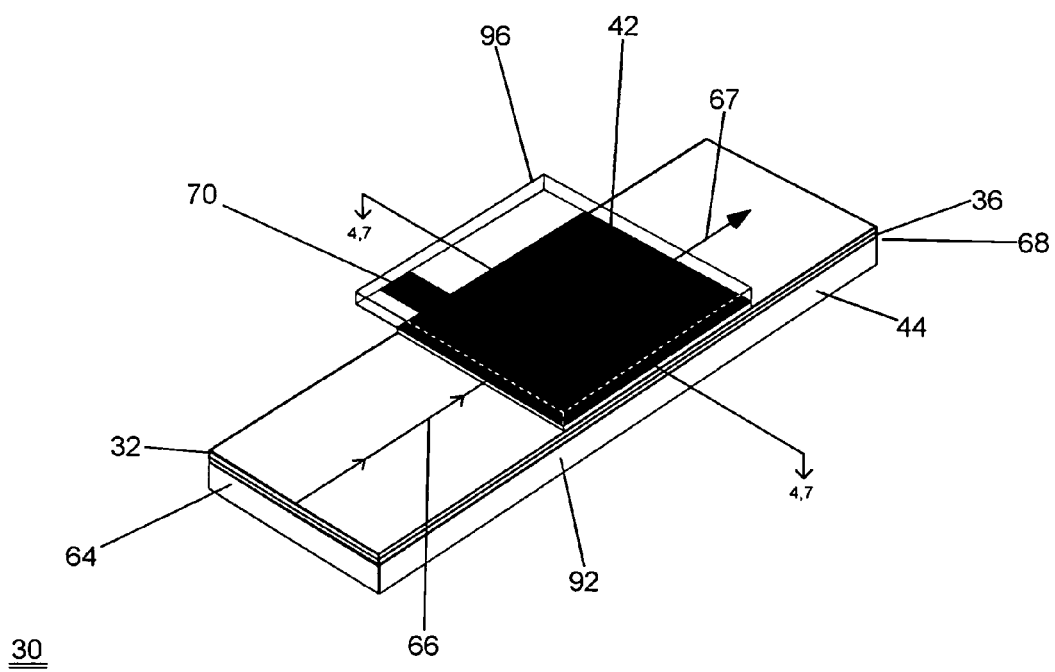
FIG. 1 illustrates an example of a waveguide for providing active control of light propagation, in accordance with an embodiment of the present invention.

Disclosed herein are various embodiments of a waveguide for dynamically controlling—through electronic, non-mechanical controls—the optical phase delay (OPD) (as well as other characteristics) of light of TE and TM polarizations passing through a waveguide.

Generally and in accordance with one embodiment of the present invention, a waveguide (such as waveguide 30 shown in FIGS. 1, 4A-B) may be formed having a core or core layer 32, an upper and lower cladding 34, 36 proximate or adjacent to the core 32, and liquid crystal materials 38 disposed within the upper or lower cladding 34, 36. One or more alignment layers (i.e., 40 and 41) can be provided which provide or bias an initial orientation of the collection of liquid crystals 38 in the cladding (such as within the upper cladding 34). A pair of electrodes (i.e., 42 and 44), which may be implemented as electrode planes, may be provided in the waveguide for receiving a voltage 46 applied therebetween which will induce a re-orientation of the liquid crystals 38 and therefore control the index of refraction of the waveguide or controllably alter the OPD experienced by the light 66.

For purposes of describing various embodiments of the inventions, the liquid crystal molecules 38 may be characterized as having a longitudinal axis which may be oriented at an out-of-plane tilt angle with respect to the plane of the waveguide, and an in-plane angle with respect to the propagation direction 67 of light. This is discussed in greater detail below with respect to FIGS. 17-18.

Figure 5A:
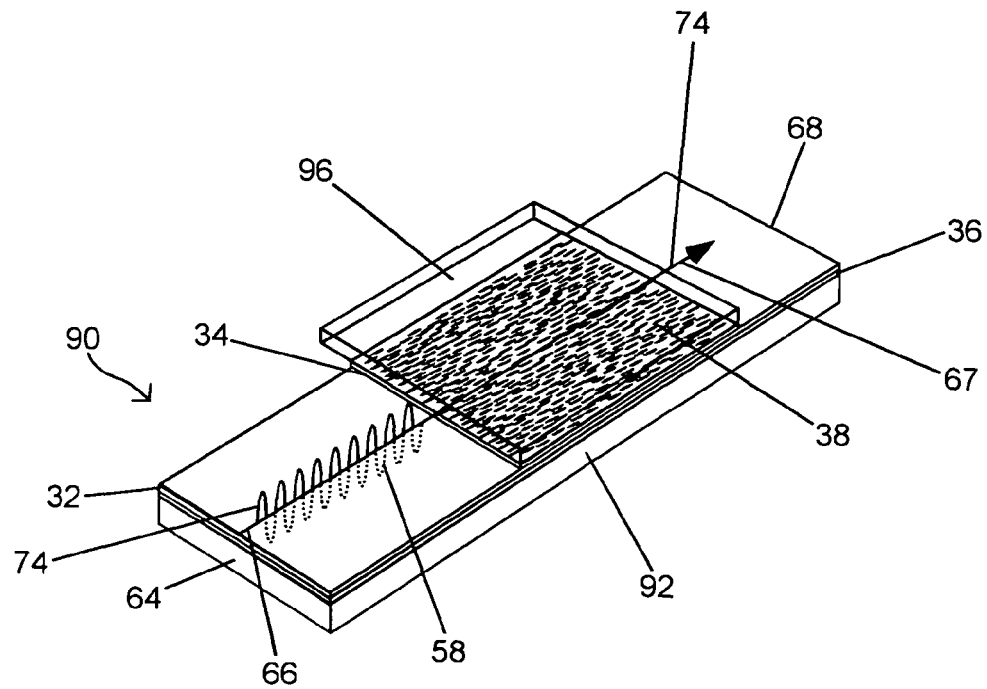
FIGS. 5A-B illustrate an example of a waveguide, with liquid crystals aligned for providing active control of TM polarized light propagation (TM light is shown) as voltage is applied to an electrode in the waveguide, in accordance with an embodiment of the present invention.

In accordance with embodiments of the present invention, the orientation of liquid crystals 38 and/or the geometry of electrodes (i.e., 42, 44) may be provided so as to permit independent and/or simultaneous control over TE and TM polarized light. As disclosed herein, a waveguide may be formed using a liquid crystal (LC) alignment that provides for dynamic, simultaneous control over TE and TM polarized light (see FIGS. 2, 3, 4); or a waveguide may be formed using an LC alignment that provides for dynamic control over only TM polarized light, with no or only negligible effects on TE polarized light (see FIGS. 5, 6, 7).

Figure 11A:
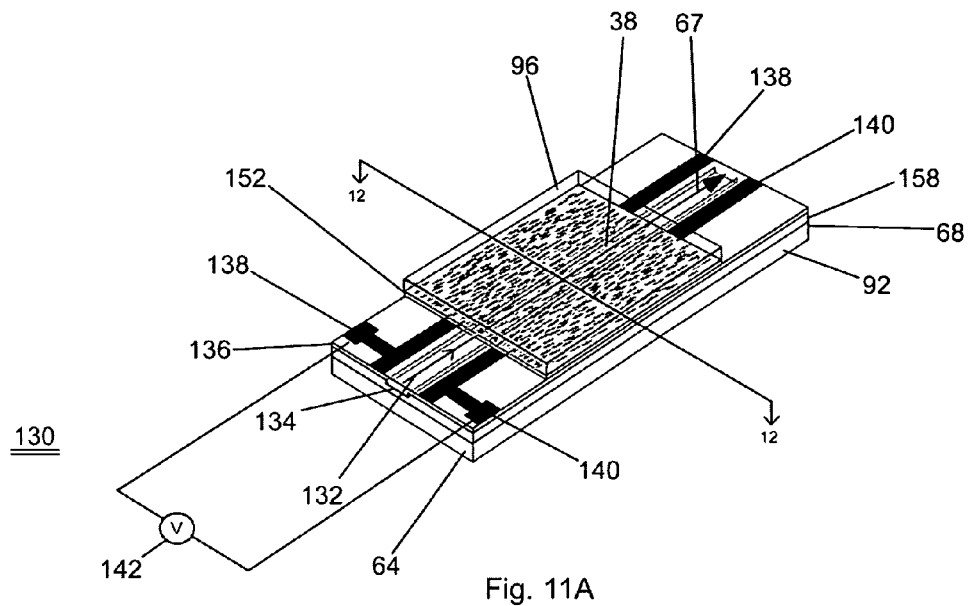
FIGS. 11A-B illustrates an example of a waveguide having a channel therein with a pair of electrodes along the outer edges of the channel for providing active control of light propagation, in accordance with an embodiment of the present invention.
Figure 11B:
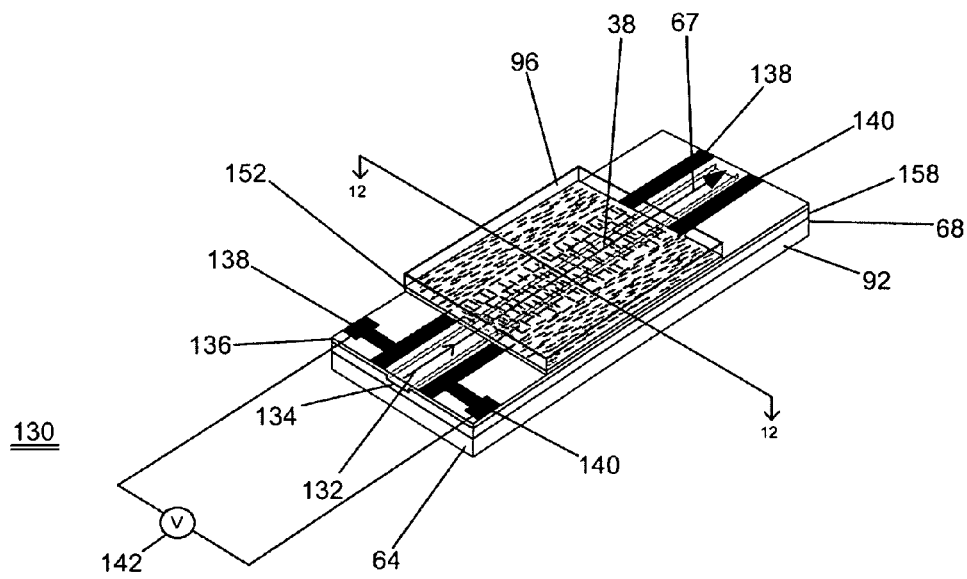

Furthermore, a waveguide structure may be combined with an LC alignment that provides dynamic control over only TE polarized light, with no or only negligible effects on TM polarized light (see FIGS. 11, 12); or alternatively, a waveguide may include two or more regions such that simultaneous and/or independent control over both TE and TM polarized light is provided (see FIGS. 13-14, 15-16).

In other embodiments, a waveguide may be constructed such that the polarization state remains unchanged upon passing from the waveguide input to the waveguide output. Alternatively, a waveguide may be constructed such that TE polarized light is converted in a controlled manner to TM polarized light, and/or TM polarized light is converted in a controlled manner to TE polarized light.

Figure 16:
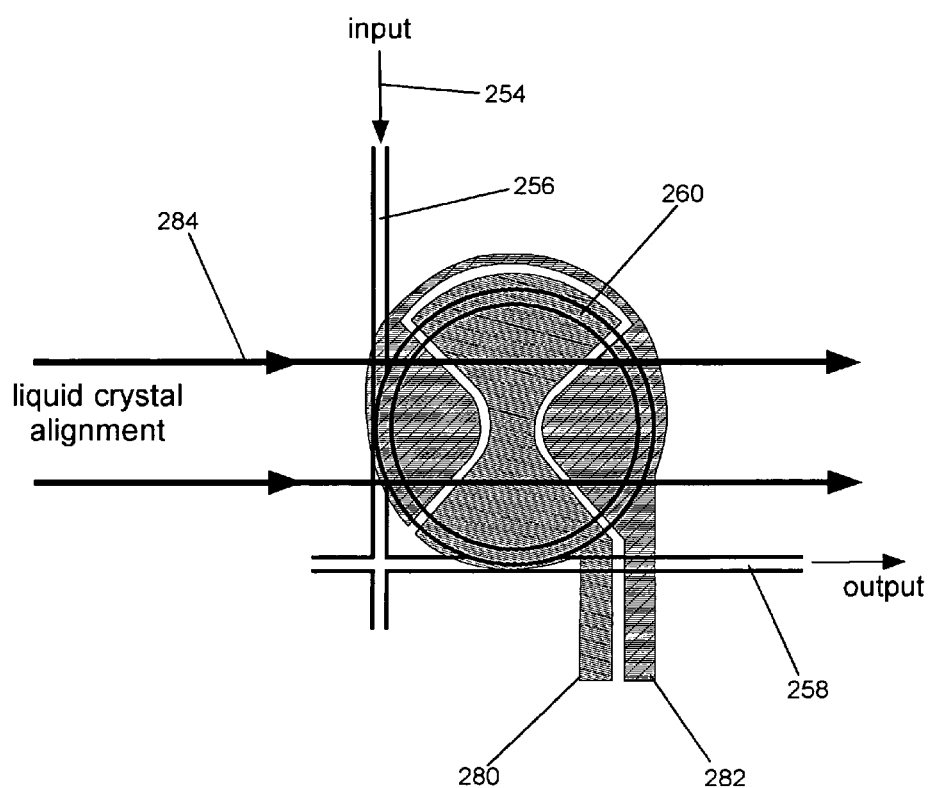
FIG. 16 illustrates a top view of another embodiment of a voltage tunable ring resonator wherein two electrodes are provided for simultaneous and/or independent control of light propagation over both TE and TM polarizations of light, in accordance with one embodiment of the present invention.

Further, a waveguide or devices including a waveguide can be rendered polarization independent if desired (see FIGS. 13, 14, 16). Various embodiments of the present invention are described herein.

Hence, embodiments of the present invention can be used to simultaneously and/or independently control the index of refraction, OPD or other optical characteristics for particular types of polarized light, such as TM polarized light and TE polarized light. TE polarized light and TM polarized light may be formed by manipulating light in any number of conventional manners, such as through polarizers or waveplates. Embodiments of the invention may be used with polarized or un-polarized light, depending upon the implementation.

Figure 2A:
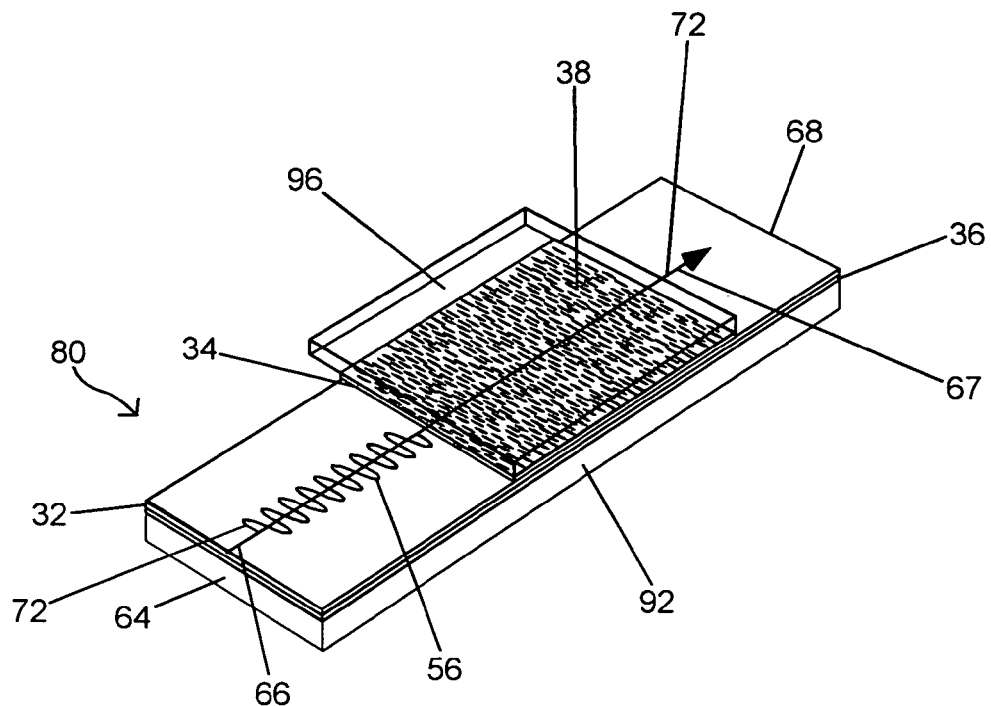
FIGS. 2A-B illustrate an example of a waveguide, with liquid crystals aligned for providing active control of TE and TM polarized light propagation (TE light is shown) as voltage is applied to an electrode in the waveguide, in accordance with an embodiment of the present invention.
Figure 2B:
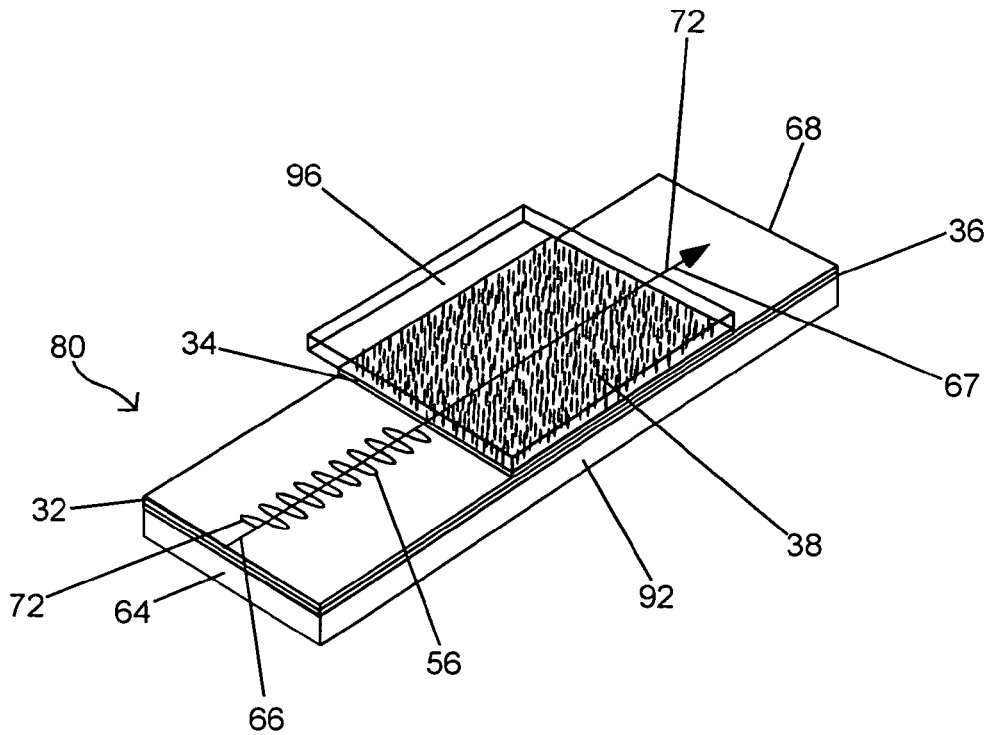

Generally, TE (Transverse Electric) polarized light can be characterized by the electric field of the light traversing within the plane of the waveguide, while the magnetic field of the light is substantially perpendicular to the plane of the waveguide (see, for example, FIGS. 2A-2B showing a representation of the electric field 56 for TE polarized light 72).

Figure 3A:
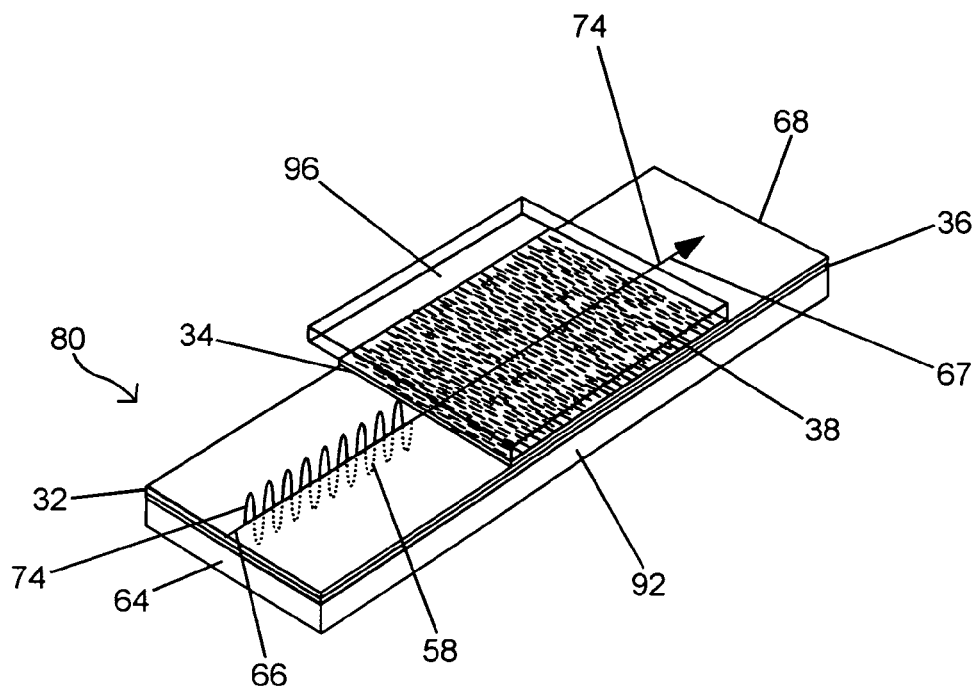
FIGS. 3A-B illustrate the waveguide of FIGS. 2A-B wherein the waveguide has liquid crystals aligned for providing active control of TE and TM polarized light propagation (TM light is shown) as voltage is applied to an electrode in the waveguide, in accordance with an embodiment of the present invention.
Figure 3B:
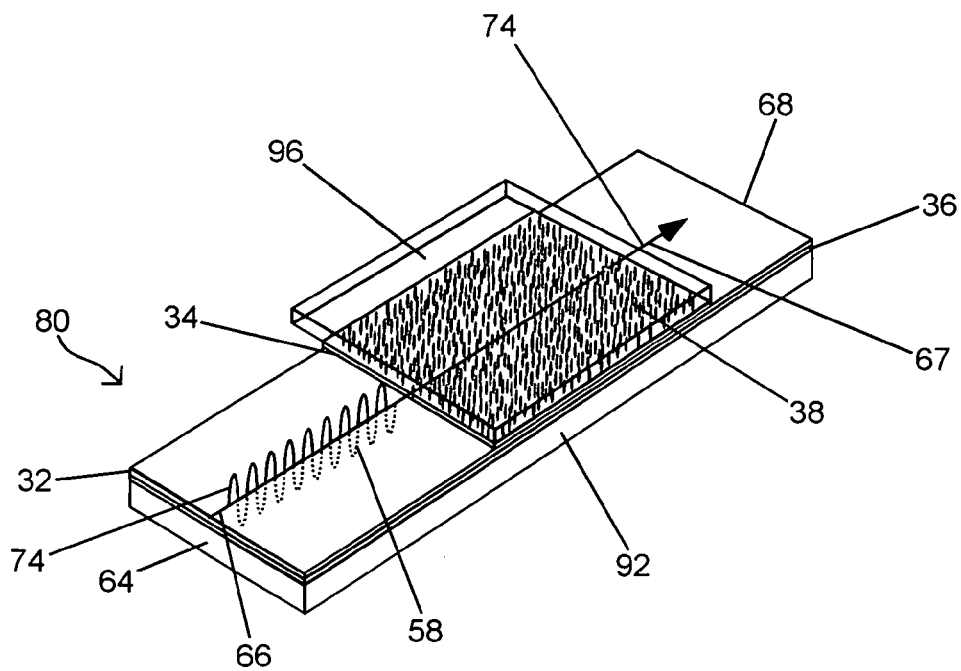

Generally, TM (Transverse Magnetic) polarized light can be characterized by the magnetic field of the light wave traversing within the plane of the waveguide, while the electric field of the light is substantially perpendicular to the plane of the waveguide (see, for example, FIGS. 3A-3B showing a representation of the electric field 58 of TM polarized light 74).

For purposes of describing operations of embodiments of the present invention, the electric fields 56, 58 of TE and TM light will be shown and described to the extent that they are affected by a particular waveguide. In this application (such as in FIGS. 2, 3, 5, 6 and in this description), the electric fields 56, 58 of TE and TM light are depicted and described as waves in order to simplify the description.

The control of light and the attendant results that may be achieved by embodiments of the present invention can be characterized in numerous ways. The speed at which light propagates through a waveguide may be dictated by and characterized in many ways—by an effective index of refraction, a waveguide index, or an index of refraction. The degree to which the index of refraction is altered, for example by an applied voltage in an embodiment of the present invention, may be referred to as the modulation index.

For a given index of refraction and a given path length through a waveguide, the light exiting the waveguide will have a certain optical phase. As the index of refraction is controllably altered as described herein, the optical phase of the light exiting the liquid crystal waveguide will also be controllably altered. The change in optical phase is referred to as the optical phase delay (OPD). Additionally, optical phase delay (OPD) may also refer to the change in optical phase between two polarizations of light which are simultaneously traveling through a waveguide. For instance, as a voltage is applied across a waveguide with liquid crystal therein as disclosed herein, the concurrent change in optical phase between the two polarizations may also be referred to as an optical phase delay. For instance, this may be a voltage-controlled change in the optical phase of TE polarized light with respect to the optical phase of TM polarized light. Or a change in optical phase may occur with respect to a single type of polarized light in that the input phase and output phase of the light may change based on characteristics of the waveguide. For example, the optical phase delay may be the difference between the optical phase of light that has traveled through a length of space, wherein the index of refraction for free space is equal to one, and the optical phase of light that has traveled through the same length of the waveguide, wherein the index of refraction of the waveguide may be dynamically controlled by a voltage.

The wavelength of light passing through a waveguide is dependent upon the index of refraction for the waveguide. Therefore, as the index of refraction changes in a waveguide in accordance with an example of the invention, there will also be a change in the wavelength of light.

The total number of optical waves within a length of a waveguide of the present invention may define the optical path length (OPL) of a waveguide. As the index of refraction of the waveguide is controllably altered, the optical path length (OPL) of the waveguide may therefore also be controllably altered.

Hence, embodiments of the present invention may be used to controllably and dynamically alter the effective index of refraction, waveguide index, modulation index, and/or optical path length of a waveguide; and embodiments of the present invention may be used to controllably and dynamically alter the wavelength or optical phase delay of light passing through a waveguide. These terms are used throughout this disclosure.

Figure 4A:
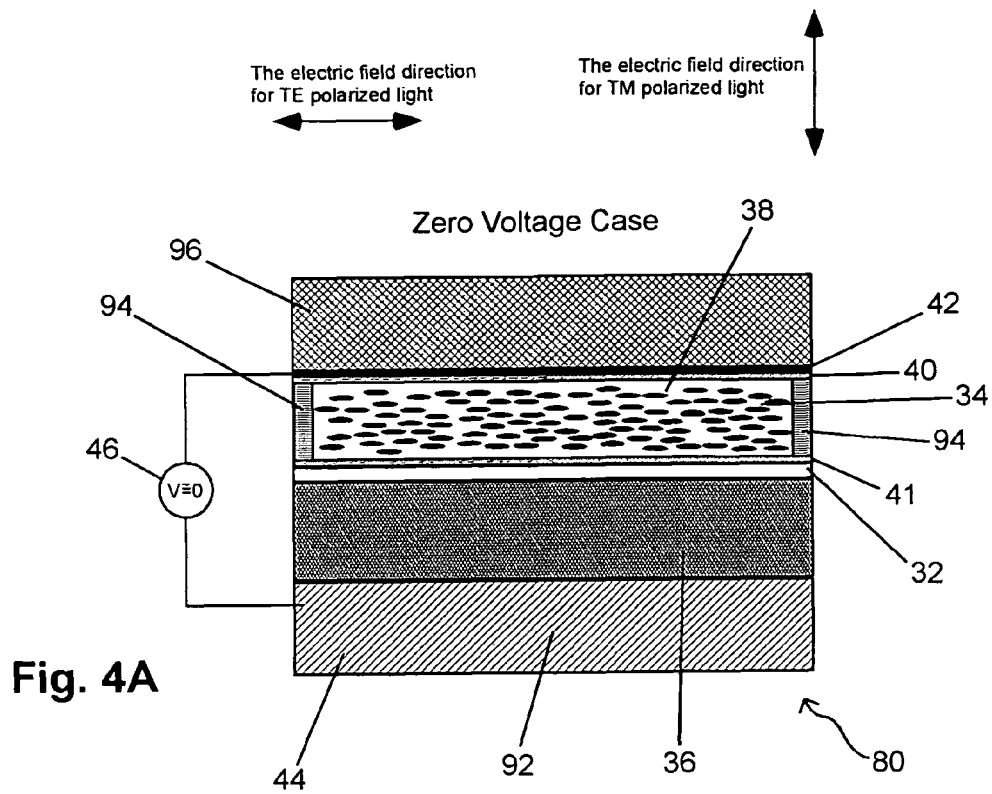
FIG. 4A illustrates a sectional view taken along section lines 4-4 of FIG. 1 for providing active control of TE and TM polarized light propagation, where no voltage is applied across the electrode, in accordance with an embodiment of the present invention.
Figure 4B:
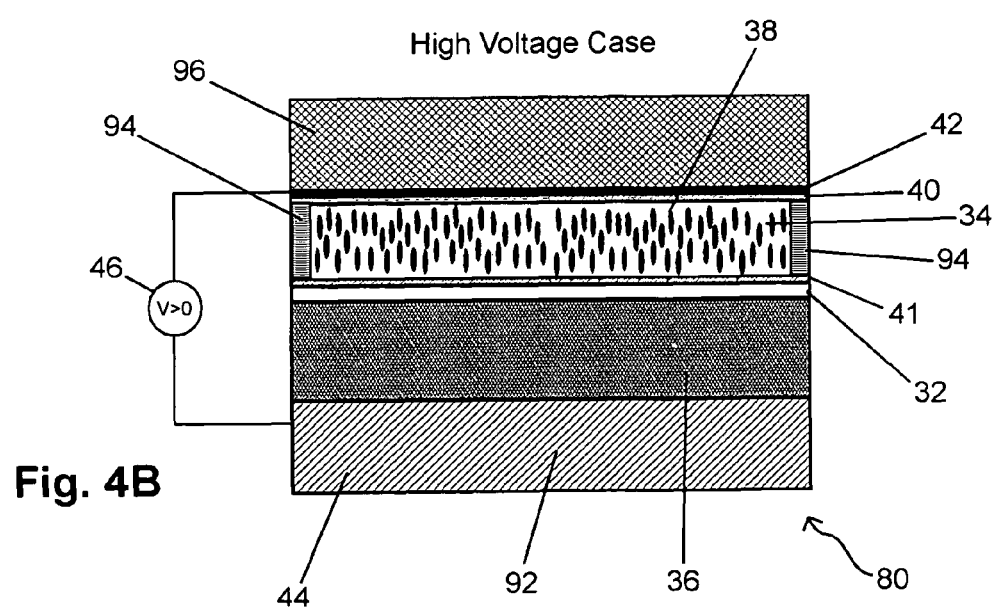
FIG. 4B illustrates a sectional view taken along section lines 4-4 of FIG. 1 for providing active control of TE and TM polarized light propagation, where a voltage is applied across the electrode, in accordance with an embodiment of the present invention.

As shown in FIGS. 1 and 4A-B, in one example, a waveguide 30 may include a core 32, a pair of claddings 34, 36 surrounding the core 32 wherein one of the claddings (e.g., the upper cladding 34) contains liquid crystal material 38 therein. In one example, one or more electrodes 42, 44 or an electrode layer are positioned above the upper cladding 34 (having liquid crystal material 38 therein), and a lower electrode or electrode layer or plane 44 is positioned below the lower cladding 36 and may act as a ground plane. Hence, a voltage 46 can be applied across the upper and lower electrodes 42, 44 to create an electric field therebetween, as shown for example in FIG. 4B. As shown in FIG. 4A, an upper alignment layer 40 can be positioned about the upper surface of the upper cladding 34 for providing an initial orientation of the liquid crystal material 38 within the cladding 34; a lower alignment layer 41 can be positioned about the lower surface of the upper cladding 34, also for providing an initial orientation of the liquid crystal material 38 within the cladding. The initial orientation may provide the longitudinal axes of the liquid crystal molecules with an initial out-of-plane tilt angle and an initial in-plane angle, as described below in FIGS. 17-18. Depending upon the implementation, a waveguide may be provided with either an upper 40 or lower 41 alignment layer, or both, or neither.

The liquid crystal material 38, in one example, includes a nematic liquid crystal with a positive dielectric anisotropy. Nematic liquid crystal molecules typically have a long axis and a short axis, and one may consider the long axis to be a longitudinal axis.

In one example, the alignment layers 40, 41 may be utilized to orient at least a portion of the molecules such that the longitudinal axes of each liquid crystal molecule are substantially parallel to one another and the group of molecules point in a generally uniform direction over a region or area.

The liquid crystal material 38 beneath the electrode(s) 42 can be characterized as having a tunable and dynamic index of refraction. As voltage 46 is applied and increased between the upper electrode(s) 42 and the lower electrode plane 44, the index of refraction of the liquid crystal material 38 under the upper electrode(s) 42 is controllably changed as a function of the voltage 46 applied, which in turn alters the indices of refraction for the TE and TM polarized light. Hence, the amount of optical phase delay between the TE and TM polarized light passing through a waveguide 30 of the present invention can be controllably altered. The propagation speed of light as it passes through a waveguide 30 can be controlled electronically and without any moving parts to perform numerous useful functions, such as for use in interferometers, optical switches, Mach Zehnder interferometers, optical filters, tunable lasers, or other applications.

As shown in the example of FIG. 1, a waveguide 30 may be generally rectangular in shape and may include a core 32 having a generally rectangular cross-section or defining a parallel piped. On the front end 64 of the waveguide 30, light 66 is introduced into the waveguide core 32 (for instance, through any conventional coupling mechanism such as a cylindrical lens) and propagates along the length of the waveguide 30 to the distal end 68 of the waveguide 30. As shown in FIG. 1, the propagation direction 67 of light 66 through the waveguide 30 is generally along the length of the waveguide 30, and use of embodiments of the present invention permit the propagation speed for one or more polarizations to be controllably altered depending, in part, on the alignment of the liquid crystals 38 and the voltages 46 applied between the upper electrode(s) and the lower electrode or plane 42,44. Although the waveguide 30 in FIG. 1 is shown as generally rectangular, it is understood that a waveguide made according to one or more embodiments of the present invention could have other shapes such as square, trapezoid, parallelogram, any polygon, or even be diced or scribed so as to have rounded edges producing elliptical, circular, or any curved shape.

Various embodiments of a waveguide are disclosed in the co-pending, commonly assigned U.S. patent application Ser. No. 10/963,946 entitled "LIQUID CRYSTAL WAVEGUIDE HAVING REFRACTIVE SHAPES FOR DYNAMICALLY CONTROLLING LIGHT" filed Oct. 12, 2004, the disclosure of which is hereby incorporated by reference in its entirety, and one or more of the waveguides disclosed therein may be used with one or more of the features of the present invention.

In one example, the electrode(s) 42,44 may include a tab or extension 70 there from which permits the electrode(s) 42 to be electrically connected to other electrical elements, such as a voltage source 46 coupled between the electrode(s) 42 and the lower electrode or plane 44. Alternatively, electrical traces, conductors, vias or other conventional connection types may be utilized to electrically couple an electrode to other electrical elements. Depending upon the implementation, the applied voltage 46 can be a DC voltage, or an AC voltage, for instance at low frequencies ranging to high frequencies such as 50 KHz or higher.

As recognized by the present inventors, the degree to which the effective index of refraction of the waveguide 30 is altered with application of voltage 46 is dependent, in part, on the polarization of the input light 66 and the liquid crystal 38 alignment.

Polarized light that is traveling through aligned liquid crystal material 38 will experience a higher index of refraction if the electric field 56,58 (FIGS. 2A-B, 3A-B) of the light 66 is parallel to the longitudinal axis of the aligned liquid crystal molecules 38. Alternately, polarized light that is traveling through the aligned liquid crystal material 38 with an electric field that is perpendicular to the longitudinal axis of the aligned liquid crystal molecules 38 will experience a lower index of refraction.

In accordance with one embodiment of the present invention, the orientation of the liquid crystal molecules 38 can be dynamically controlled through application of a voltage 46 across the liquid crystal material 38 in the cladding 34. In other words, the out-of-plane tilt and in-plane angle of the longitudinal axes of the liquid crystal molecules may be dynamically controlled through application of a voltage 46. In general, the liquid crystal molecules 38 with a positive dielectric anisotropy will align towards an electric field that is created via the applied voltage 46. In one embodiment, by controllably re-aligning the orientation of the liquid crystal material 38 in a waveguide, the index of refraction for varying polarizations can be controllably altered.

A waveguide can be formed so as to provide control of both TM polarized light (see 74 of FIGS. 3A-B) and TE polarized light (see 72 of FIGS. 2A-B), in accordance with one embodiment of the present invention. In one example as shown in FIGS. 2A-B, FIGS. 3A-B, and FIGS. 4A-B the liquid crystal molecules 38 are aligned (for example, through the use of alignment layers 40,41) such that when no voltage 46 is applied (FIGS. 2A and 3A), the longitudinal axes of the liquid crystal molecules 38 are substantially parallel to or in the plane of the waveguide 80 and are substantially perpendicular to the propagation direction 67 of light 66. In other words, the angle between the longitudinal axes of the liquid crystal molecules 38 and the plane of the waveguide 80, i.e., the out-of-plane tilt angle, is approximately zero or small, and the angle between the longitudinal axes of the liquid crystal molecules 38 and the propagation direction 67 of light 66 is approximately ninety degrees or generally large.

In this example, as voltage 46 across the electrodes 42,44 is increased (FIGS. 2B and 3B), the liquid crystal molecules 38 will rotate upright, or stated differently, will rotate in a plane defined by the normal to the waveguide 80, thereby increasing the out-of-plane tilt angle. This effect is further depicted in FIGS. 4A-4B which show a sectional view of the waveguide 80 of FIGS. 2-3. In FIG. 4A, when no voltage 46 is applied, the liquid crystals 38 are biased or initially positioned such that their longitudinal axes are generally parallel to the waveguide 80 plane (approximately zero degrees of out-of-plane tilt) and are perpendicular to the propagation of light 66 (approximately ninety degrees of in-plane angle); and in FIG. 4B, when a voltage 46 is applied, the liquid crystals 38 are oriented such that their longitudinal axes generally are perpendicular to the waveguide 80 plane, i.e., the out-of-plane tilt angle is approximately ninety degrees.

By rotating the liquid crystals 38 upwardly as shown in FIGS. 2B and 3B by the application of voltage 46 to the electrodes 42,44, TE polarized light 72 traveling through the waveguide 80 will experience a reduced effective index of refraction/greater OPD/greater OPL, while TM polarized light 74 traveling through the waveguide will experience a greater effective index of refraction/greater OPD/greater OPL.

As shown in FIGS. 2A-B and FIGS. 4A-B, TE polarized light 72 will experience a decrease in the effective index of refraction/OPD/OPL. In FIGS. 2A-B, the electric field vector 56 for TE polarized light 72 is substantially in and parallel to the plane of the waveguide 80. When no voltage 46 is applied to the electrodes 42,44, the longitudinal axes of the liquid crystal molecules 38 will have a significant projection along the electric field of the TE polarized light 72. Stated differently, when the longitudinal axes of the affected liquid crystals 38 are substantially perpendicular to the propagation direction 67 of light 66 traveling through the waveguide 80 (the in-plane angle is approximately ninety degrees) and in the plane of the waveguide 80 (the out-of-plane tilt is approximately zero degrees or small), or the longitudinal axes of the affected liquid crystals 38 are at intermediate stages such that they are not perpendicular to the waveguide 80, then TE polarized light 72 experiences a higher index of refraction within the volume of liquid crystals 38 beneath the electrode 42. This is because the E field 56 of the TE propagating light 72 interacts more strongly with the LC molecules 38 when the long axes of the molecules 38 are parallel to the E field 56.

As the liquid crystal molecules 38 rotate upright in FIG. 2B, thereby increasing the out-of-plane tilt angle, the electric field 56 of the TE polarized light 72 will become largely perpendicular to the longitudinal axes of the molecules 38, and accordingly TE polarized light 72 will experience a reduction in the effective index of refraction/OPD/OPL.

As shown in FIGS. 3A-B, TM polarized light 74 will experience an increase in the effective index of refraction/OPD/OPL as voltage 46 is applied to the electrodes 42,44. In FIGS. 3A-3B, a representation of the electric field 58 vector for TM polarized light 74 is shown. This TM electric field 58 is substantially normal to the plane of the waveguide 80. When no voltage 46 is applied (FIG. 3A), the electric field 58 of the TM polarized light 74 is substantially perpendicular to the long axes of the liquid crystal molecules 38, and accordingly TM polarized light 74 experiences relatively low effective index of refraction/OPD/OPL in this state.

As voltage 46 across the electrodes 42,44 is increased (FIG. 3B) and the liquid crystal molecules 38 rotate upright in a plane defined by the normal to the waveguide 80, this will increase the effective index of TM polarized light 74 because the longitudinal axes of the liquid crystal molecules 38 will have an increasing projection along the electric field 58 of the TM polarized light 74.

In this manner, the optical phase delay/optical path length/ effective index of refraction of TM polarized light 74 may be dynamically increased by increasing the applied voltage 46, and the optical phase delay/optical path length/effective index of refraction of TM polarized light 74 may be dynamically decreased by decreasing the applied voltage 46 or disabling application of the voltage 46 across the electrodes 42,44. At the same time, the optical phase delay/optical path length/effective index of refraction of TE polarized light 72 may be dynamically decreased by increasing the applied voltage 46, and the optical phase delay/optical path length/effective index of refraction of TE polarized light 72 may be dynamically increased by decreasing the applied voltage 46 or disabling application of the voltage 46 across the electrodes 42,44.

A waveguide 90 can be formed so as to provide control of TM polarized light 74 without substantially affecting TE polarized light 72, in accordance with one embodiment of the present invention. In one example as shown in FIGS. 5A-B, FIGS. 6A-B, and in FIGS. 7A-B the liquid crystal molecules 38 are aligned (for example, through the use of alignment layers 40,41) such that when no voltage 46 is applied (FIGS. 5A and 6A), the longitudinal axes of the liquid crystals 38 are substantially parallel to both the plane of the waveguide 90 and the propagation direction 67 of light 66. In other words, the out-of-plane tilt angle and the in-plane angle are approximately zero or small.

In this example, as voltage 46 across the electrodes 42,44 is increased (FIGS. 5B and 6B), the liquid crystal molecules 38 will rotate upright, or stated differently, will rotate in a plane defined by the normal to the waveguide 90. This effect is further depicted in FIGS. 7A-7B which show a sectional view of the waveguide 90 of FIGS. 5-6. In FIG. 7A, when no voltage 46 is applied, the liquid crystals 38 are biased or initially positioned such that their short axes are generally perpendicular to the waveguide 90 plane; and in FIG. 7B, when a voltage 46 is applied, the liquid crystals 38 orient such that their longitudinal axes generally are perpendicular to the waveguide 90 plane, thereby providing an out-of-plane tilt angle that is approximately ninety degrees or generally large.

Figure 5B:
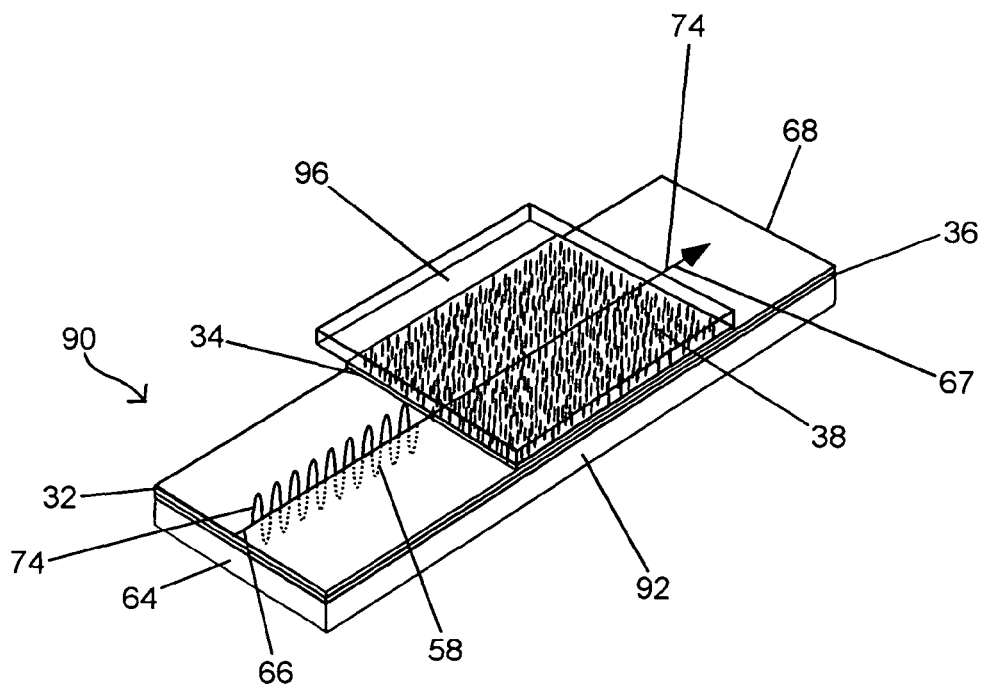
Figure 6A:
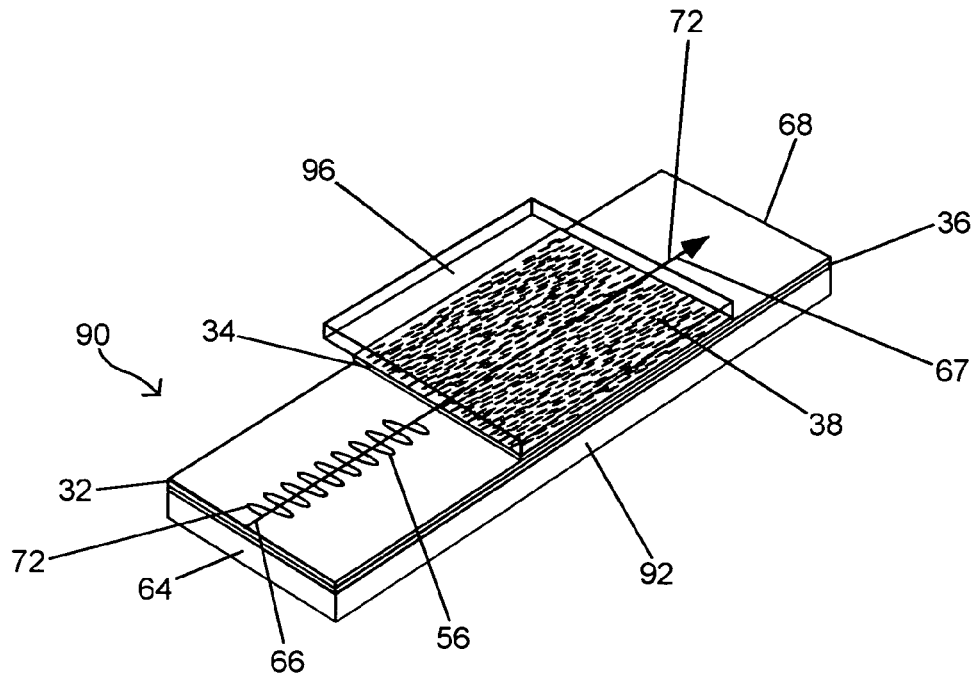
FIGS. 6A-B illustrate the waveguide of FIGS. 5A-B wherein the waveguide has liquid crystals aligned for providing active control of TM polarized light propagation (TE light is shown) as voltage is applied to an electrode in the waveguide, in accordance with an embodiment of the present invention.
Figure 6B:
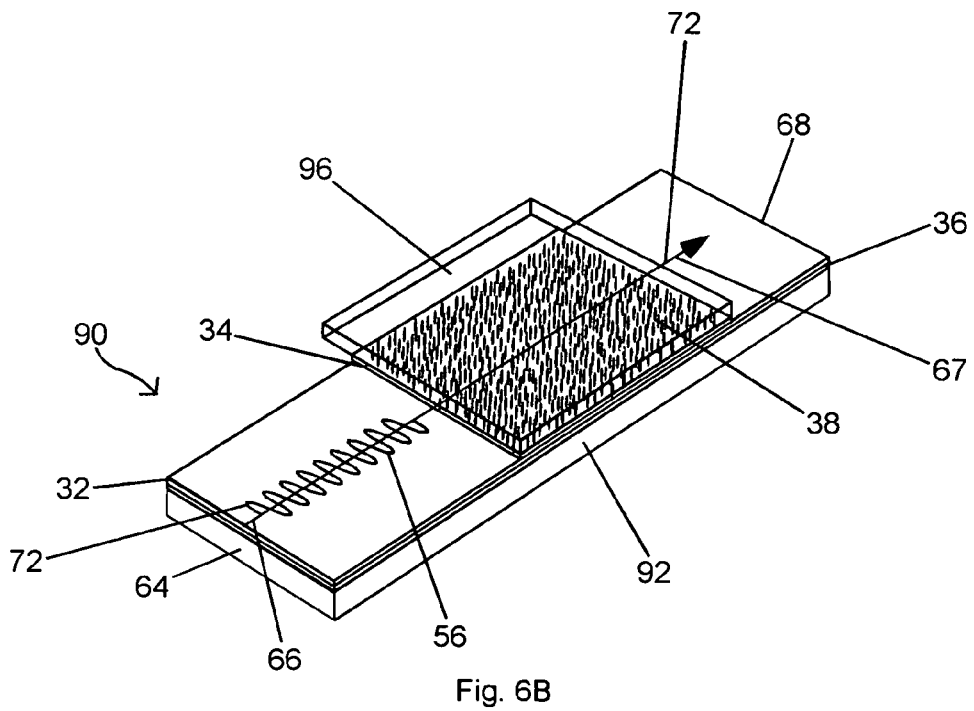
Figure 7A:
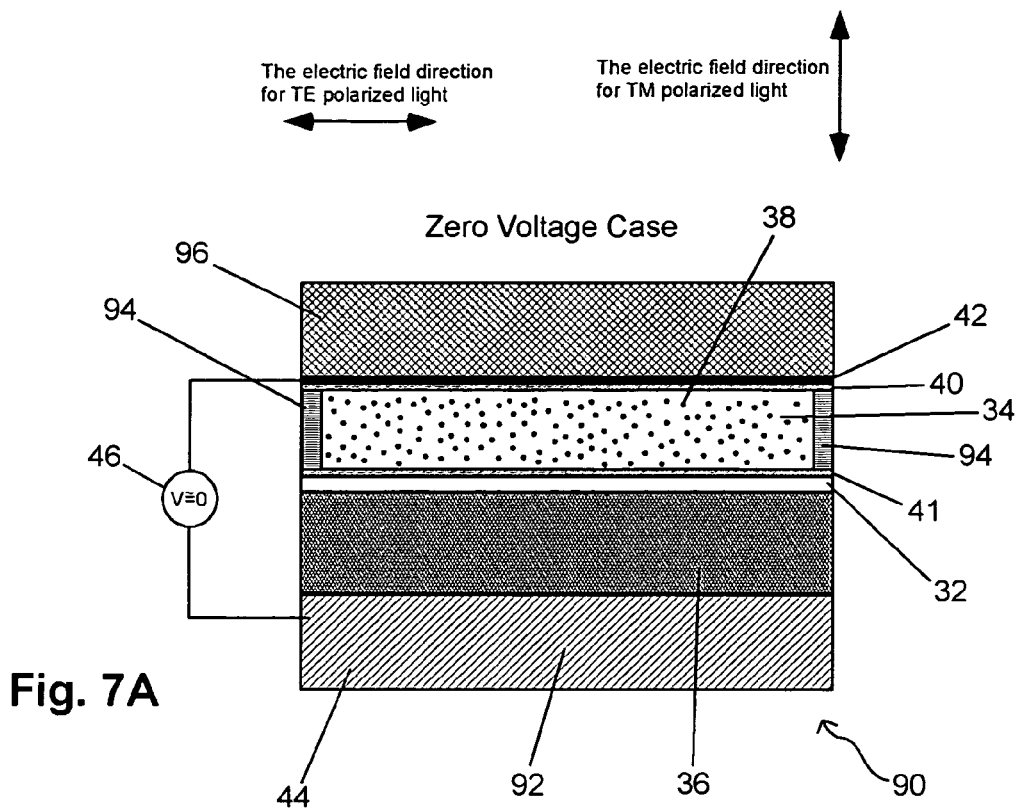
FIG. 7A illustrates a sectional view taken along section lines 7-7 of FIG. 1 for providing active control of TM polarized light propagation, where no voltage is applied across the electrode, in accordance with an embodiment of the present invention.
Figure 7B:
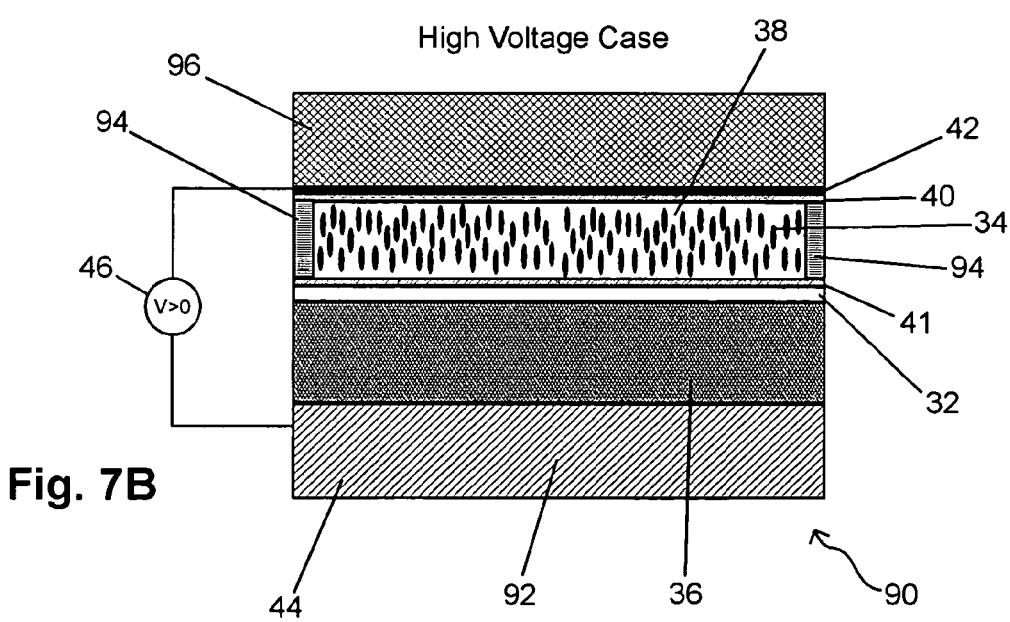
FIG. 7B illustrates a sectional view taken along section lines 7-7 of FIG. 1 for providing active control of TM polarized light propagation, where a voltage is applied across the electrode, in accordance with an embodiment of the present invention.

By rotating the liquid crystals 38 upwardly as shown in FIGS. 5B and 6B by the application of voltage 46 to the electrodes 42,44, TM polarized light 74 traveling through the waveguide 90 will experience a greater effective index of refraction/greater OPD/greater OPL, while TE polarized light 72 will not experience any significant change in the effective index of refraction/OPD/OPL.

In FIGS. 5A-5B, a representation of the electric field vector 58 for TM polarized light 74 is shown. This TM electric field 58 is substantially normal to the plane of the waveguide 90. In this example, when no voltage 46 is applied (FIG. 5A), the electric field 58 of the TM polarized light 74 is substantially perpendicular to the longitudinal axes of the liquid crystal molecules 38, and accordingly TM polarized light 74 initially experiences relatively low effective index of refraction/OPD/OPL in this state.

As voltage 46 across the electrodes 42,44 is increased (FIG. 5B) and the liquid crystal molecules 38 rotate upright in a plane defined by the normal to the waveguide 90, thereby increasing the out-of-plane tilt angle, this will increase the effective index of TM polarized light 74 because the longitudinal axes of the liquid crystal molecules 38 will have an increasing projection along the electric field 58 of the TM polarized light 74.

In this manner, the optical phase delay/optical path length/effective index of refraction of TM polarized light 74 may be dynamically increased by increasing the applied voltage 46, and the optical phase delay/optical path length/effective index of refraction of TM polarized light 74 may be dynamically decreased by decreasing the applied voltage 46 or disabling application of the voltage 46 across the electrodes 42,44.

As shown in FIGS. 6A-B, TE polarized light 72 will not experience any significant change in the effective index of refraction/OPD/OPL. In FIGS. 6A-B, the electric field 56 for TE polarized light 72 is substantially in and parallel to the plane of the waveguide 90.

In this example, when no voltage 46 is applied (FIG. 6A), the electric field 56 of the TE polarized light 72 is substantially perpendicular to the longitudinal axes of the liquid crystal molecules 38, and accordingly TE polarized light 72 initially experiences relatively low effective index of refraction/OPD/OPL in this state.

As the liquid crystal molecules 38 rotate upright in FIG. 6B, thereby increasing the out-of-plane tilt angle, the electric field 56 of the TE polarized light 72 will remain largely perpendicular to the longitudinal axes of the molecules 38, and accordingly TE polarized light 72 will not experience any significant change in the effective index of refraction/OPD/OPL.

FIGS. 4A-B and 7A-B illustrate sectional views of a waveguide (see 30 of FIG. 1) in accordance with one embodiment of the present invention. As shown in FIG. 4A, in one example, a waveguide may include a substrate 92 such as a P-doped silicon substrate or any other conductive material, which provides structural support for the waveguide and also can act as a lower electrode or ground plane 44 to which a voltage 46 may be applied. The substrate 92 may also be formed from any metal, such as silver, copper, aluminum, gold, titanium, etc. Alternatively, the substrate 92 can be nonconductive, such as a glass or crystal, and a conductive coating or electrical ground plane can be applied to the top of the substrate 92 surface, between the substrate 92 and lower cladding 36. This conductive coating can be ITO, Au, Ag, Al, Cu, or any other of a number of conductive coatings. If the substrate 92 is constructed from Si, then circuitry can be directly integrated into the substrate if desired.

A lower cladding layer 36 may be provided on the substrate 92 and is preferably made of any dielectric materials with low absorptions whose index of refraction is less than the index of refraction of the core 32. Suitable materials include Silicon OxyNitride, Silicon-Rich Nitride, Silicon Nitride, Tantalum Pentoxide, Polymers, Pure Silicon, Ion exchange glass on substances such as Lithium Niobate, Sol-Gel, thermally oxidized silicon, glass, quartz, fused silica, etc. Alternatively, the lower cladding 36 may be comprised of a layer stack. Specifically, the lower cladding layer 36 may be constructed from thin layers wherein each layer has a different index of refraction than the layers adjacent to it, for example, interspersed layers of silicon nitride, silicon dioxide and/or silicon oxynitride. Alternately, the sub-layers may be constructed via an ion beam sputtering process, for example, intermixed $SiO_2$ and $Ta_2O_5$ layers. If these sub-layers are suitably thin enough then the overall layer stack may serve as the lower cladding 36.

In one example, the interface between the lower cladding 36 and the core layer 32 is transparent so that light can penetrate the lower cladding 36 as it propagates through the core 32.

On top of the lower cladding 36, a waveguide core or core material 32 may be provided. In one embodiment, the core 32 does not include any liquid crystal material 38 therein. The core 32 may be made of materials such as any dielectric materials with low absorptions whose index of refraction is greater than the index of refraction of the upper and lower claddings. Suitable materials include, but are not limited to, Silicon OxyNitride, Silicon Rich Nitride, Silicon Nitride, Tantalum Pentoxide, Polymers, Pure Silicon, Ion exchange glass on substances such as Lithium Niobate, Sol-Gel, thermally oxidized silicon, glass. The index of refraction for the core may be higher than the index of refraction of the cladding, for example, the index of refraction of the core may be 1.55 or higher. Alternatively, the core 32 may be comprised of a layer stack. Specifically, the core layer may be constructed from thin layers each with their own index of refraction, for example, alternate layers of silicon nitride, silicon dioxide and/or silicon oxynitride. Alternately, the sub-layers may be constructed via an ion beam sputtering process, for example, intermixed $SiO_2$ and $Ta_2O_5$ layers. If these sub-layers are suitably thin enough then the overall layer stack may serve as the core 32.

As an alternative embodiment the core 32 and lower cladding 36 may be constructed in a manner such that the index of refraction varies continuously from the top of the core 32 to the bottom of the lower cladding 36. In this case, it is understood that the core 32 can include the upper region with the higher index of refraction, and the lower cladding 36 can include the lower region with the lower index of refraction. In other words, the transition from the higher index of refraction core 32 to the lower index of refraction cladding 36 may not be discrete, but rather may be a continuous or smooth transition. Furthermore, the index of refraction may vary across the thickness of the core 32 and across the thickness of the lower cladding 36. For example, a core 32 and lower cladding 36 may be constructed from an ion exchange process on a substrate, yielding an index of refraction profile that varies from a higher value at the top or edge of the substrate, to a lower value at a depth within the substrate. In this case, this single region of varying index of refraction serves as both the core 32 and lower cladding 36.

In one example, the core 32 has a thickness that is tapered or includes a channel. Furthermore, a core 32 may have a constant index of refraction, such as 1.55 or higher, along the length of the waveguide 30, or alternatively have an index of refraction that varies across or along the device. On top of the core layer 32, an alignment layer (shown as the lower alignment layer 41 in this example) may be provided which is used to initially align or bias the orientation of liquid crystal material 38 that is proximate to or adjacent to the alignment layer 41 and the core 32. Alignment can be achieved, for example, by buffed polyimide, nylon, or other polymer coating applied to the core and or the cover plate, photo-aligned polyimide, polymer or other photo-aligned material, angle deposited SiO, SiO2 or other angle deposited material, microgrooves etched into the core and or cover plate, ion-buffed surfaces on the core or lower cladding, a dispersed polymer matrix that is photoaligned, or direct buffing of either surface. In one example the alignment layer or layers 40, 41 may include a coating that induces a homeotropic alignment in the liquid crystal. In another example the alignment layer or layers 40,41 may include a coating that induces a homogeneous alignment in the liquid crystal 38. In one example, the lower alignment layer 41 is generally transparent.

On top of the lower alignment layer 41, the upper cladding 34 may be provided having liquid crystal material 38 therein, in this example. In one example, the interface between the lower alignment layer 41 and the upper cladding 34 is transparent. The liquid crystal material 38 may include, but is not limited to nematic gels, nematics with a polymer network (i.e., the liquid crystal itself is a cross-linkable polymer), or any nematic liquid crystal with either a positive dielectric constant or a negative dielectric constant or a mixture of each, polymer dispersed liquid crystal material, Smectic A* and C* liquid crystal material, discotic liquid crystal material, cholesteric liquid crystal material such as ferroelectrics and surface stabilized ferroelectrics, or dual-frequency liquid crystal material, for example. The liquid crystal material may also be a high viscosity material, or be doped with larger molecular weight materials to increase the viscosity. The liquid crystal material may possess any number of a variety of crystal symmetries, for example uniaxial, biaxial, or others. Furthermore, throughout this description, the "short" and "long" or "longitudinal axes" may also refer in general to the liquid crystal director orientation. While the various Figures herein show the liquid crystal material 38 as being nematic liquid crystal with a positive dielectric anisotropy, it is understood that embodiments of the present invention may utilize other types of liquid crystal material 38.

In one example, the upper cladding 34 may be formed using spacer material to define a region or volume wherein liquid crystal material 38 may be contained therein, and optically transparent glue such as Norland 68 may be used to create transparent boundary walls 94 to contain the liquid crystal 38.

On top of the upper cladding 34, an upper alignment layer 40 may be provided to initially align or bias the orientation of liquid crystal material 38 that is adjacent to or proximate to the upper alignment layer 40. As with the lower alignment layer 41, alignment can be achieved, for example, by buffed polyimide coating applied to the core and or the cover plate, photo-aligned polyimide, buffed nylon, buffed PVA, other buffed polymer layers, angle deposited SiO and or $SiO_2$, microgrooves etched or otherwise formed into the core and or cover plate, ion-buffed surfaces on the core or lower cladding, a dispersed polymer matrix that is photoaligned, or direct buffing of either surface. In one example, the upper alignment layer 40 is generally transparent.

The alignment of the liquid crystal 38 between the lower and upper alignment layers 41,40 can be anti-parallel, parallel, twisted, or hybrid between twisted and parallel or anti-parallel. The direction of liquid crystal 38 alignment can be at any angle with respect to the direction 67 of light propagation. Illustrated in FIGS. 4A-B is an alignment layer 41,40 that provides for the longitudinal axis of a nematic liquid crystal 38 to be oriented perpendicular to the direction 67 of light propagation (light is propagating into the plane of the page), thereby providing an in-plane angle of approximately ninety degrees or generally a large value.

On top of the upper alignment layer 40 and below the glass cover 96, an electrode layer 42 or portions of the electrode layer 42 may be provided. In one example, the electrode layer 42 is a conductive coating applied to the bottom surface of the glass cover 96. The conductive coating can include, but is not limited to, ITO, Au, Ag, Al, Cu, or any other conductive coating. In another example, the electrode 42 can be p-doped silicon or any metal, such as silver, copper, aluminum, gold, titanium, alloys, or other conductive material, etc.

The shape of the electrode 42 can be generally rectangular, square, parallelogram or other shape such as disclosed in the co-pending, commonly owned patent application incorporated by reference above.

In one example, a glass cover 96 may be used (optional) and can be made of materials such as, but not limited to, standard display glass such as Corning 1737, fused silica, or any flat surface. Since the evanescent portion of the light does not pass through the cover 96, the cover 96 can be made from non-transparent materials such as silicon wafers, ceramics, or polished metal surfaces. In another embodiment, the cover 96 may be a metal or any other conductive material and serve as the upper electrode 42.

Using the structure of FIGS. 1-7 or variations thereof, various different waveguides 30,80,90 can be formed to selectively and controllably alter the index of refraction for both TE and TM polarized light 72,74 as it passes through the waveguide 30,80,90. When a voltage 46 is applied between the electrode(s) 42 and the substrate 92, an electric field is formed between the electrode 42 and the substrate 96, which induces movement of the liquid crystals 38 in the upper cladding 34 that are subject to the applied electric field. As the liquid crystals 38 move or change their orientation based on the applied voltage 46, the index of refraction of the upper cladding 34 is controllably changed. This can be used to alter the effective index for TE polarized light 72, TM polarized light 74, or both simultaneously.

Preferably, the core layer 32 is surrounded by an upper and lower cladding 34,36, wherein the interfaces between the lower cladding 36 and the core layer 32 and between the upper cladding 34 and the core layer 32 are transparent. As light 66 enters the core layer 32 and propagates through the core 32 along the length of the waveguide 30, 80, 90, the evanescent portion of the propagating light waves penetrate into both the upper and lower cladding 34,36. Preferably, the core layer 32 has a fixed index of refraction, and the lower cladding 36 also has a fixed index of refraction. By providing liquid crystal material 38 within the upper cladding 34, a portion of which is controllably subjected to an electric field between the electrode 42 and the substrate 92, the index of refraction of the upper cladding layer 34 can be controllably altered. Stated differently, the average index of refraction (also referred to herein as the effective index of refraction) of the upper cladding 34, core 32, and lower cladding 36 as experienced by a single TM or TE mode of light 66 in the waveguide 30 can be controllably altered by altering the index of refraction of the upper cladding 34. Hence, as light 66 passes through the waveguide core 32 and upper 34 and lower 36 cladding, the optical phase delay of the light can be controllably altered.

Because the liquid crystal material 38 is disposed within the upper cladding 34 and interacts primarily with the evanescent portion of the light wave and the fundamental portion of the light wave passes through the core 32 material, there is no significant attenuation of the intensity of the light 66 as the light 66 passes through the waveguide 30, 80, 90, which permits the length of the waveguide 30, 80, 90 to be beneficially long to allow large control over the optical phase delay. Conversely, if desired, the upper cladding 34 may have a fixed index of refraction and the lower cladding 36 may be provided with liquid crystal material 38 therein.

Furthermore, the evanescent portion of the light 66 is, in general, preferentially interacting with the liquid crystal molecules 38 that are close to the alignment layer 41. These molecules are more highly ordered than liquid crystal molecules further away from the alignment layer 40,41 and therefore scatter less light. In one example, the losses are sufficiently low (e.g., less than 0.5 dB/cm) that the waveguide length can be lengthy (e.g., 4 inches or greater).

While FIGS. 1-7 show particular arrangements of layers of a waveguide according to one embodiment of the present invention, it is understood that the present invention contemplates variations of this arrangement. For instance, the conductive lower electrode 44 may be positioned at different layers within the waveguide if desired. Further, while two alignment layers 40,41 are shown, it is believed the invention may be implemented using a single alignment layer. While the liquid crystal material 38 is shown as disposed within the upper cladding 34, it is understood that the liquid crystal material 38 may be disposed in the lower cladding 36 if desired.

It is understood that the embodiments of FIGS. 2-7 may be used, if desired, to control polarized light such as TE or TM light. In another example, light that is polarized at 45° with respect to the plane of the waveguide may be introduced into a waveguide 30, 80, 90 in accordance with embodiments of the invention. This light may be expressed as equal TE and TM components that are exactly in phase. As the light travels through the waveguide 30, 80, 90, the different indices of refraction for the TE and TM components will create an optical phase delay between the two components. As the applied voltage 46 is controllably altered, the optical phase delay between the TE and TM components can be controllably altered.

In the embodiments of FIGS. 2-3, since with application of voltage 46 the TE index decreases while the TM index increases, the total optical phase delay can be altered to a greater extent than if only one of the indices were altered. In this manner, the optical phase delay between TE and TM polarization that may be realized is greater than the optical phase delay of only the TE component or only the TM component.

Another method of achieving TE modulation in a waveguide geometry similar to FIGS. 1-7 is to use smectic liquid-crystal materials 38 exhibiting the electroclinic effect. These materials may rotate about an axis containing the applied electric field vector, altering the effective index of TE light while leaving the effective index of TM polarized light relatively unaffected. In other words, the in-plane rotation angle may be controllably altered without substantially altering the out-of-plane tilt angle.

Figure 8:
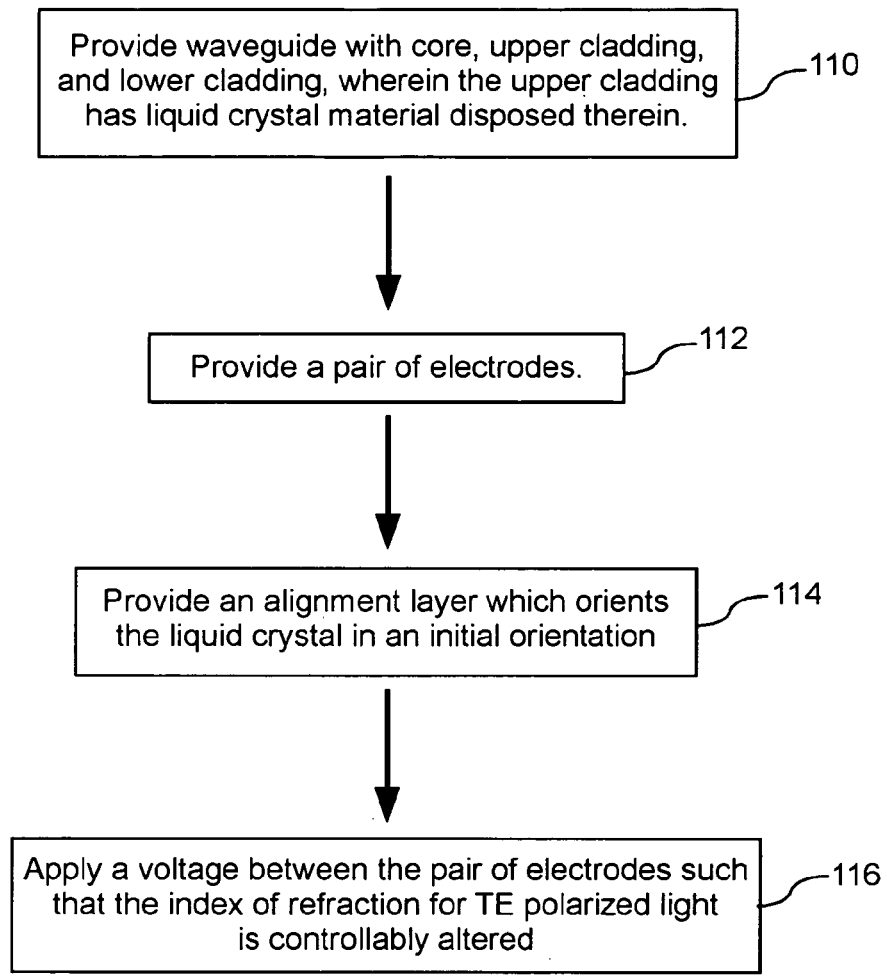
FIG. 8 illustrates an example of operations for controlling the propagation of TE polarized light through a waveguide, in accordance with one embodiment of the present invention.

FIG. 8 illustrates an example of operations for controlling the index of refraction of TE polarized light through a waveguide, in accordance with one embodiment of the present invention. At operation 110, the waveguide is provided with a core, an upper cladding, and a lower cladding where in one example the upper cladding has liquid crystal material disposed therein. Alternatively, liquid crystal material may be disposed within the lower cladding if desired. At operation 112, a pair of electrodes is provided for controlling the orientation of the liquid crystal material proximate the electrode pair. In one example, a substrate material of the waveguide is electrically conductive and acts as a lower electrode or ground plane so that a controlled voltage can be applied between the upper electrode and the substrate to create an electric field therebetween.

At operation 114, at least one alignment layer is provided to align the liquid crystal material proximate the core. For instance, a lower alignment layer (such as 41 in FIGS. 4A-B) can be provided to initially align or bias the liquid crystals within the upper cladding and adjacent to the lower alignment layer. By providing the alignment layer, the liquid crystal material responds to an applied voltage in a faster and more orderly and predictable manner. Further, when no voltage is applied to the liquid crystal material, the alignment layer provides sufficient liquid crystal ordering to minimize scattering of the light propagating through the waveguide because the evanescent portion of the light interacts primarily with the highly ordered liquid crystal molecules along the alignment layer.

In one example, operation 114 provides an initial alignment/orientation of liquid crystal molecules in the plane of the waveguide, with zero or small out-of-plane tilt angle, and perpendicular to the propagation direction of light, with ninety degrees or a large value for the in-plane angle. In another example, operation 114 provides an initial alignment/orientation of liquid crystal molecules in the plane of the waveguide, with zero or a small out-of-plane tilt angle, and parallel to the propagation direction of light, with zero or a small in-plane angle. In another example, operation 114 provides an initial alignment/orientation of liquid crystal molecules perpendicular to both the plane of the waveguide and the propagation direction of light, i.e., both the out-of-plane tilt angle and the in-plane angle are approximately ninety degrees or generally a large value.

At operation 116, a voltage is applied between the pair of electrodes in order to change the effective index of refraction for TE polarized light. By altering the refraction of the liquid crystal material between the electrode pair a modulation index or change in the index of refraction for TE polarized light is achieved. As the modulation index increases, the amount of optical phase delay for TE polarized light also increases, which permits active, solid state control of the optical path length of TE polarized light passing through the waveguide.

Figure 9:
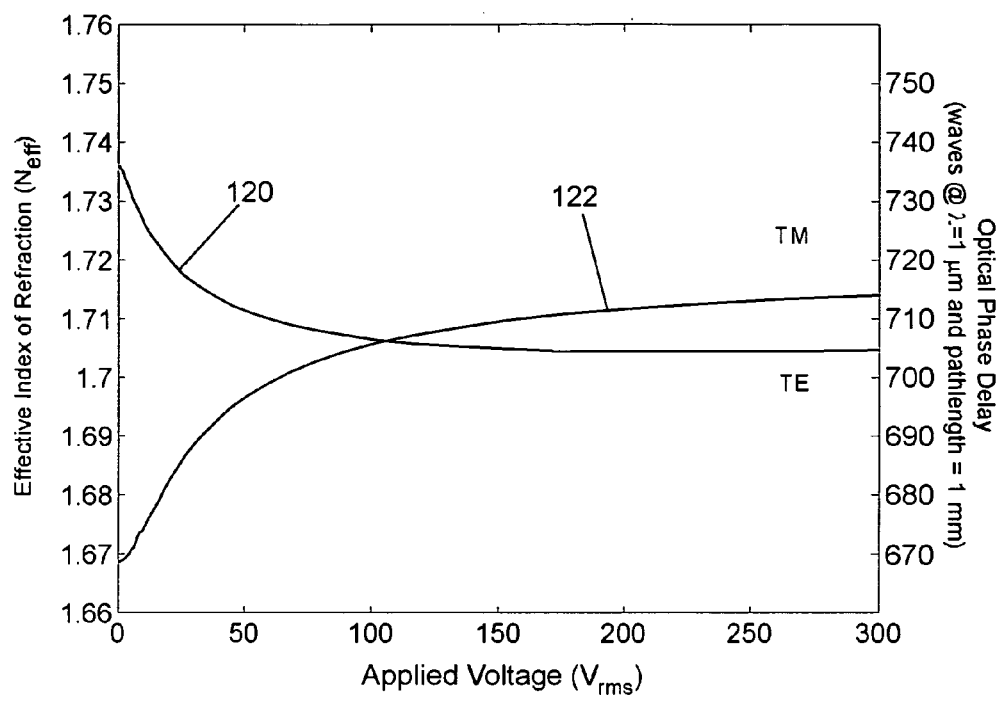
FIG. 9 illustrates changes in effective indexes of refraction (left scale) and optical phase delays (right scale) for TE and TM light for an example of a waveguide wherein the indices are equal at a certain applied voltage, in accordance with one embodiment of the present invention.

FIG. 9 shows an example graph where the effective indexes of refraction for TE and TM polarized light converge at a given voltage. In another example of the present invention, the dimensions and thickness of the waveguide layers may be chosen such that the TE and TM indices of refraction 120,122 are not substantially different.

Also shown in FIG. 9 is the optical phase delay for TE and TM polarized light. The optical phase delay that is plotted in FIG. 9 is the difference between the optical phase of light that has traveled through 1 mm of free space, wherein the index of refraction is equal to one, and the optical phase of light that has traveled through 1 mm of waveguide, wherein the index of refraction may be controlled with a voltage. In this example, the wavelength of light is 1 gm, and the optical phase delay is plotted in waves. Furthermore, for this example, at voltages of less than approximately 100 volts, the optical phase delay of TE polarized light is greater than the optical phase delay of TM polarized light. In the region of approximately 100 volts the optical phase delay of TE polarized light is similar to the optical phase delay of TM polarized light. For voltages greater than approximately 100 volts the optical phase delay of TM polarized light is greater than the optical phase delay of TE polarized light, in this example.

The difference between the TE effective index 120 and the TM effective index 122 is referred to as the waveguide birefringence. Contributions to the birefringence include the geometric birefringence, due to the waveguide geometry, and material birefringence, such as the birefringence of the liquid crystal.

The geometric birefringence arises from the asymmetry that is typically inherent to planar or channel waveguides. Generally, the smaller the waveguide dimensions, such as the thickness of the core layer, the larger the geometric birefringence, and vice versa. For example, if the waveguide core were very thick (e.g. much thicker than the wavelength of light) then the core would appear to the light as a bulk material. In other words, for light that is guided within a planar core the dimensions out of the plane of the waveguide would appear similar to dimensions in the plane of the waveguide. In this case, the geometric birefringence would be relatively small. Alternatively, if the core thickness of a planar or slab waveguide were sufficiently small (e.g. less than a wavelength of light) then the geometric birefringence would be larger. This may be qualitatively understood since this thinner core would then appear very different in one dimension (e.g., out of the plane of the waveguide) as compared to another dimension (e.g., in the plane of the waveguide).

In another example, the geometric waveguide birefringence may be controllably altered by choice of indices for the waveguide layers. For example, if the core layer is chosen to have a substantially different index than either the lower or upper cladding layers, then the geometric birefringence is generally increased. The difference between the core and cladding indices may be referred to as the index contrast. For a higher index contrast waveguide, the light is more tightly confined, and therefore the asymmetry between the out-of-plane dimension (tight confinement) and the in-plane dimension (no confinement for a slab and weak confinement for a channel) is greater. The geometric birefringence is therefore commensurately greater as well. Alternatively, a lower index contrast waveguide will provide a lower geometric birefringence.

Therefore, the magnitude of the waveguide geometric birefringence may be controllably altered by choice of waveguide dimensions and indices.

The material birefringence arises from the birefringence of the different waveguide layers. This birefringence may be independent of waveguide dimensions. For example, the liquid crystal cladding layer has a material birefringence that is not generally dependent on the thickness of any of the waveguide layers. Rather, the material birefringence of the liquid crystal cladding layer may be dependent on the direction of liquid crystal alignment, i.e., the magnitude of the out-of-plane tilt angle and the in-plane angle, and the magnitude of applied voltage.

The material birefringence may be of the same sign as the geometric birefringence, or it may be of the opposite sign. If the material birefringence is of the same sign, then it will add to the geometric birefringence and increase the total waveguide birefringence. Alternatively, if the material birefringence is of the opposite sign as the geometric birefringence, then it will subtract from the material birefringence and lower the total waveguide birefringence. The waveguide can be designed for a sufficiently small geometric birefringence, for example, by increasing the core thickness or decreasing the core index relative to the cladding indices. In such cases there may be a voltage at which the material birefringence of the liquid crystal material can cancel the geometric birefringence, and the TE index 120 will equal the TM index 122.

Shown in FIG. 9 are theoretical calculations for the voltage dependence of both the TE and TM modes in an LC waveguide where the liquid crystal is aligned parallel to the waveguide surface (homogeneous) but perpendicular to the direction of light propagation. The calculations are for a slab or planar waveguide with a core index of 1.85 and a lower cladding index of 1.45. The calculation wavelength is 1.55 microns. The core thickness is 600 nanometers. The liquid crystal is MLC6621, which is available from Merck Chemical Co. The pretilt, which is the initial out-of-plane tilt angle, of the LC was set to 3 degrees, and a surface anchoring energy of $1\times10^{-3}$ erg/cm$^2$ was used, both of which are suitable for a buffed polyimide alignment. The director profile as a function of voltage was calculated, and at each voltage the effective index of the zeroth guided mode was calculated for both the TE and TM modes. In this example, for voltages near 100 volts the TE and TM modes have the same or nearly the same effective index.

Figure 10:
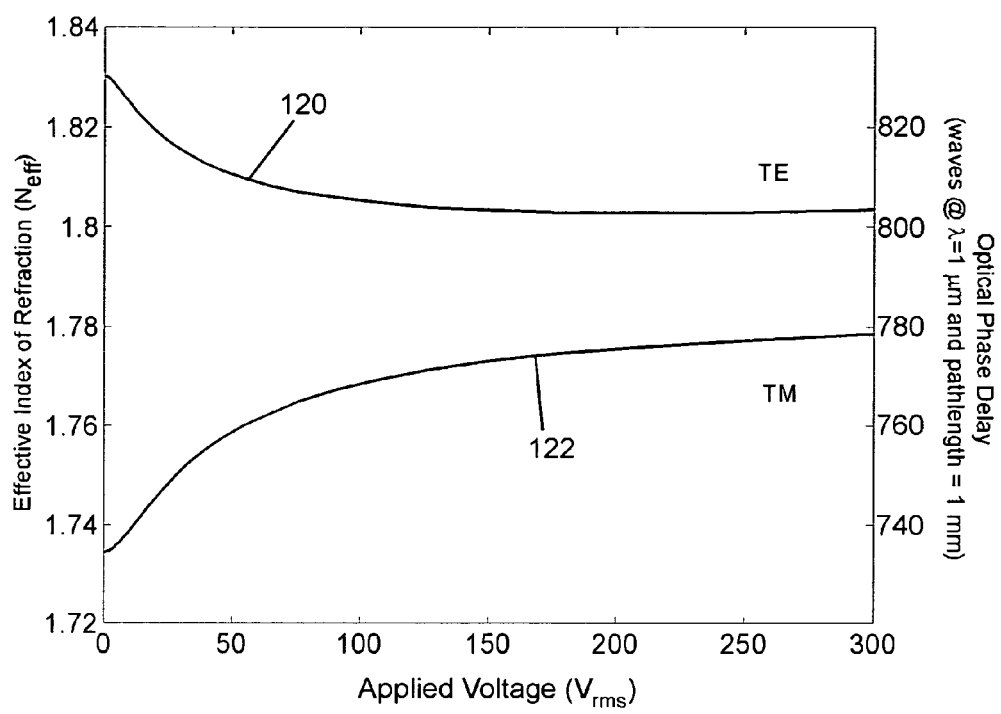
FIG. 10 illustrates changes in effective indexes of refraction (left scale) and optical phase delays (right scale) for TE and TM light for an example of a waveguide wherein the indices are never equal regardless of applied voltage, in accordance with one embodiment of the present invention.

When two modes within a waveguide (e.g., TE and TM) have the same or nearly the same effective index, they may be referred to as phase matched or momentum matched. In this case, optical power may flow from one mode into the other (i.e., from TM into TE, or from TE into TM). For the example of FIG. 9, at voltages near approximately 100 volts, the TE mode and the TM mode are phase or momentum matched, and therefore optical power may flow from one to the other. This may be used as a voltage controllable TE-to-TM or TM-to-TE mode converter. To ensure that a mode-conversion voltage exists, the waveguide may be designed such that the geometric birefringence is sufficiently small enough (i.e., through either a lower index contrast waveguide or a thicker core layer, or a combination of both) and the material birefringence of the liquid crystal cladding is sufficiently large enough such that a voltage exists wherein the material birefringence is of the same magnitude but opposite sign to the geometric birefringence. FIG. 10 illustrates an example graph where the effective indexes of refraction for TE and TM light do not converge. Also shown in FIG. 10 is the optical phase delay for TE and TM polarized light. The optical phase delay that is plotted in FIG. 10 is the difference between the optical phase of light that has traveled through 1 mm of free space, wherein the index of refraction is equal to one, and the optical phase of light that has traveled through 1 mm of waveguide, wherein the index of refraction may be controlled with a voltage. In this example, the wavelength of light is 1 μm, and the optical phase delay is plotted in waves. Furthermore, in this example, the optical phase delay of TE polarized light is always greater than the optical phase delay of TM polarized light.

Numerous applications are designed to work on only one polarization (e.g., TE or TM) and therefore TE-to-TM or TM-to-TE mode conversion is undesirable in such applications. Hence, in one embodiment, a waveguide may be formed so that TE-to-TM or TM-to-TE mode conversion is negligible. This may be accomplished by utilizing a liquid crystal waveguide structure such that for all operational voltages, the TE effective index is never equal to the TM effective index. Specifically, the geometric birefringence may be increased by either increasing the index contrast of the waveguide or decreasing the thickness of the core. As an example of a liquid crystal waveguide design that is free from a TE/TM phase matching voltage, FIG. 10 illustrates the theoretical effective indices of TE and TM light as a function of voltage, in a manner analogous to FIG. 9, except that the core index has been increased to 2 and the core thickness has been decreased to 500 nanometers. The calculations were conducted for light at a wavelength of 1550 nm. Since the geometric birefringence is greater than the material birefringence for all voltages, there is never any TE-to-TM or TM-to-TE mode conversion. In this way, a liquid crystal waveguide may be constructed that both (i) controllably and simultaneously alters the effective index for both TE and TM polarizations and (ii) preserves the amount of optical power in either the TE or TM mode. If only TE polarized light is input into the liquid crystal waveguide, then only TE light will emerge at the output, and likewise for TM polarized light.

In one example, to create a liquid crystal waveguide that is free of TE-to-TM mode conversion voltages and free of TM-to-TE mode conversion voltages, the geometric birefringence may be made to be suitably large (geometric birefringence may be increased either by increasing the index contrast of the waveguide, or by decreasing the thickness of the core layer, or a combination thereof) such that for a given liquid crystal birefringence, over an operational voltage range, the effective index for TE is always larger than the effective index for TM.

In the previous example the voltage tunable optical phase delay between TE polarized light and TM polarized light is increased by nearly a factor of two over a design that would only tune the TE optical phase delay or only tune the TM optical phase delay. In other words, as shown in FIG. 10, the effective index for TE polarized light 120 is decreased with increasing voltage whereas the effective index for TM polarized light 122 is increased with increasing voltage. This means that as the speed of propagation of TE polarized light is decreased, the speed of propagation of TM polarized is simultaneously increased. These effects add to provide for a larger TE vs. TM optical phase delay. This is beneficial for applications such as interferometry, Fourier transform spectroscopy, optical coherence tomography, and others. In these applications it is generally problematic to have TE-to-TM or TM-to-TE mode conversion. As discussed, this may be avoided by constructing the liquid crystal waveguide such that the waveguide geometric birefringence is larger than the waveguide material birefringence for all operational voltages.

Example

Described below is one example of a liquid crystal waveguide in which the waveguide was designed to provide for increased tunability of the TE vs. TM optical phase delay, and this is described as an example only. Furthermore, the waveguide was designed such that for all voltages of operation, the geometric birefringence was larger than the material birefringence. It is understood that this example is provided for illustrative purposes only, and does not limit the scope of embodiments of the present invention. In one example, a waveguide device may be formed utilizing a heavily p-doped silicon wafer, with both sides polished, as the lower electrode. Upon the p-doped silicon wafer, a thermally oxidized lower cladding can be grown with a thickness of 2±0.05 microns. The lower cladding refractive index at a wavelength of 1550 nanometers was 1.445±0.001 as measured by a broadband ellipsometer. A SiOxNy guide layer or core was applied over the lower cladding by plasma enhanced chemical vapor deposition to a thickness of 651 nanometers. The ratio of Ox to Ny in SiOxNy was adjusted during the deposition process to create a core with a refractive index of 1.9 at a wavelength of 633 nanometers. Identical coatings were applied to both sides of the wafer in order to balance stresses, and therefore mitigate warping or bending of the wafer. These stresses are a result of the plasma enhanced chemical vapor deposition process.

Once complete, the wafer was diced into smaller 10 millimeter by 25 millimeter parts. Each diced part was then coated with an alignment film approximately 120 angstroms in thickness. The alignment film was used to create the homogeneous orientation of the liquid crystal upper cladding. The film was produced by spin coating an 8:1 mixture of Nissan polyimide varnish solvent type 21 to Nissan polyimide Grade 2170 filtered at 0.2 microns at 3000 rpm. The same spin coating process was performed on the cover plate, which was made of 0.7 millimeter thick 1737 corning display glass coated on one side with an indium tin oxide (ITO) film to produce a 100 ohms/square conductive layer used for the upper electrode.

Once both the wafer and the cover glass were coated, the polyimide was imidized by baking in an oven at 200 degrees celsius for approximately 1 hour. The polyimide coatings were mechanically buffed with a dense piled cloth to induce preferential alignment perpendicular to the direction of light propagation in the waveguide. In other words, the buffing direction was chosen to provide for an initial liquid crystal orientation such that the in-plane angle between the longitudinal axes of the liquid crystal molecules and the direction of light propagation will be approximately ninety degrees or generally a large value. The liquid crystal upper cladding layer was formed by spacing the glass window from the diced wafer parts with 5-micron borosilicate glass spacers immersed in an ultra-violet curing adhesive Norland 68.

Approximately 1-millimeter dots of the spacing mixture were placed at the four corners that created the cell gap for the liquid crystal to be disposed therein. The cover plate was attached to the rest of the waveguide so as to create an anti-parallel alignment layer between the cover glass and the waveguide core. Furthermore, this alignment layer adjacent to the waveguide core was such that the liquid crystals will be initially aligned in the plane of the waveguide (an out-of-plane tilt angle of approximately between three and five degrees) and perpendicular to the propagation of light (an in-plane angle of approximately ninety degrees), such as shown in FIG. 2A.

The cell gap was then exposed to 365 nanometer light until fully cured. Straight Norland 68 was used to backfill via capillary action the remaining exposed edges making up the cell gap. A one-millimeter opening, or fill hole, was left. E7 liquid crystal, obtained from Merck Chemical Co., was then introduced to the opening and allowed to fill the cell gap via a combination of capillary force and back pressure. The E7 liquid crystal, which is a positive dielectric nematic, is initially aligned substantially in the plane of the waveguide, with an out-of-plane tilt angle approximately between three and five degrees, and substantially perpendicular to the propagation of light, with an in-plane angle of approximately ninety degrees, such as shown in FIG. 2A. Once filled, the hole was plugged by using Norland UVS-91 visible-uv curing adhesive. Wires were then attached to the upper electrode and lower electrode using conductive epoxy.

Operation of the waveguide included coupling light into and out of the waveguide by means of end-fire coupling. Equal amounts of TE and TM light were introduced into the TE0 and TM0 modes of the waveguide. Amplitude modulated 5 KHz square-wave drive voltages were applied to change the optical phase delay between TM and TE polarized light. To measure this change in relative optical phase delay, a 45-degree polarizer was used to interfere the TE and TM light.

Table 1 shows experimental data of TE vs. TM optical phase delay (OPD) as a function of voltage. The liquid crystal interaction length was 2.9 cm long, with no appreciable loss detected. The liquid crystal was aligned perpendicular to the light propagation direction and in the plane of the waveguide (homogeneous). This liquid crystal orientation provides for simultaneous tuning of both the TE effective index and the TM effective index. A core index of 1.9 and a core thickness of 651 nm provide a geometric birefringence sufficient enough to avoid any TE-to-TM or TM-to-TE coupling voltages at light wavelengths of 1440 nm. No TE to TM coupling was observed. This was verified by inputting only TE light or only TM light and then monitoring the polarization state of the light output for all voltages. The voltage tunable optical phase delay at 175 volts was greater than 1 mm, which provides a viable replacement for mechanical mirror translation or other conventional light control means. With increased interaction length, for instance with a longer waveguide, this voltage tunable optical phase delay could be further increased.

TABLE 1

OPD achieved at various Voltages

| Voltage (RMS) | OPD between TE and TM modes | |
|---|---|---|
| | OPD in waves @ 1.44 μm | OPD in mm |
| 0.0000 | 0.0000 | 0.0000 |
| 4.2000 | 19.0000 | 0.0253 |
| 8.7000 | 98.0000 | 0.1303 |
| 22.6000 | 283.0000 | 0.3764 |
| 45.6000 | 458.0000 | 0.6091 |
| 90.0000 | 623.0000 | 0.8286 |
| 175.0000 | 752.0000 | 1.0002 |
| 325.0000 | 821.0000 | 1.0919 |

While FIGS. 1-10 illustrate examples of the present invention, it is understood that the principles of the present invention could be employed in other arrangements of liquid crystal waveguides, and such examples are illustrated in FIGS. 11-12, 13, 14, 15-16.

In FIGS. 11-12, an alternative embodiment of a waveguide 130 is illustrated in accordance with one embodiment of the present invention. This embodiment may be used to control TE polarized light (without significantly affecting TM polarized light).

The waveguide 130 controllably alters an optical phase delay of light 132 traveling along a propagation direction 67 through the waveguide. The waveguide 130 can also controllably alter an effective index of refraction of the waveguide. In one example, the waveguide 130 may include a core 136 for guiding the light 132 through the waveguide 130; at least one cladding, such as upper cladding 164, adjacent the core 136 wherein the at least one cladding 164 has liquid crystal molecules 152 disposed therein; at least one alignment layer 156 positioned between the at least one cladding 164 and the core 136, the alignment layer 156 initially aligning at least a portion of the liquid crystal molecules 152 in an initial orientation (such as in FIG. 12A); and a pair of electrodes 138, 140 for receiving a voltage 142, the pair of electrodes 138, 140 being positioned adjacent the core 136. In one embodiment, as the voltage 142 is applied to the pair of electrodes 138, 140, an electric field (represented by electric field lines 157 in FIG. 12C) is created between the electrodes 138, 140 and through a portion of the at least one cladding 164, a portion of the electric field 157 being oriented substantially parallel to a plane, surface, or layer of the waveguide 130 so that the alignment of at least a portion of the liquid crystal molecules 152 changes from the initial orientation to a second orientation (such as in FIGS. 12B-C), thereby changing the optical phase delay for the light 132 traveling through the waveguide 130.

In one example, light 132 (also shown as 66 in other embodiments) propagates in a direction 67 in the plane of the waveguide. The plane of the waveguide is generally parallel to the layers within the waveguide, which may include (depending on the implementation) the lower cladding, substrate layers, alignment layers, or core layer.

In this example, the guided light 132 is confined to a channel 134 in the waveguide core layer 136, and a pair of electrodes 138,140 are placed adjacent to this channel 134 on opposing sides thereof and along the length of the channel 134 (rather than above and below the liquid crystal cladding 152). The channel 134 provides lateral guiding of the light 132, and may be formed by means of an inverted ridge or groove in the core layer 136. The channel 134 preferably extends along the length of the waveguide 130, and may generally define a rectangular slot or recess in the waveguide core layer 136.

The electrodes 138,140, which in one example may be generally rectangular, may be formed by depositing a thin conductive film, such as ITO, gold, aluminum, etc. and then photo-lithographically removing the conductive film in regions other than the desired electrodes 138,140. The electrodes 138,140 may be placed sufficiently far away (e.g. 5 microns) from the waveguide channel 134 so as not to attenuate the guided light 132. Application of voltage 142 on these electrodes 138,140 produces an electric field (see FIG. 12C) that includes field lines that are substantially parallel to the surface or plane of the waveguide 130 and perpendicular to the length of the channel 134 as well as perpendicular to the propagation direction 67 of light 132 through the waveguide 130.

In FIGS. 12A-B, a positive dielectric nematic liquid crystal 152 has been initially aligned parallel to the light 132 propagation direction 67 (FIG. 12A), thereby providing an in-plane angle of approximately zero or a generally small value. It is understood that other liquid crystals, such as Smectic C*, Smectic A*, nematics with a negative dielectric anisotropy, or others could be utilized. These liquid crystals could be aligned in either a homeotropic or homogeneous configuration.

FIG. 12A illustrates the zero voltage 142 case, where both TE and TM polarized light see the short axis of liquid crystal molecules 152, hence both TE and TM polarizations experience a relatively lower index of refraction (when compared to the case when voltage is applied as in FIG. 12B).

Figure 12C:
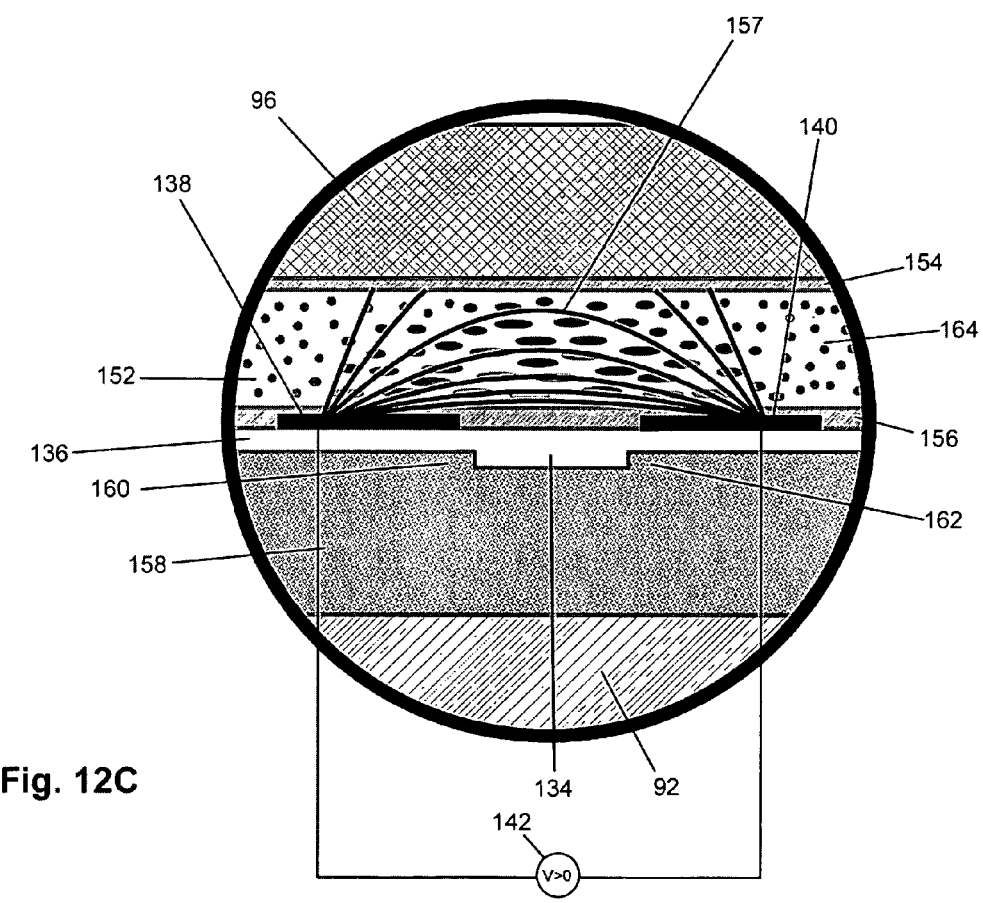
FIG. 12C illustrates an expanded view of FIG. 12B, showing examples of electric field lines when a voltage is applied between the electrodes, in accordance with one embodiment of the present invention.

FIG. 12B illustrates where a voltage has been applied across the adjacent electrodes 140,142. In response to the applied voltage 142, the liquid crystal molecules 152 align with the applied electric field (FIG. 12C) by rotating in the plane of the waveguide 130 and perpendicular to the light propagation direction 67. In other words, the in-plane angle of the liquid crystal molecules 152 increases, whereas the out-of-plane tilt angle remains generally unaltered. The molecules 153 closest to the core layer 136 experience the strongest electric field, and therefore are rotated the most. These are also the molecules 153 that are in the strongest portion of the evanescent field of the guided light passing through the waveguide. In a high voltage case, TE polarized light will experience a larger index of refraction, while the index of refraction for TM polarized light will not be substantially changed. In this way, the index of refraction (and therefore the optical phase delay) of TE polarized light can be independently controlled.

In one example, the channel 134 is generally rectangular and extends along the length of the core. The channel 134 may be formed as a recess, notch or groove along the top surface of the lower cladding 158, as shown in FIGS. 12A-B, wherein the sides of the channel 134 may be defined by cladding walls 160,162. In this configuration the channel 134 is also referred to as an inverted ridge 134 or inverted top hat core structure. This configuration has the benefit of a flat or smooth upper surface, i.e., the topside of the core 136 that is adjacent to the alignment layer 156 is free from channel topology. This avoids any potential problems associated with the channel 134 topology impacting the alignment of the liquid crystal material 153 that is adjacent the channel 134.

In another example, the channel may be implemented along the top surface of the core 136. This type of core structure may be referred to as a top hat or ridge structure. In this case the topology of the channel 134 may protrude into the alignment layer 156 and the liquid crystal material 153. A potential drawback is that this topology may impact the alignment of the liquid crystal material 153, which in turn may lead to increased scattering of the guided light or other undesirable effects.

The construction of the waveguide 130 and its alignment layers 154,156 may be as previously described. The construction of the inverted ridge channel 134 may be done via a variety of photolithography processes. In one example, the inverted ridge or channel 134 may be formed by a combination of thermal oxide, low pressure chemical vapor deposition, and ion beam sputtering. A layer of thermal oxide may be grown in a p-doped Si wafer. This layer may be four microns thick, in one example, or other thicknesses to serve as the lower waveguide cladding 158. On top of the thermal oxide, a thin layer of silicon nitride may be deposited via low vapor pressure chemical vapor deposition. In one example, this layer may be 40 nm thick. This layer may then be etched away in a photo-lithographically determined pattern, such that all or part of the remaining silicon nitride layer may define the inverted ridge 134. A layer of silicon dioxide may be applied, for example via a low pressure chemical vapor deposition process. This will define the side cladding 160,162 adjacent to the inverted ridge 134. At this point a chemical-mechanical-polish (CMP) may be performed to define a smooth top layer, upon which a core slab portion or core layer 136 will be deposited. The slab portion 136 of the core 136, 134 may be a tantalum pentoxide layer deposited by an ion beam sputtering process. The ridge 134 depth and width may be chosen to provide for single mode lateral guiding. As one example, the ridge 134 depth may be 40 nm, and the width may be 3 microns. In another embodiment, a top-hat or top-ridge channel geometry may be employed in place of an inverted ridge channel, although the topology of a top-hat channel may interfere with the liquid crystal 152 alignment which may subsequently lead to scattering losses.

It is also understood that Smectic materials could be utilized in the embodiments of FIGS. 11-12. For example, Smectic C* or Smectic A* liquid crystals could be provided in a homeotropic alignment. Application of voltage 142 to the electrodes 160,162 may then be used to provide for TM control.

In this embodiment of FIG. 12, the liquid crystals 152 are disposed within the upper cladding 164. It is understood that the liquid crystal material 152 could be disposed within the lower cladding 158, and if desired the alignment layers 154, 156 could be placed on the upper and lower surfaces of the lower cladding 158 having the liquid crystal material 152 therein.

Figure 13A:
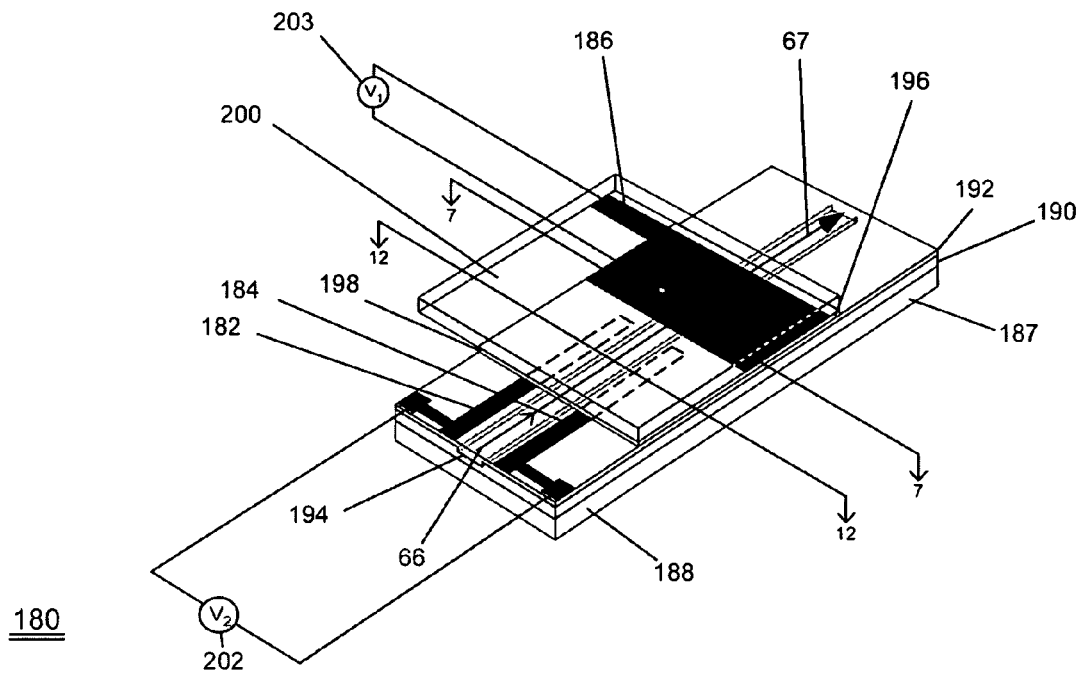
FIG. 13A illustrates an example of a waveguide having two sets or regions of electrodes for simultaneous and/or independent control of light propagation over both TE and TM polarizations of light, in accordance with an embodiment of the present invention.
Figure 13B:
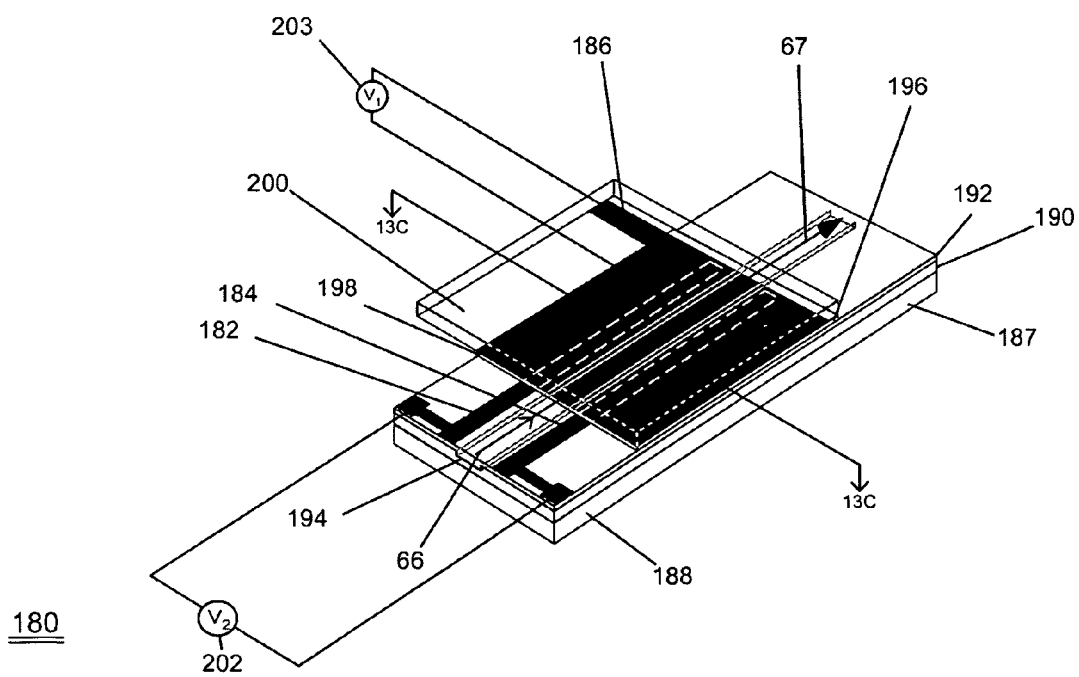
FIG. 13B illustrates an example of a waveguide having two sets or regions of electrodes for simultaneous and/or independent control of light propagation over both TE and TM polarizations of light, in accordance with an embodiment of the present invention.
Figure 13C:
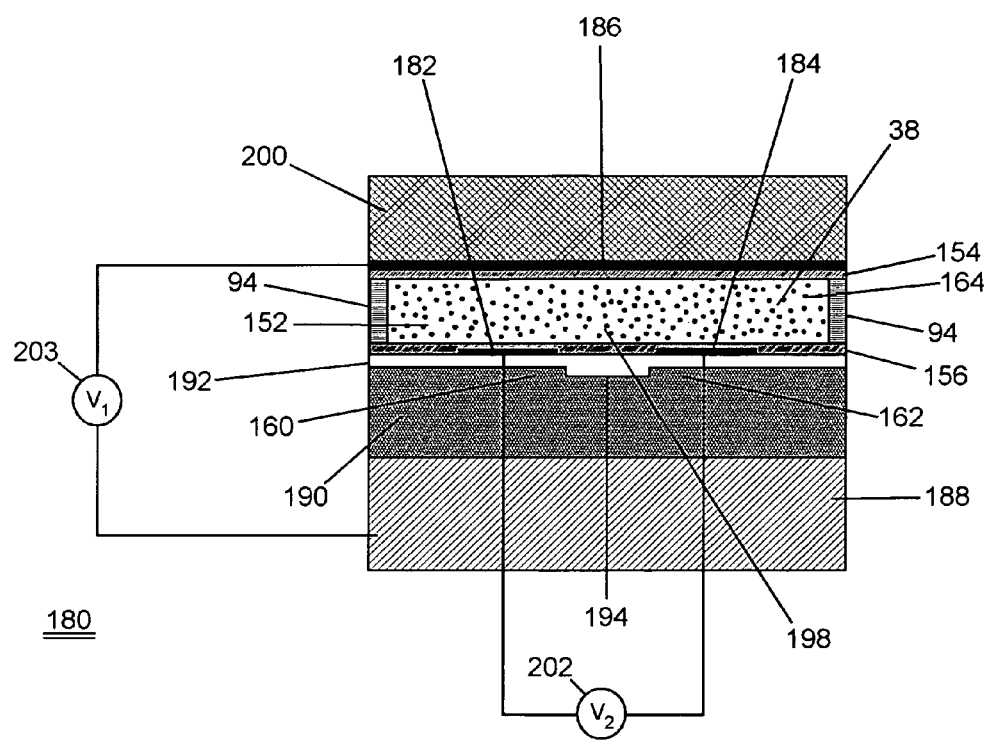
FIG. 13C illustrates a sectional view of the waveguide of FIG. 13B taken along section lines 13C-13C of FIG. 13B, in accordance with one embodiment of the present invention.
Figure 14A:
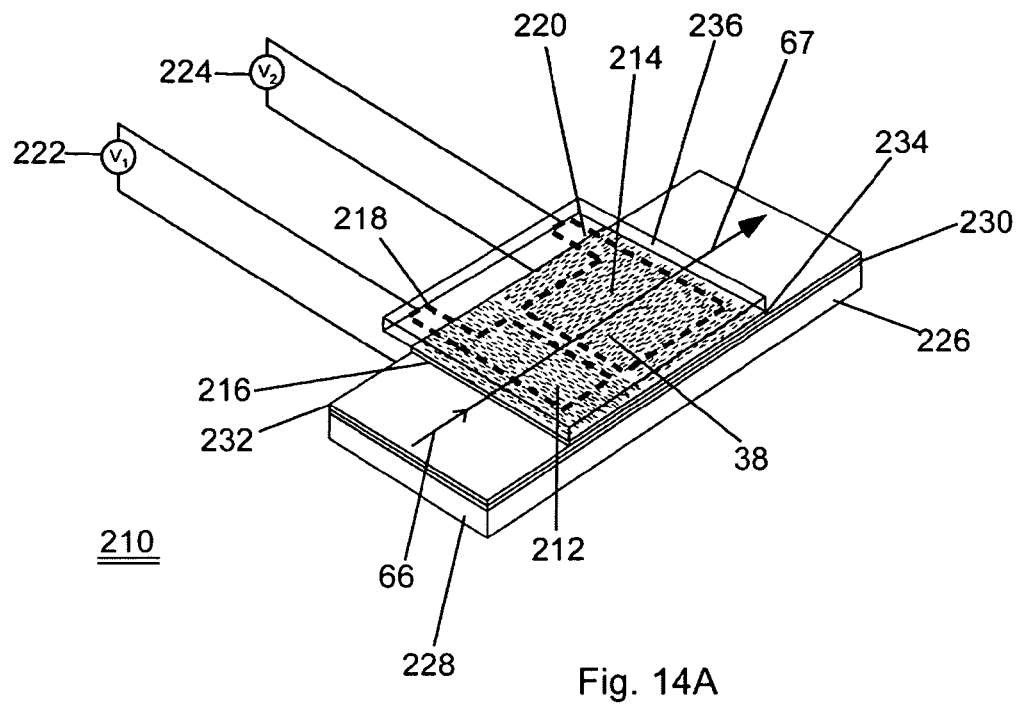
FIGS. 14A-B illustrate an example of a waveguide having two regions of differing liquid crystal alignment for simultaneous and/or independent control of light propagation over both TE and TM polarizations of light, in accordance with an embodiment of the present invention.

Also disclosed herein is a waveguide having two or more voltages for controllably altering an optical phase delay of TE polarized light and TM polarized light traveling along a propagation direction through the waveguide, as shown for example in FIGS. 13-14. For example, a waveguide (such as 180 in FIG. 13A or 210 in FIG. 14A) may include a core (such as 192 in FIG. 13A or 232 in FIG. 14A) for guiding the light through the waveguide; at least one cladding (such as 38 in FIG. 13C or 216 in FIG. 14A) adjacent the core, wherein the at least one cladding has liquid crystal molecules (such as 152 in FIG. 13C or 234 in FIG. 14A) disposed therein; at least one electrode (such as 182 or 184 in FIG. 13A or 218 in FIG. 14A) for receiving a first voltage (such as 202 in FIG. 13A or 222 in FIG. 14A) for controllably altering the optical phase delay of the TE polarized light traveling through the waveguide; and at least one electrode (such as 186 in FIG. 13A or 220 in FIG. 14A) for receiving a second voltage (such as 203 in FIG. 13A or 224 in FIG. 14A) for controllably altering the optical phase delay of the TM polarized light traveling through the waveguide.

In another embodiment, disclosed herein is a method for controllably altering an optical phase delay of TE polarized light and TM polarized light traveling along a propagation direction through a waveguide. In one example, the method may include the steps of providing the waveguide with a first electrode (such as 182 or 184 of FIG. 13A or 218 in FIG. 14A), a second electrode (such as 186 of FIG. 13A or 220 in FIG. 14A), a core for guiding the light through the waveguide, and at least one cladding having liquid crystal molecules disposed therein; applying a first voltage (such as 202 in FIG. 13A or 222 in FIG. 14A) to the first electrode for controllably altering the optical phase delay of the TE polarized light traveling through the waveguide; and applying a second voltage (such as 203 for FIG. 13A or 220 in FIG. 14A) to the second electrode for controllably altering the optical phase delay of the TM polarized light traveling through the waveguide. In one example, the operation of applying the first voltage is performed simultaneously with the operation of applying the second voltage. In another example, the operation of applying the first voltage and the operation of applying the second voltage are synchronously performed so that the optical phase delay of the TE polarized light is substantially equal to the optical phase delay of the TM polarized light. In another example, the operation of applying the first voltage is performed independently from the operation of applying the second voltage.

Specifically, FIGS. 13A-C illustrate alternative embodiments wherein a waveguide 180 utilizes two sets of electrode-pairs (182, 184 and 186, 188) which are oriented with respect to one another such that the electric field created by a first pair of electrodes 182, 184 is generally perpendicular to the electric field created by the second pair of electrodes 186, 188 in accordance with one embodiment of the present invention. In the example of FIGS. 13A-C, a waveguide 180 can be constructed in a manner similar to the embodiments (such as FIGS. 11 and 12) described above except that the embodiment of FIG. 13 has an additional pair of electrodes 186, 188.

The waveguide 180 of the example of FIGS. 13A-C may include a first electrode pair 186,188 including an upper electrode 186 and a substrate or ground plane 188 positioned within the waveguide acting as a lower electrode plane 188 of the first electrode pair 186, 188; a lower cladding 190; a core layer 192, which may include a channel 194 therein; an alignment layer; an upper cladding 196 with liquid crystal material 198 therein; a second pair of electrodes 182, 184 including a first 182 and second 184 electrode positioned in a parallel relation to one another, the core includes a channel 194 and the first 182 and second 184 electrodes are positioned adjacent to the channel 194; and a glass cover 200, if desired.

The substrate 187, lower cladding 190, core 192, upper cladding 196 with liquid crystal material 198 therein, and the glass cover 200 can all be made as described above with reference to FIGS. 1-7 and FIGS. 11-12. The liquid crystal material 198 for the example of FIGS. 13 A-C may be aligned such that for zero or low voltages 202 the molecules lay down in the plane of the waveguide 180 with an out-of-plane tilt angle that is approximately zero or a small value and are oriented with their longitudinal axes parallel to the waveguide channel 194 (i.e., parallel to the light 66 propagation direction) with an in-plane angle that is approximately zero or generally small. The upper electrode 186 of the first pair of electrodes 186, 188 and parallel electrodes 182, 184 of the second pair of electrodes 182,184—can be implemented as a conductive coating that may then be patterned via photolithography or by other means.

The first 186, 188 and second 182, 184 electrode pairs can provide for different control over different polarizations. For example, the second electrode pair 182, 184 along the core channel 194 may be oriented such that only TE polarized light will have its indices altered with voltage 202 (see FIGS. 11-12) and the first electrode pair 186, 188 may be oriented such that only TM polarized light will have its index altered when voltage 203 is applied across the electrode 186 and the ground plane 188 (see FIGS. 5-7). In other words, in one example, with the same liquid crystal alignment or orientation for the liquid crystal material 198 adjacent to both electrode pairs (186, 188 and 182, 184), this structure can provide independent TE and TM control by applying voltage 203 to the first pair 186, 188 of electrodes (and not to the second pair 182, 184) to control TM, and then applying voltage 202 to the second pair 182,184 of electrodes (and not the first pair 186, 188) to control TE. In this configuration, the liquid crystal molecules 198 are initially aligned so that when no voltage 202, 203 is applied to either pair of electrodes (186, 188 and 182, 184) the longitudinal axes of the molecules are aligned substantially parallel to the plane of the waveguide 180 and substantially parallel to the propagation direction 67 of light 204, i.e., the out-of-plane tilt angle and the in-plane rotation angle are both generally small.

Each pair of electrodes (186, 188 and 182, 184) may be coupled with separate voltage sources (202, 203) so that different voltages can be independently applied to the first 186, 188 and second 182, 184 pairs of electrodes.

As voltage 202 is applied to the second electrode pair 182, 184 (and not to the first pair of electrodes 186, 188) and is increased, the effective index for TE polarized light will increase and the effective index for TM polarized light will remain unchanged. As voltage 203 is applied to the first electrode pair 186, 188 (and not to the second pair of electrodes 182, 184) and is increased, the effective index for TM polarized light will increase and the effective index for TE polarized light will remain unchanged. In this way, the cumulative optical phase delay may be altered for only TE light, only TM light, or any variation in between. In the case where the voltages 202, 203 applied to the two electrode pairs (186, 188 and 182, 184) is such that the TE optical phase delay is always equivalent to the TM optical phase delay, then the device is rendered polarization independent since any arbitrary input polarization may be expressed as a linear combination of TE and TM polarized light. In other words, the first and second voltages 202, 203 may be synchronously altered so that the optical phase delay of the TE polarized light is substantially equal to the optical phase delay of the TM polarized light.

As with the other embodiments disclosed herein that use liquid crystal waveguides to control the index of refraction for TE polarized light, TM polarized light, either simultaneously or independently, the embodiment of FIG. 13 can be made using different arrangements, liquid crystal alignments, or orders of layers as desired. For example, while FIG. 13 depicts the two electrode pairs (186, 188 and 182, 184) as segregated to different regions of the waveguide 180, the two electrode pairs (186, 188 and 182, 184) could be overlapped, either partially or completely, in a common region. Any two electrode pairs that provide for different TE vs. TM control may be used.

In FIG. 13A, the electrodes 186, 182/184 are sized and positioned such that the vertical projections of electrode 186 within the waveguide are not overlapping with the vertical projections of electrodes 182, 184.

In FIG. 13B, the electrodes 186, 182/184 are sized and positioned such that the vertical projections of electrode 186 within the waveguide do overlap with the vertical projections of electrodes 182, 184. FIG. 13C shows the overlap (along section lines 13C of FIG. 13B).

By overlapping the electrodes (186 overlapping 182, 184) in a common region, as in FIG. 13B and FIG. 13C, the total length of the waveguide 180 may be less than the configuration depicted in FIG. 13A, which enables a more compact device. This can be advantageous for complicated integrated optical circuits, where a large number of devices are incorporated into a single footprint. This can also be advantageous when this waveguide element 180 is used in an arm of a Mach-Zehnder interferometer and it is desired to keep the total length of this arm compact. Furthermore, since the light 66 that travels through the waveguide 180 will generally be attenuated as it travels through the waveguide 180, a shorter more compact device 180 may provide for less total attenuation.

In the configuration of FIGS. 13B and 13C, the voltages 202, 203 to the two pairs of electrodes (182, 184) and (186, 188) may be increased synchronously, thereby causing the LC molecules 152 to rotate in a plane that may be neither perpendicular nor parallel to the waveguide 180. In one example, the voltages 202, 203 on the two pairs of electrodes (182, 184) and (186, 188) are synchronized such that the liquid crystal molecules 152 rotate in a plane that is approximately at forty five degrees with respect to the waveguide 180. In another example, the voltages 202, 203 on the two pairs of electrodes (182, 184) and (186, 188) are synchronized such that the liquid crystal molecules 152 rotate in a plane that is between approximately zero to forty five degrees with respect to the waveguide 180. In another example, the voltages 202, 203 on the two pairs of electrodes (182, 184) and (186, 188) are synchronized such that as the voltages 202, 203 are altered, the change in optical phase delay for the TE polarized light (contained within 66) is substantially equal to the change in optical phase delay for the TM polarized light (contained within 66). The changes in voltage 202 and voltage 203 may be synchronized such that as one voltage is increasing the other voltage is also increasing. Alternately, the changes in voltage 202 and voltage 203 may be synchronized such that as one voltage is increasing the other voltage is decreasing.

In another embodiment, disclosed herein is a waveguide for controllably altering an optical phase delay of TE polarized light and TM polarized light traveling along a propagation direction through the waveguide. In one example such as shown in FIG. 14, the waveguide may include a core for guiding the light through the waveguide; at least one cladding adjacent the core, wherein the at least one cladding has liquid crystal molecules disposed therein; at least a first electrode (such as 218 in FIG. 14A) positioned adjacent a first region (such as 212 in FIG. 14A) of the waveguide for receiving a first voltage (such as 222 in FIG. 14A), wherein as the first voltage is altered, the ratio of the optical phase delay of the TE polarized light traveling within the first region to the optical phase delay of the TM polarized light traveling within the first region is controllably altered by a first amount; and at least a second electrode (such as 220 in FIG. 14A) positioned adjacent a second region (such as 214 in FIG. 14A) of the waveguide for receiving a second voltage (such as 224 in FIG. 14A), wherein as the second voltage is altered, the ratio of the optical phase delay of the TE polarized light traveling within the second region to the optical phase delay of the TM polarized light traveling within the second region is controllably altered by a second amount that is different than the first amount.

In FIG. 14, the waveguide 210 utilizes an alignment layer having two or more areas or regions 212, 214 having different orientations in the adjacent cladding 216, in accordance with one embodiment of the present invention. In one example and referring to FIG. 14, a waveguide 210 can be constructed in a manner similar to the embodiments described above except that the embodiments of FIG. 14 have an alignment layer with two or more regions of alignment 212, 214, and the upper electrode may be divided into at least two electrodes 218, 220 to independently control the different alignment regions 212, 214 through different voltage sources 222, 224 if desired.

Hence, the waveguide of the example of FIG. 14 may include at least a first and second upper electrode 218, 220; a ground plane/substrate 226 acting as a lower electrode plane 228; a lower cladding 230; a core layer 232; an alignment layer having one or more regions 212, 214 of differing alignments; an upper cladding 216 with liquid crystal material 234 therein; and a glass cover 236, if desired. The ground plane/substrate 226, lower cladding 239, core 232, upper cladding 216 with liquid crystal material 234 therein, and the glass cover 236 can be made as described above with reference to FIGS. 1-7. The upper electrodes 218, 220 can be implemented as a conductive coating that may then be patterned via photo-lithography or by other means. Alternately, the first region 212 and the second region 214 may each have their own glass cover 236.

The liquid crystal material 234 contains liquid crystal molecules that may have longitudinal axes. The liquid crystal molecules within the first alignment region 212 may have an initial orientation that aligns at least a portion of the liquid crystal molecules in the first region 212 with their longitudinal axes oriented substantially in the plane of the waveguide 210 and substantially perpendicular to the propagation direction 67. The liquid crystal molecules within the second alignment region 214 may have an initial orientation that aligns at least a portion of the liquid crystal molecules in the second region 214 with their longitudinal axes oriented substantially in the plane of the waveguide 210 and substantially parallel to the propagation direction 67.

On the alignment layer, the two or more areas or regions 212, 214 of differing alignment orientations can provide for different control over different polarizations. For example, the first region 212 may initially bias liquid crystals 234 into an alignment such that both TE and TM polarized light will have their indices altered as voltage 222 is applied (see FIGS. 2-4), and the second region 214 may initially bias liquid crystals 234 into an alignment that only TM polarized light will have its index altered with voltage 224 (see FIGS. 5-7). In this example, a first region 212 may contain liquid crystal material 234 that is aligned perpendicular to the light 66 propagation with an in-plane angle of approximately ninety degrees and a second region 214 may contain liquid crystal material 234 that is aligned parallel to the light 66 propagation with an in-plane angle of approximately zero degrees.

Figure 14B:
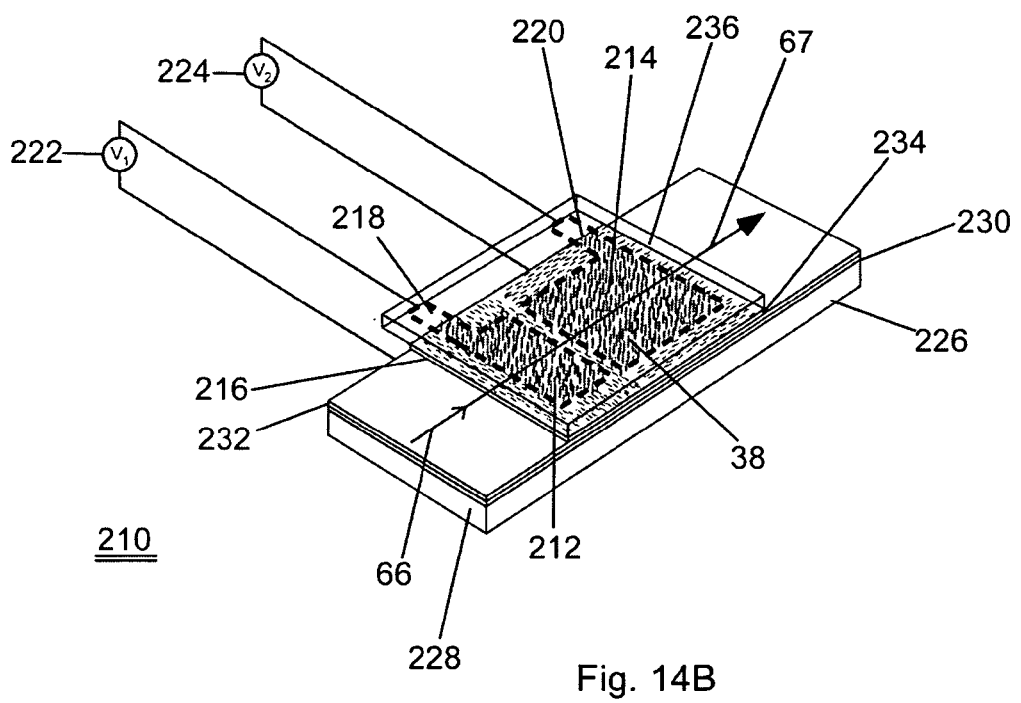

In the first region 212, as voltage 222 is applied between the ground plane 226 and the at least one electrode 218 for receiving the voltage 222, the effective index for TE polarized light will decrease and the effective index for TM polarized light will increase. In other words, as the first voltage 222 is applied to the first electrode 218, the alignment of at least a portion of the liquid crystal molecules in the first region 212 may rotate from the initial orientation to a second orientation that may align at least a portion of the liquid crystal molecules in the first region 212 with their longitudinal axes oriented substantially perpendicular to both the plane of the waveguide 210 and the propagation direction 67, as shown in the example of FIG. 14B.

In the second region 214, as voltage 224 is applied between the ground plane 226 and the at least one electrode 220 for receiving the voltage 224, the effective index for TM polarized light will increase and the effective index for TE polarized light will remain substantially unaltered. In other words, as the second voltage 224 is applied to the second electrode 220, the alignment of at least a portion of the liquid crystal molecules in the second region 214 may rotate from the initial orientation to a second orientation that may align at least a portion of the liquid crystal molecules in the second region 214 with their longitudinal axes oriented substantially perpendicular to both the plane of the waveguide 210 and the propagation direction 67, as shown in the example of FIG. 14B.

By controlling voltage 224, the optical phase delay for TM polarized light in the second region 214 may be dynamically controlled to either add to or subtract from changes in the optical phase delay for TM polarized light from the first region 212. In this way, one may alter the cumulative optical phase delay of only the TE polarized light, only the TM polarized light, or any variation in between.

In one example the first voltage 222 and the second voltage 224 may be synchronously changed so that the optical phase delay for the TE polarized light traveling through waveguide 210 changes while the optical phase delay remains substantially unaltered for the TM polarized light traveling through waveguide 210.

In another example, the first voltage 222 and the second voltage 224 may be synchronously altered so that the optical phase delay of TE polarized light may be substantially equal to the optical phase delay of TM polarized light. In this case, the device 210 can be rendered polarization independent since any arbitrary input polarization may be expressed as a linear combination of TE and TM polarized light. In one example, the second region 214 may be approximately twice as long as the first region 212. In this way, the change in the optical phase delay for TM polarized light from the second region 214 may cancel out the change in the optical phase delay for TM polarized light from the first region 214, and also provide for sufficient additional optical phase delay such that the optical phase delay for TE and TM polarized light may be substantially equal.

The changes in voltage 222 and voltage 224 may be synchronized such that as one voltage is increased the other voltage is also simultaneously increased. Alternately, the changes in voltage 222 and voltage 224 may be synchronized such that as one voltage is increased the other voltage is simultaneously decreased.

As with the other embodiments disclosed herein that use liquid crystal waveguides to control the index of refraction for TE polarized light and or TM polarized light, either simultaneously or independently, the embodiment of FIG. 14 can be made using different arrangements, liquid crystal alignments, or orders of layers as desired. Any two regions that provide for different TE vs. TM control may be used, and the example of liquid crystal alignment is only one example.

While FIGS. 13-14 show the use of two control voltages for controlling light passing through the waveguide, it is understood that waveguides could be formed with three or more control voltages controlling different aspects of light passing through the waveguide or controlling different regions of the waveguide. Moreover, the language or designations of "first voltage" and "second voltage" shown and described herein are arbitrary and are not meant to imply that one voltage is first in importance or first in time over the second voltage; and depending upon the implementation, the first voltage may be interchanged with the second voltage.

Figure 15:
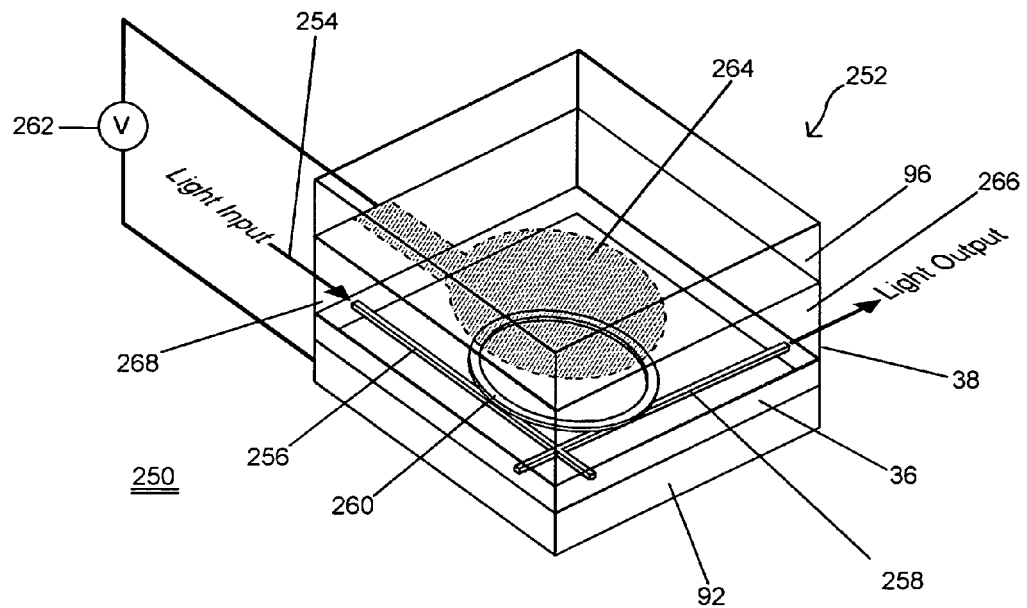
FIG. 15 illustrates an example of a ring-resonator tunable optical filter, in accordance with an embodiment of the present invention.

As explained above, embodiments of the present invention may be used in various applications. FIGS. 15-16 illustrate two examples of applications of some embodiments of the present invention. In FIG. 15, an optical ring resonator 250 is combined with a liquid crystal waveguide 252 to create a voltage tunable optical filter. Light is input 254 along one of the channel structures 256, which passes near a waveguide ring structure 260 such that the evanescent tail of the input channel 256 light 254 protrudes into the ring structure 260. If the optical path length of the ring 260 is such that it is near an integral number of wavelengths of light 254, then light 254 can be coupled through the ring 260 and into the output channel 258. By applying a voltage 262 to an electrode 264 placed above the ring 260, the total optical path length of the ring 260 may be voltage 262 tuned, via tuning of the liquid crystal cladding 266. In this way, the wavelength of light that is transferred from the input 256 to the output 258 channel may be controllably altered. This enables a voltage tunable optical "add drop," which is useful in telecommunications. This can also be used as a voltage tunable wavelength filter in tunable lasers.

For manufacturing simplicity, the liquid crystal 268 may be aligned along only one direction, i.e., it will not follow the curvature of the ring structure 260, since the ring 260 diameter may be only tens or hundreds of microns. Therefore, as the light propagates through the ring 260, the orientation of the liquid crystal material 268 with respect to the propagation direction 67 of light will change. To make a device adapted for a given input polarization, such as TE or TM, a waveguide 252 could be designed so as to avoid TE-to-TM or TM-to-TE mode conversion voltages. As discussed previously and according to one embodiment of the invention, this can be accomplished by ensuring that the geometric birefringence is greater than the material birefringence for all operational voltages.

For many applications it is advantageous to provide for polarization independence wherein a device operates the same regardless of the input polarization. In one example, this can be accomplished by having two electrodes 280, 282, wherein TE and TM polarizations can be controlled differently via different voltages applied to the electrodes. For the ring-resonator geometry this is depicted in the example of FIG. 16. With a liquid crystal alignment 284 as indicated by the dark arrow on the figure, one electrode 280 will alter the optical path length of predominantly TM polarized light, whereas the other electrode 282 will alter the optical path length of both TM and TE polarized light. As discussed previously, these two electrodes 280,282 can be used to alter the optical path length of the ring for just TE polarized light, just TM polarized light, and any combination in between. If the two voltages applied to the two electrodes 280,282 are altered in a manner so that both the TE and the TM optical path lengths are altered the same amount, then the device will perform in a polarization independent manner.

FIGS. 17A-B and 18A-B illustrate different views of liquid crystal molecules in order to show out-of-plane tilt angles and in-plane angles as those terms are used herein with respect to various embodiments of the present invention.

As used in this application, the term "longitudinal axis" may refer to the long axis of a nematic liquid crystal, or any other unique axis that may be used to describe the orientation of the liquid crystal molecule. The longitudinal axis may also be referred to as the director. It is further understood that the longitudinal axes for different liquid crystal molecules may not be precisely aligned with one another, but rather encompass a distribution. Further, the distribution of orientations for the longitudinal axes may change for different regions within the liquid crystal layer. Hence, the orientation of the longitudinal axis for liquid crystal molecules and how they are altered under the application of voltages may refer to a general distribution of orientations of a plurality of molecules as well.

Figure 17A:
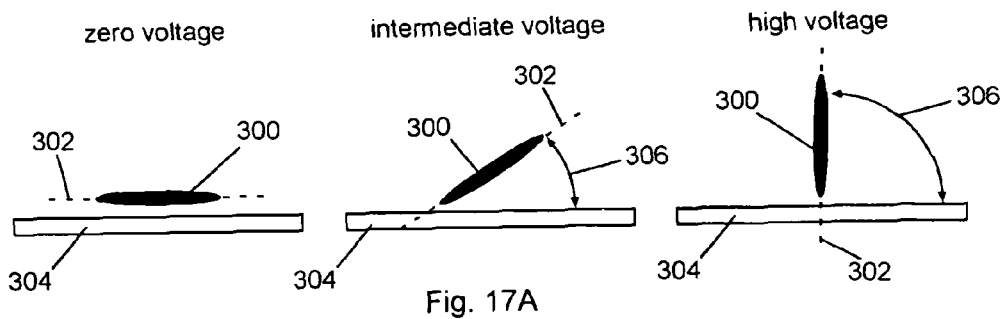
FIG. 17A illustrates an end view of an example of a liquid crystal molecule as the out-of-plane tilt between the longitudinal axis of the molecule and the plane of the waveguide increases under the application of a voltage, in accordance with one embodiment of the present invention.
Figure 17B:
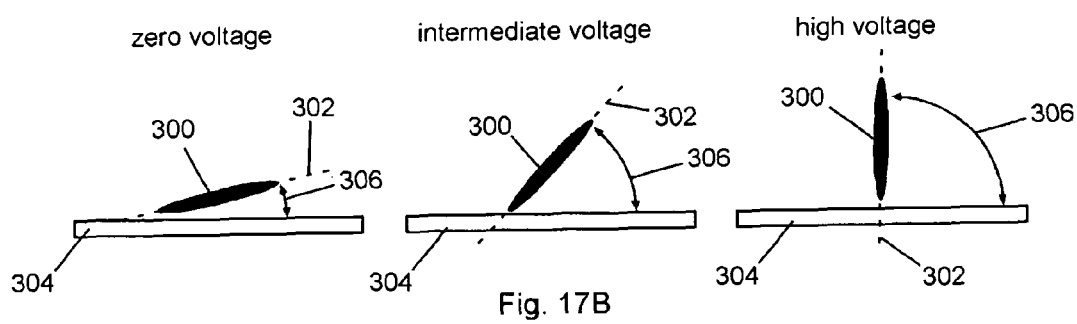
FIG. 17B illustrates an end view of an example of a liquid crystal molecule as the out-of-plane tilt between the longitudinal axis of the molecule and the plane of the waveguide increases under the application of a voltage, in accordance with one embodiment of the present invention.

FIGS. 17A-B illustrate examples of out-of-plane tilt angles, wherein a liquid crystal molecule 300, which may have a longitudinal axis 302, may rotate away from the plane of the waveguide 304 under the application of voltage. The magnitude of rotation may be described by an out-of-plane tilt angle 306 between the longitudinal axis 302 of the liquid crystal molecule 300 and the plane of the waveguide 304.

Depending upon the implementation of a waveguide and as shown in FIG. 17A, the out-of-plane tilt angle 306 may increase from approximately zero degrees when no voltage is applied to a larger intermediate value as voltage is increased, and further to approximately 90 degrees when a higher voltage is applied. This rotation may occur in either a clockwise or a counter-clockwise direction.

In this example of FIG. 17A, the orientation when no voltage is applied may correspond to an initial state or an initial orientation. This out-of-plane tilt angle 306 for the initial state may be referred to as a pre-tilt angle, which in this example may be approximately zero degrees. Furthermore, by controllably altering the magnitude of the intermediate voltage the magnitude of the out-of-plane tilt angle 306 may be controllably altered.

Alternatively, as shown in FIG. 17B the out-of-plane tilt angle 306 may increase from a smaller value when no voltage is applied, to a larger intermediate value as voltage is increased, and further to approximately 90 degrees when a higher voltage is applied. This rotation may occur in either a clockwise or counter-clockwise direction.

In this example of FIG. 17B, the orientation when no voltage is applied may correspond to an initial state or an initial orientation. This out-of-plane tilt angle 306 for the initial state may be referred to as a pre-tilt angle, which in this example may be approximately greater than zero degrees.

Figure 18A:
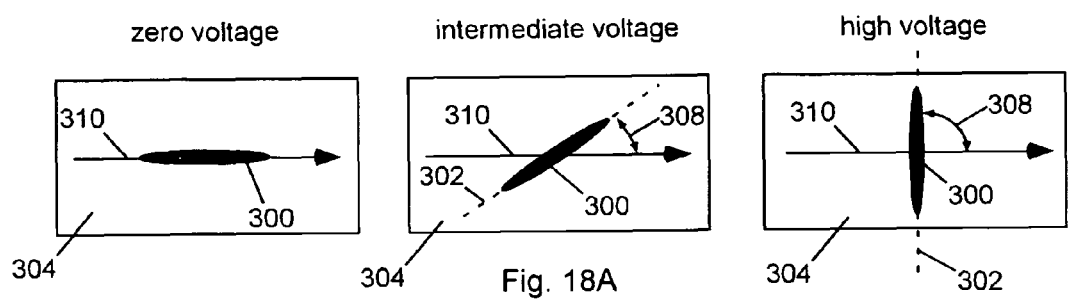
FIG. 18A illustrates a top view of an example of a liquid crystal molecule as the in-plane angle between the longitudinal axis of the molecule and the light propagation direction increases under the application of a voltage, in accordance with one embodiment of the present invention.
Figure 18B:
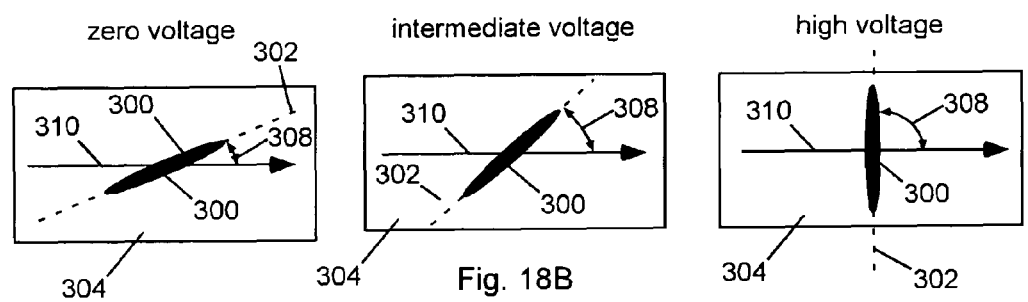
FIG. 18B illustrates a top view of an example of a liquid crystal molecule as the in-plane angle between the longitudinal axis of the molecule and the light propagation direction increases under the application of a voltage, in accordance with one embodiment of the present invention.

FIG. 18A and FIG. 18B illustrate examples of in-plane angles, wherein a liquid crystal molecules 300, which may have a longitudinal axis 302, may rotate within the plane of the waveguide 304 under the application of voltage. The in-plane angle 308 may be characterized as the angle between the longitudinal axis of the molecule (or director) and the light propagation direction/vector 67. When viewed from the top as in FIGS. 18A-B down onto the plane of the waveguide 304, the longitudinal axis 302 of the liquid crystal molecule 300 may be oriented at an in-plane angle 308 with respect to the propagation direction 67 of light 310.

Depending on the implementation of a waveguide and as shown in FIG. 18A, the in-plane angle 308 may increase from approximately zero degrees when no voltage is applied, to a larger intermediate value as voltage is increased, and further to approximately 90 degrees when a higher voltage is applied.

This rotation may occur in either a clockwise or a counterclockwise direction. In this example, the orientation when no voltage is applied may correspond to an initial state or an initial orientation. In one example, the in-plane angle 308 for the initial state may be substantially parallel or perpendicular to the direction 67 of the light propagation, as is shown in FIG. 18A.

Alternatively, as shown in FIG. 18B the orientation when no voltage is applied may correspond to an initial state or an initial orientation. The in-plane angle 308 for the initial state may be at an in-plane angle that is neither parallel to nor perpendicular to the direction 67 of the light propagation, as is shown in FIG. 18B.

While FIGS. 17A-B and 18A-B illustrate examples wherein the longitudinal axis of the liquid crystal molecules rotates to align with the direction of the applied electric field, it is understood that liquid crystal material that rotates perpendicular to the applied electric field could be used. For example, a liquid crystal material with a negative dielectric anisotropy, rather than a positive dielectric anisotropy, could be utilized.

In terms of out-of-plane tilt angles and in-plane angles, in FIGS. 2A-B, 3A-B and 4A-B, the out-of-plane tilt angle of the liquid crystal molecules 38 changes from an initial orientation of small/approximately zero degrees to, as voltage 46 is applied across the electrodes 42, 44, another orientation of approximately ninety degrees. The in-plane angle of the liquid crystal molecules 38 has an initial orientation of approximately ninety degrees and remains substantially unchanged as voltage 46 is applied across the electrodes 42, 44.

In FIGS. 5A-B, 6A-B and 7A-B, the out-of-plane tilt angle of the liquid crystal molecules 38 changes from an initial orientation of small/approximately zero degrees to, as voltage 46 is applied across the electrodes 42, 44, another orientation of approximately ninety degrees. The in-plane angle of the liquid crystal molecules 38 has an initial orientation of approximately zero degrees and remains substantially unchanged as voltage 46 is applied across the electrodes 42, 44.

In FIGS. 11A-B and 12A-B, the in-plane angle of the liquid crystal molecules 38 in between the electrodes 138, 140 changes from an initial orientation of approximately zero degrees to, as voltage 142 is applied across the electrodes 138, 140, another orientation of approximately ninety degrees. The out-of-plane tilt angle of the liquid crystal molecules 38 between the electrodes 138, 140 has an initial orientation of approximately zero degrees and remains substantially unchanged as voltage 142 is applied across the electrodes 138, 140.

In FIGS. 14A-B, two regions 212, 214 of liquid crystal molecules are provided in a single waveguide 210. For the first region 212, the out-of-plane tilt angle of the liquid crystal molecules 38 changes from an initial orientation of small/approximately zero degrees to, as voltage 222 is applied across the electrodes 218, 228, another orientation of approximately ninety degrees. The in-plane angle of the liquid crystal molecules 38 has an initial orientation of approximately ninety degrees and remains substantially unchanged as voltage 222 is applied across the electrodes 218, 228.

For the second region 214, the out-of-plane tilt angle of the liquid crystal molecules 38 changes from an initial orientation of small/approximately zero degrees to, as voltage 224 is applied across the electrodes 220, 228, another orientation of approximately ninety degrees. The in-plane angle of the liquid crystal molecules 38 has an initial orientation of approximately zero degrees and remains substantially unchanged as voltage 224 is applied across the electrodes 220, 228.

Figure 19A:
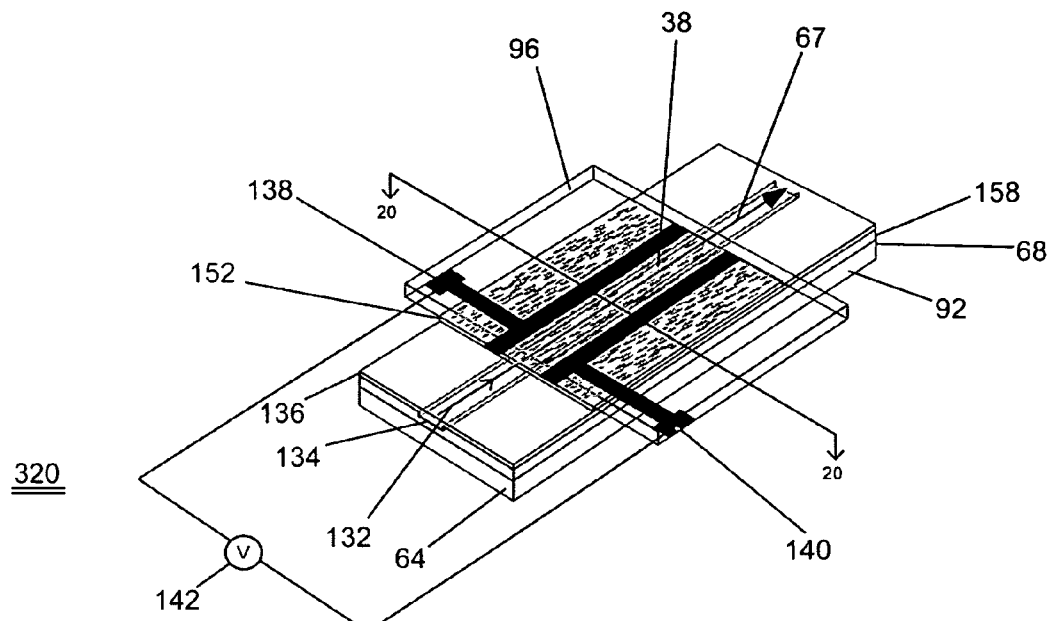
FIGS. 19A-B illustrate another example of a waveguide having a channel therein with a pair of electrodes along the outer edges of the channel for providing active control of light propagation, in accordance with an embodiment of the present invention.
Figure 19B:
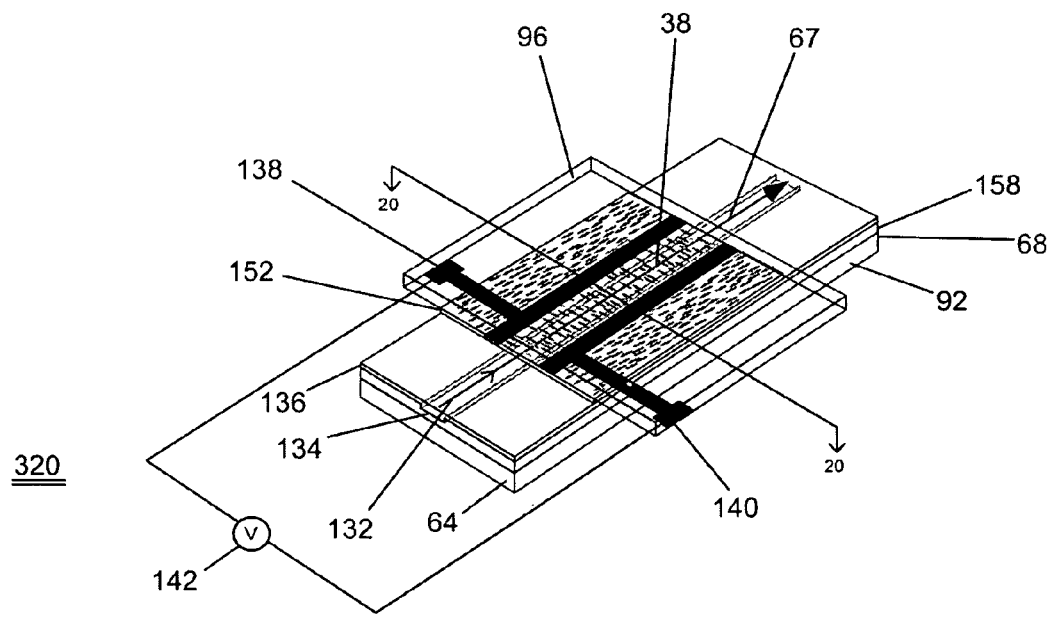

In FIGS. 19-20, an alternative embodiment of a waveguide 320 is illustrated in accordance with one embodiment of the present invention. This embodiment may be used to control TE polarized light passing through the waveguide, without significantly affecting TM polarized light.

The waveguide 320 controllably alters an optical phase delay of light 132 traveling along a propagation direction 67 through the waveguide. The waveguide 130 can also controllably alter an effective index of refraction of the waveguide. In one example, the waveguide 130 may include a core 136 for guiding the light 132 through the waveguide; at least one cladding, such as upper cladding 164, adjacent the core 136, wherein the at least one cladding 164 has liquid crystal molecules 152 disposed therein; at least one alignment layer 156 positioned between the at least one cladding 164 and the core 136, the alignment layer 156 initially aligning at least a portion of the liquid crystal molecules 152 in an initial orientation (such as in FIG. 20A); and a pair of electrodes 138, 140 for receiving a voltage 142. In one embodiment, as the voltage 142 is applied to the pair of electrodes 138, 140, an electric field (represented by electric field lines 157 in FIG. 20C) is created between the electrodes and through a portion of the at least one cladding 164, a portion of the electric field 157 being oriented substantially parallel to a plane, surface or layer of the waveguide 320 so that the alignment of at least a portion of the liquid crystal molecules 152 changes from the initial orientation to a second orientation (such as in FIGS. 20B-C), thereby changing the optical phase delay for the light 132 traveling through the waveguide.

As mentioned above, light 132 (also shown as 66 in other embodiments) propagates in a direction 67 in the plane of the waveguide. The plane of the waveguide is generally parallel to the layers within the waveguide, which may include (depending on the implementation) the lower cladding, substrate layers, alignment layers, or core layer.

In this example, the guided light 132 is confined to a channel 134 in the waveguide core layer 136, and a pair of electrodes 138, 140 are placed on opposing sides of this channel 134, and along the length of the channel 134 (rather than above and below the liquid crystal cladding 152 as shown in other embodiments herein). This is similar to the example of FIGS. 11-12, except in this case the pair of electrodes are placed above the cladding 152 (i.e., deposited on the underside of the coverplate 96), rather than on the upper side of the core layer 136 as in FIGS. 11-12. This may be a less expensive electrode deposition process. The channel 134 provides lateral guiding of the light 132, and may be formed by means of an inverted ridge or groove in the core layer 136. The channel 134 preferably extends along the length of the waveguide 130, and may generally define a rectangular slot or recess in the waveguide core layer 136.

The electrodes 138, 140, which in one example may be generally rectangular, may be formed by depositing a thin conductive film (such as ITO, gold, aluminum, etc.) and then photo-lithographically removing the conductive film in regions other than the desired electrodes 138,140. In this example, this layer may be deposited on the underside of the coverplate 96. The coverplate 96 may overhang on either side of the waveguide 320, enabling electrical connection to the electrodes 138, 140.

Figure 20A:
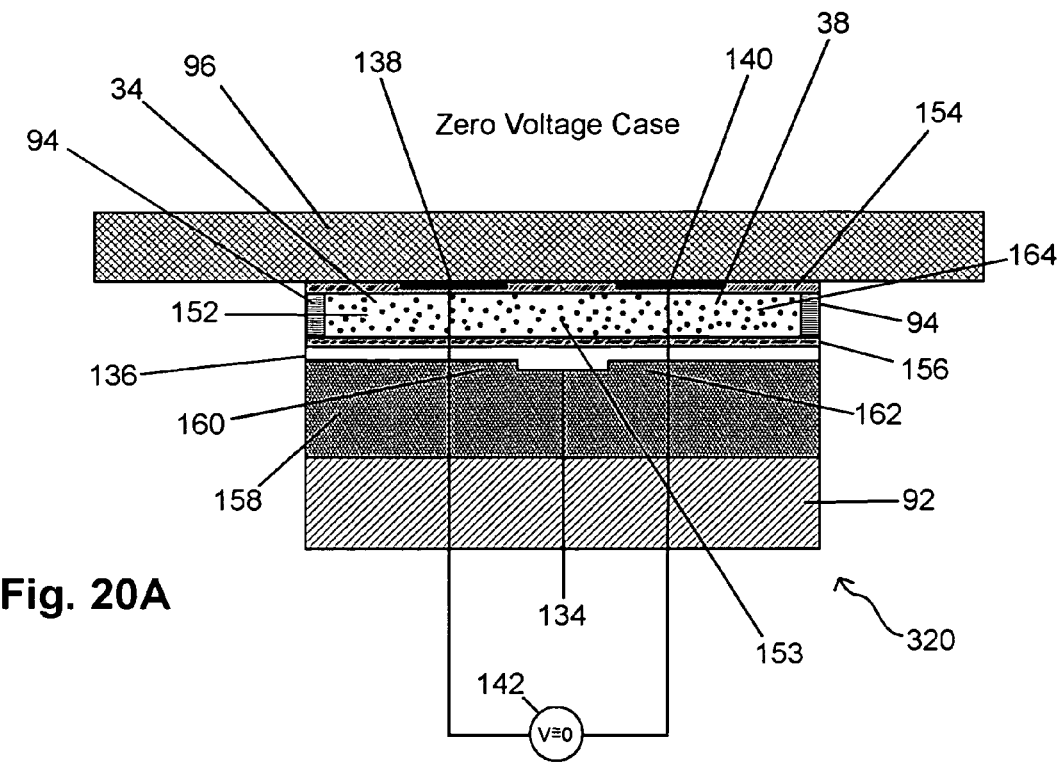
FIG. 20A illustrates a sectional view taken along section lines 20-20 of FIGS. 19A-B, wherein no voltage is applied across the electrodes of the waveguide, in accordance with an embodiment of the present invention.
Figure 20B:
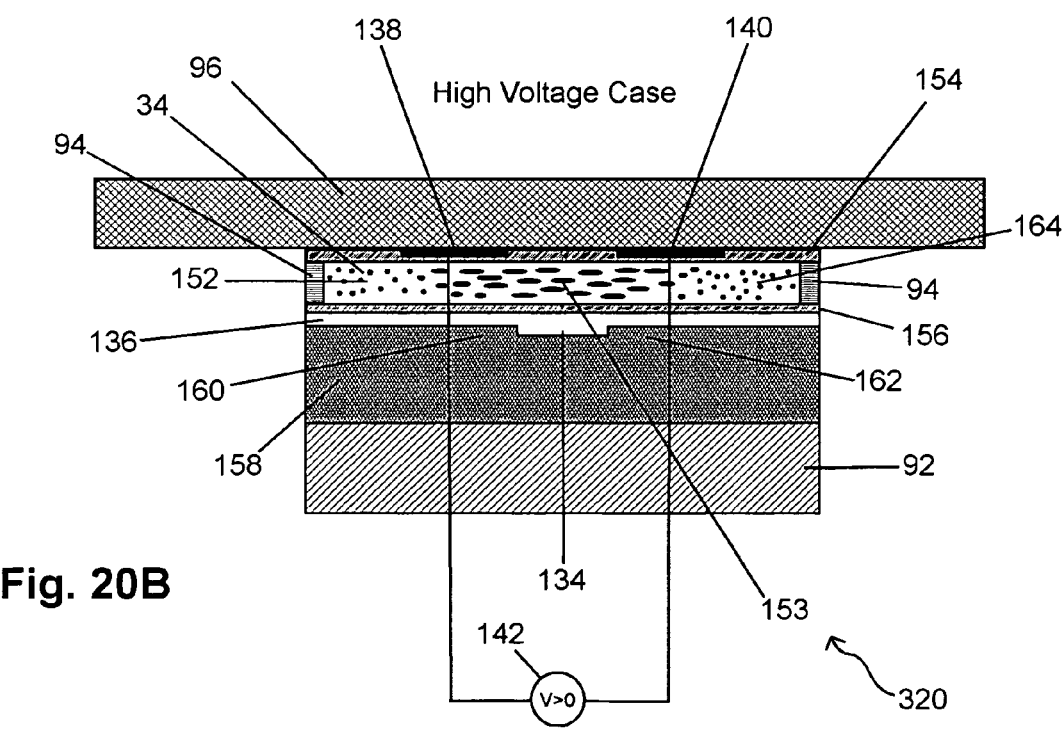
FIG. 20B illustrates a sectional view taken along section lines 20-20 of FIGS. 19A-B, wherein a voltage is applied across the electrodes, in accordance with an embodiment of the present invention.
Figure 20C:
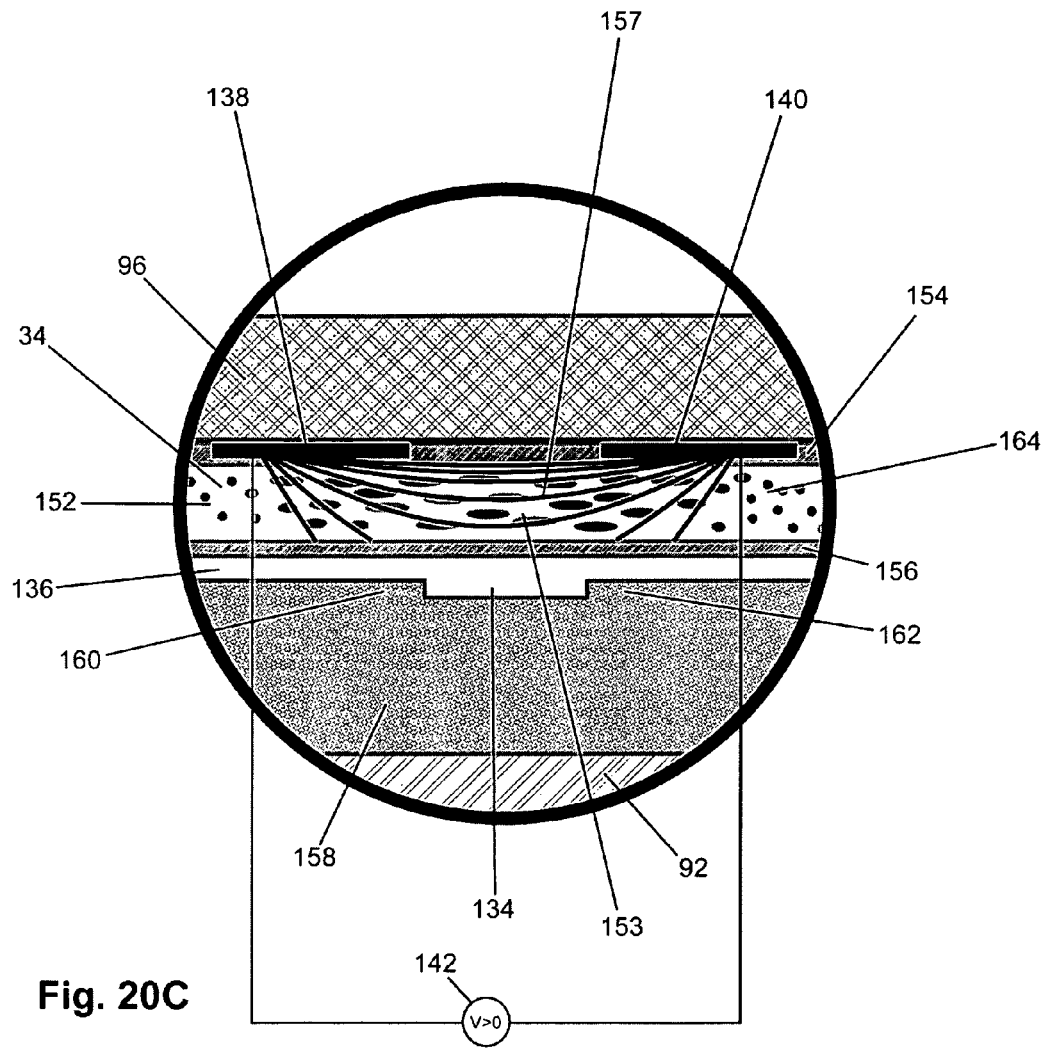
FIG. 20C illustrates an expanded view of FIG. 20B, showing examples of electric field lines when a voltage is applied between the electrodes, in accordance with one embodiment of the present invention.

Application of voltage 142 on these electrodes 138, 140 produces an electric field as represented in FIG. 20C, portions of which that are largely parallel to the surface of the waveguide 130 and perpendicular to the length of the channel 134 as well as perpendicular to the propagation direction 67 of light 132 through the waveguide 130. The thickness of the upper cladding 34 may be selected to increase the electric field proximate the channel 134 and in one example is 2 microns thick.

FIGS. 20A-B show a cross-sectional view of the waveguide 320 of FIG. 19 taken along section lines 20-20. In FIGS. 20A-B, a positive dielectric nematic liquid crystal 152 has been initially aligned parallel to the light propagation direction 67 (FIG. 20A), thereby providing an in-plane angle of approximately zero or a generally small value. It is understood that other liquid crystals, such as Smectic C*, Smectic A*, nematics with a negative dielectric anisotropy, or others could be utilized. These liquid crystals could be aligned in either a homeotropic or homogeneous configuration.

FIG. 20A illustrates when voltage 142 is approximately zero, where both TE and TM polarized light passing through the waveguide see the short axis of the liquid crystal molecules 152. In this case, both TE and TM polarizations experience a relatively lower index of refraction, when compared to the case when a voltage 142 is applied in FIG. 20B. FIGS. 20B-20C illustrate where a voltage has been applied across the electrodes 140, 142. In response to the applied voltage 142, the liquid crystal molecules 152 align with the applied electric field by rotating in the plane of the waveguide 130 and perpendicular to the light propagation direction 67. In other words, the in-plane angle of the liquid crystal molecules 152 increases as voltage 142 is applied, whereas the out-of-plane tilt angle remains generally unaltered. The molecules 153 closest to electrodes 138, 140 experience the strongest electric field, and therefore are rotated the most. The thickness of the upper cladding 164 may be small (e.g., <5 microns) such that the molecules proximate the channel 134 are rotated. As a voltage 142 is applied, TE polarized light traveling through the waveguide will experience a larger index of refraction, while the index of refraction for TM polarized light will not be substantially changed. In this way, the index of refraction (and therefore the optical phase delay) of TE polarized light can be independently controlled.

In one example, the channel 134 is generally rectangular and extends along the length of the core. The channel 134 may be formed as a recess, notch or groove along the top surface of the lower cladding 158, as shown in FIGS. 12A-B, wherein the sides of the channel 134 may be defined by cladding walls 160,162. In this configuration the channel 134 is also referred to as an inverted ridge 134 or inverted top hat core structure. This configuration has the benefit of a flat or smooth upper surface, i.e., the topside of the core 136 that is adjacent to the alignment layer 156 is free from channel topology. This avoids any potential problems associated with the channel 134 topology impacting the alignment of the liquid crystal material 153 that is adjacent the channel 134.

In another example, the channel may be implemented along the top surface of the core 136. This type of core structure may be referred to as a top hat or ridge structure. In this case the topology of the channel 134 may protrude into the alignment layer 156 and the liquid crystal material 153. A potential drawback is that this topology may impact the alignment of the liquid crystal material 153, which in turn may lead to increased scattering of the guided light or other undesirable effects.

The construction of the waveguide 320 and alignment layers 154, 156 may be as previously described. The construction of the inverted ridge channel 134 may be done via a variety of photolithography processes. In one example, the inverted ridge or channel 134 may be formed by a combination of thermal oxide, low pressure chemical vapor deposition, and ion beam sputtering. A layer of thermal oxide may be grown in a p-doped Si wafer. This layer may be four microns thick or other thicknesses to serve as the lower waveguide cladding 158. On top of the thermal oxide, a thin layer of silicon nitride may be deposited via low vapor pressure chemical vapor deposition. In one example, this layer may be 40 nm thick. This layer may then be etched away in a photo-lithographically determined pattern, such that all or part of the remaining silicon nitride layer may define the inverted ridge 134. A layer of low vapor pressure chemical vapor deposition silicon dioxide may be applied to define the side cladding 160,162 adjacent to the inverted ridge 134. At this point a chemical-mechanical-polish (CMP) may be performed to define a smooth top layer, upon which the slab portion or core layer 136 will be deposited. The slab portion 136 of the core 136, 134 may be a tantalum pentoxide layer deposited by an ion beam sputtering process. The depth and width of the ridge 134 may be chosen to provide for single mode lateral guiding. For example, the ridge 134 depth may be 40 nm and the width may be 3 microns. In another embodiment, a top-hat or top-ridge channel geometry may be employed, although this may interfere with the liquid crystal 152 alignment which may subsequently lead to scattering losses.

It is also understood that Smectic materials could be utilized in this embodiment. For example, Smectic C* or Smectic A* liquid crystals could be provided in a homeotropic alignment. Application of voltage 142 to the electrodes 160, 162 may then be used to provide for TM control in this example.

In the embodiment of FIG. 20, the liquid crystals 152 are disposed within the upper cladding 164. It is understood that the liquid crystal material 152 could be disposed within the lower cladding 158, and if desired the alignment layers 154, 156 could be placed on the upper and lower surfaces of the lower cladding 158 having the liquid crystal material 152 therein.

The electrode geometry of FIGS. 11-12 and 19-20 may be used to rotate, during application of voltage across the electrodes, the liquid crystal molecules in the plane of the waveguide, as opposed to tipping them out of the plane of the waveguide as in FIGS. 1-7. This in-plane rotation can be advantageous since the voltages that can be used to rotate the liquid crystal molecules in the plane of the waveguide may be less in magnitude than the voltages used to rotate or tip the liquid crystal molecules out of the plane of the waveguide. Hence, the embodiments of FIGS. 11-12 and 19-20 may be operated with lower voltages when compared with other embodiments disclosed herein.

Furthermore, the electrodes 160, 162 may be positioned adjacent to a channel and separated from one another by a small distance, for example by a distance of five microns. In other embodiments, the space between the two electrodes can include: the lower waveguide cladding, the waveguide core, and the waveguide upper cladding. This may result in larger electrode spacing. Since for a given voltage, the strength of the electric field between the two electrodes is inversely dependent on the separation between the electrodes, smaller electrode spacing can be desirable. Stated differently, the electrode geometry may allow a smaller gap between the two electrodes, which will result in a larger electric field for the same applied voltage. This may also provide for lower operational voltages.

Various examples of alignment material are described herein. Other example alignment materials may include materials that produce azimuthally degenerate alignment for planar aligned nematic liquid crystals, with either positive or negative dielectric anisotropy. Two examples of such alignment materials that can generate azimuthally degenerate alignment are polymethyl methacrylate(PMMA) and (3-glycidoxypropyl) trimethoxysilane (glymo). These materials can allow liquid crystal molecules that are near an alignment layer to rotate in the plane of the waveguide very easily. This may be advantageous for achieving in-plane rotation (see FIGS. 11-12, and FIGS. 19-20) of liquid crystal materials at low voltages applied to the electrodes.

Figure 21:
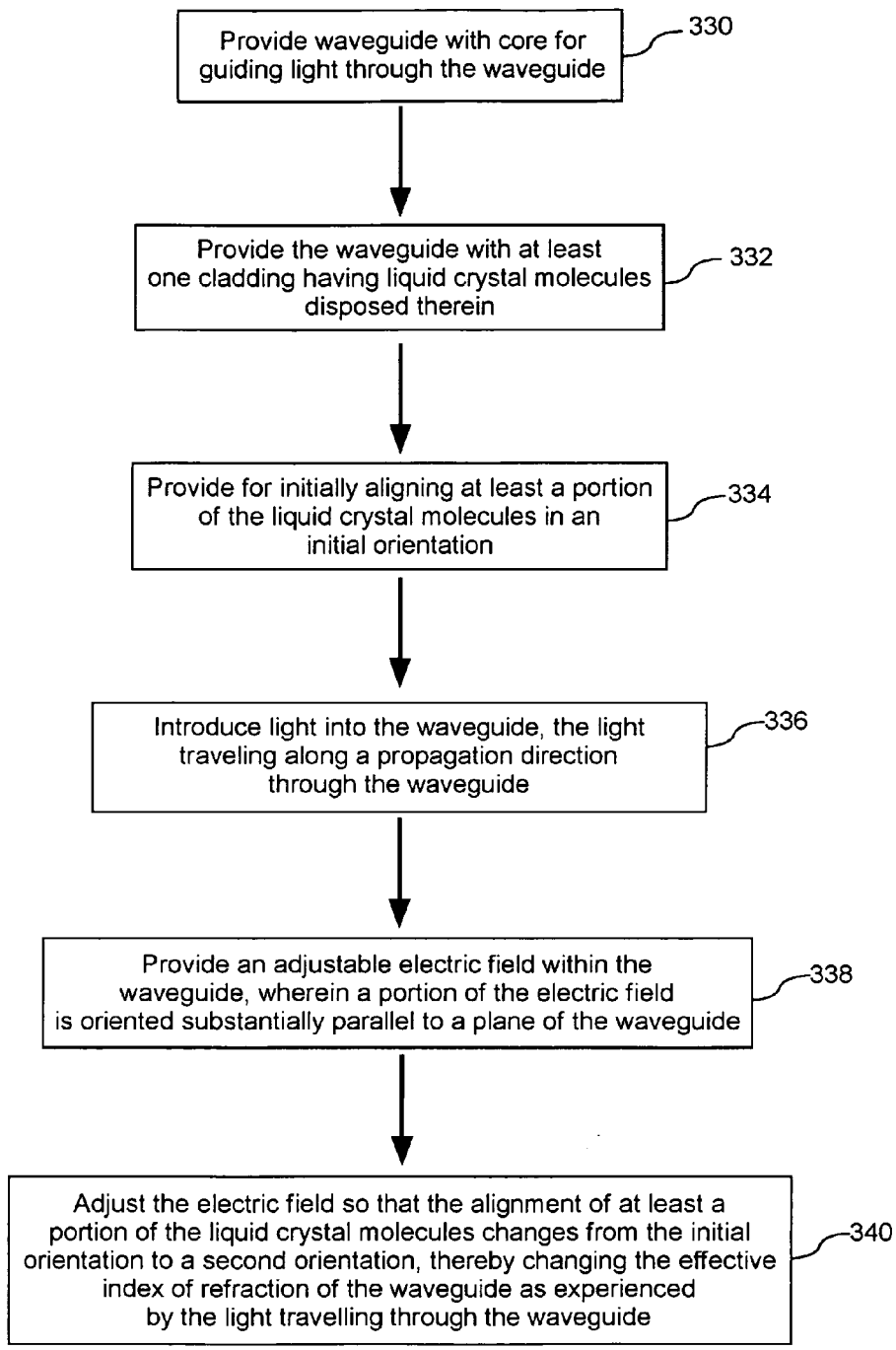
FIG. 21 illustrates an example of operations for controlling the propagation of light through a waveguide, in accordance with one embodiment of the present invention.

As described above, various waveguide structures may be made to control TE or TM polarized light as it passes through a waveguide. In another example of an embodiment of the invention, a method is disclosed herein for controllably altering an effective index of refraction of a waveguide. As shown in FIG. 21, the method may include, at operation 330, providing the waveguide with a core for guiding light through the waveguide. At operation 332, the waveguide may be provided with at least one cladding having liquid crystal molecules disposed therein. As described above, the liquid crystal material or molecules may be provided within the upper cladding or lower cladding, depending upon the implementation.

In one example, the liquid crystal molecules (such as provided at operation 332) may be characterized as having longitudinal axes, and operation 334 may include aligning at least a portion of the liquid crystal molecules with their longitudinal axes oriented substantially in a plane of the waveguide and substantially parallel to the light propagation direction.

At operation 334, at least a portion of the liquid crystal molecules are initially orientated in an initial orientation. At operation 336, light may be introduced into the waveguide traveling along a propagation direction 67 through the waveguide. At operation 338, an adjustable electric field may be provided within the waveguide, wherein a portion of the electric field is oriented substantially parallel to a plane of the waveguide. The plane of the waveguide may be generally parallel to the layers within the waveguide, which may include (depending on the implementation) the lower cladding, substrate layers, alignment layers, or core layer.

In one example, operation 338 may also include providing the waveguide with a pair of electrodes for receiving a voltage, the pair of electrodes being positioned adjacent the core; and providing for applying the voltage to the pair of electrodes thereby creating the adjustable electric field between the electrodes and through a portion of the at least one cladding.

The method may also include, at operation 340, adjusting the electric field so that the alignment of at least a portion of the liquid crystal molecules changes from the initial orientation to a second orientation, thereby changing the effective index of refraction of the waveguide as experienced by the light traveling through the waveguide.

In one example, the light traveling through the waveguide (such as at operation 336) may include TE polarized light and TM polarized light, and the method may further include adjusting the electric field so that the alignment of at least a portion of the liquid crystal molecules changes from the initial orientation to a second orientation, thereby changing the effective index of refraction of the waveguide as experienced by the TE light traveling through the waveguide and the effective index of refraction of the waveguide as experienced by the TM polarized light remains substantially unaltered.

The method may also include rotating the alignment of at least a portion of the liquid crystal molecules from the initial orientation to a second orientation that aligns at least a portion of the liquid crystal molecules with their longitudinal axes oriented substantially in the plane of the waveguide and substantially perpendicular to the light propagation direction.

Figure 22:
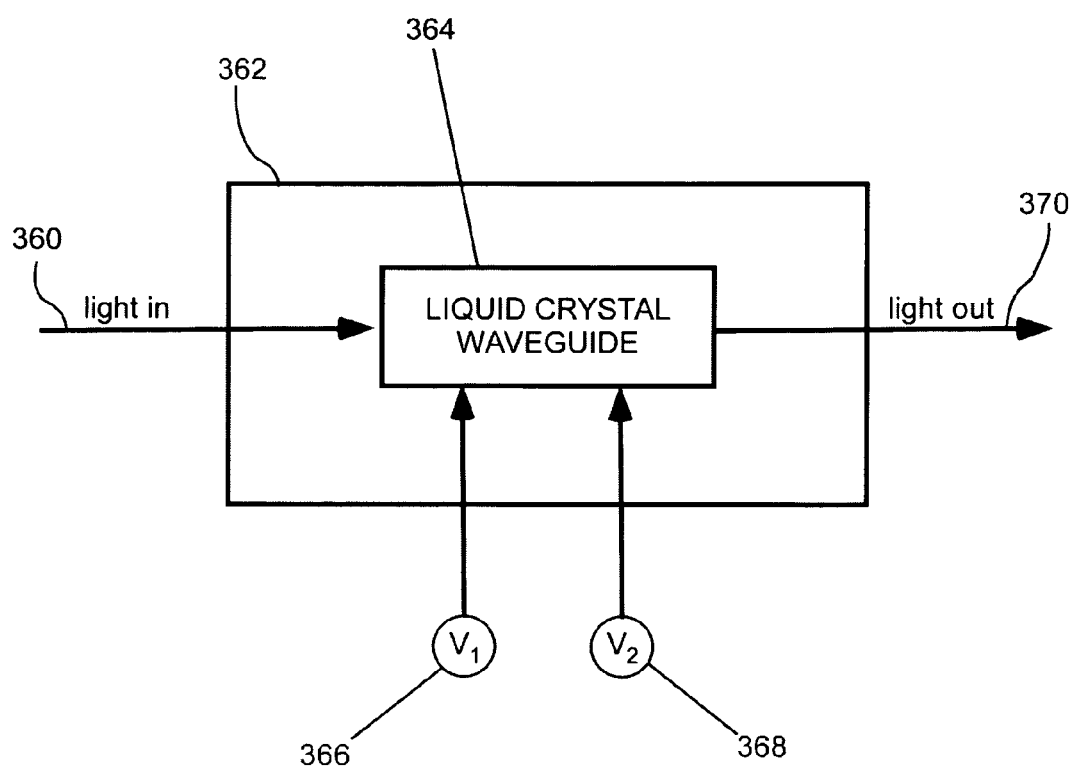
FIG. 22 illustrates an example of a block diagram of a telecommunications device having one or more liquid crystal waveguides therein, in accordance with one embodiment of the present invention.

One or more liquid crystal waveguides may be incorporated into a telecommunications device for a variety of applications. One example of a block diagram of a telecommunication device 362 is shown in FIG. 22. The input light 360 may be sent into the telecommunications device 362. The input light 360 may contain one or more wavelengths. For example, the light 360 may be from a narrow frequency laser source with a wavelength around 1550 nm. Alternately, the light 360 may contain a number of different wavelength channels, for example, a number of WDM or DWDM wavelength channels as are commonly used in telecommunication devices. The input light 360 may enter into the telecommunications device 362 in a number of different ways, such as through a free space beam, an optical waveguide, one or more optical fibers, an array of optical fibers, or by any other conventional input coupling technique. Telecommunications device 362 may include one or more liquid crystal waveguides 364 which may be formed, for example, using the various structures shown in FIGS. 1-7, 11-16 and 19-20 or as described herein, or as shown or described in commonly-owned and co-pending U.S. patent application Ser. Nos. 11/396,313 or 11/313,540 or 10/963,946 incorporated by reference in their entirety.

One or more control voltages, for example V1 (366) and V2 (368) in FIG. 22, may be applied to the one or more liquid crystal waveguides 364 to perform one or more different operations on the light 360 such as beam steering, phase control of TE and TM polarized light, attenuation of TE and TM polarized light, channel switching.

After the input light 360 has been processed by the one or more liquid crystal waveguides 364, the light may leave the telecommunications device 362 as output light 370. The output light 370 may contain one or more wavelengths. For example, the output light 370 may comprise a narrow frequency range with a center wavelength around 1550 nm. Alternately, the output light 370 may contain a number of different wavelength channels, for example, a number of WDM or DWDM wavelength channels. The output light 370 may leave the telecommunications device 362 through a free space beam, one or more optical fibers, an optical waveguide, an array of optical fibers, or by any other conventional output coupling techniques.

The one or more liquid crystal waveguides 364 may be used to realize a variety of functions within the telecommunication device 364. For example, they may provide a voltage controllable phase delay, as the embodiments of FIGS. 1-7 and FIGS. 11-14 depict. This can be used for a time-delay or propagation delay of the light. The liquid crystal waveguide 364 may contain more than one pair of control electrodes, as shown in FIGS. 11-14, such that the phase delays may be provided for TE polarized light, TM polarized light, both TE and TM polarized light, or any combination thereof. As one specific example, the control voltages V1 (366) and V2 (368) may be altered in a synchronous fashion so that the optical phase delay of TE polarized light is substantially equal to the optical phase delay of TM polarized light.

In another example, the liquid crystal waveguides 364 within the telecommunication device 362 may be used as a voltage controllable optical switch. For example, the embodiments of FIGS. 1-7 or FIGS. 11-14 may be used to provide a voltage controllable y-splitter, Mach-Zehnder interferometer, or other device. For example, the channel waveguide depicted in FIGS. 11, 12, and 13 can form or be part of one arm of a Mach-Zehnder interferometer. If desired, these uses of a liquid crystal waveguide can be rendered polarization independent by synchronously altering the control voltages V1 (366) and V2 (368) so that the optical phase delay of TE polarized light is substantially equal to the optical phase delay of TM polarized light throughout the operation of the telecommunication device.

In one example, the one or more liquid crystal waveguides 364 within the telecommunications device 362 may be used to implement one or more ring resonator structures. These ring resonator structures may be as depicted in FIGS. 15 and 16.

By configuring the liquid crystal waveguides 364 as switches or ring resonators, or both, the telecommunications device 362 can provide a variety of useful functions. These useful functions may include, but are not limited to, wavelength selective switching, variable optical attenuation, reconfigurable optical add/drop multiplexers, dispersion compensation, optical cross-connects, gain flatteners, channel equalizers, wavelength multiplexers and demultiplexers, optical routers, time delays, phase shifters, tunable filters, and others. Ring resonators may be combined with variable optical attenuators for the purpose of gain flatteners, or channel equalizers. As described herein, two or more control voltages 366, 368 can be used to operate the device 362 in a polarization independent manner.

Light 66 may be introduced into a waveguide via a variety of techniques. In one example, a high index prism constructed from a material such as GGG, rutile, Si, or any other suitably high index material can be pressed against a waveguide and used as a prism coupler. In another embodiment, suitably high numerical aperture lenses, such as cylindrical microlenses, ball lenses or others, may be used to focus light into a waveguide via an endfire coupling scheme. In another example, a light source may be either a fiber optic cable or another waveguide, which in turn may be placed directly against a liquid crystal waveguide for the purpose of introducing light via a butt-coupling technique. Furthermore, the entrance into and/or exit from a waveguide may be modified to facilitate coupling light into and out of a waveguide, for example, the core and/or cladding dimensions and/or indices may be tapered or altered in the region near the entrance or exit of a waveguide, or integrated optical lenses may be utilized.

The voltages herein described and shown can be generated and controlled by analog or digital circuits, and such circuits can be external to or integral with the waveguide. Such circuits may include logic, discrete logic or integrated circuits such as microcontrollers, microprocessors, or programmable logic devices (PLDs), and may statically and/or dynamically control and/or monitor the voltages.

Embodiments of the present invention may be utilized to make or may be incorporated as part of various devices, such as but not limited to tunable lasers, spectrometers, Fourier transform spectrometers, optical filters, optical time delays, optical switches, telecommunications system, dynamically tunable filters, adjustable delay lines, tunable resonators, continuously tunable lasers.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

It should be appreciated that references throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed inventions require more features than are expressly recited in each claim. Rather, as the following claims reflect, inventive aspects lie in less than all features of a single foregoing disclosed embodiment, and each embodiment described herein may contain more than one inventive feature.

While the invention has been particularly shown and described with reference to embodiments thereof, it will be understood by those skilled in the art that various other changes in the form and details may be made without departing from the spirit and scope of the invention.

The invention claimed is:

1. A waveguide for controllably altering an optical phase delay of TE polarized light and TM polarized light traveling along a propagation direction through the waveguide, comprising:
    a core for guiding the light through the waveguide;
    a bottom cladding adjacent the core, the bottom cladding defining a plan of the waveguide;
    at least one cladding adjacent the core, wherein the at least one cladding has liquid crystal molecules disposed therein;
    an alignment layer for aligning the liquid crystal molecules;
    at least one ground electrode;
    a first control electrode on the core, the first control electrode controllably altering at least a portion of the liquid crystal molecules to rotate in a plane perpendicular to both a direction of propagation of light and the plane to controllably alter the optical phase delay of the TE polarized light and the TM polarized light traveling through the waveguide in response to receiving a first voltage; and
    a second control electrode on the same core, the second control electrode controllably altering at least a portion of the liquid crystal molecules to rotate in a plane parallel to the direction of propagation of light and perpendicular to the plane to controllably alter the optical phase delay of the TM polarized light traveling through the waveguide without substantially altering the optical phase delay of the TE polarized light in response to receiving a second voltage; and
    wherein the first control electrode is positioned adjacent a first alignment region and the second control electrode is positioned adjacent a second alignment region, the first region initially biasing liquid crystals therein into a first alignment with respect to the direction of propagation of light, and the second region initially biasing liquid crystals therein into a second alignment with respect to the direction of propagation of light, the first control electrode optically in series with the second control electrode.

2. The waveguide of claim 1, further comprising a voltage driver to synchronously alter the first voltage and the second voltage so that the optical phase delay of the TE polarized light is substantially equal to the optical phase delay of the TM polarized light.

3. The waveguide of claim 1, wherein the first alignment region aligns the liquid crystal molecules substantially perpendicular to the direction of the propagation of light and the second alignment regions aligns the liquid crystal molecules substantially parallel to the direction of the propagation of light.

4. A waveguide for controllably altering an optical phase delay of both a TE polarized light component and a TM polarized light component of the light traveling along a propagation direction through the waveguide, comprising:
 a core for guiding the light through the waveguide;
 cladding on each of opposite sides of the core, the cladding on at least one of the opposite sides of the core having liquid crystal molecules disposed therein;
 a channel formed in the cladding on at least one of the opposite sides of the core, the channel defining an inverted ridge in the core, the channel laterally guiding the light through the core;
 an alignment layer to align the liquid crystal molecules;
 a first electrode pair positioned adjacent the channel for receiving a first voltage, wherein controllably altering the first voltage rotates at least a portion of the liquid crystal molecules adjacent the first electrode in a plane perpendicular to both a propagation direction of light and a plane of the waveguide to controllably alter an optical phase delay of the TE polarized light component without substantially altering the optical phase delay of the TM polarized light component; and
 a second electrode pair positioned adjacent the channel for receiving a second voltage, wherein controllably altering the second voltage rotates at least a portion of the liquid crystal molecules adjacent the second electrode in a plane parallel to the propagation direction of light and the plane of the waveguide to controllably alter the optical phase delay of the TM polarized light component without substantially altering the optical phase delay of the TM polarized light component; and
 wherein the first electrode pair is positioned adjacent a first alignment region and the second electrode pair is positioned adjacent a second alignment region, the first region initially biasing liquid crystals therein into a first alignment with respect to the propagation direction of light, and the second region initially biasing liquid crystals therein into a second alignment with respect to the propagation direction of light, the first electrode pair optically in series with the second electrode pair.

5. The waveguide of claim 4, further comprising a flat upper surface covering the channel and the liquid crystal cladding is between the flat upper surface and the core to prevent topology of the channel from changing alignment of the liquid crystal molecules therein.

6. The waveguide of claim 4, wherein the first and second voltages are synchronously altered such that the optical phase delay for the TE polarized light remains substantially the same as the optical phase delay for the TM polarized light.

* * * * *